US008738869B2

(12) United States Patent
Ogihara et al.

(10) Patent No.: US 8,738,869 B2
(45) Date of Patent: May 27, 2014

(54) STORAGE SYSTEM INCLUDING A PLURALITY OF MODULES HAVING DIFFERENT CONTROL INFORMATION

(75) Inventors: Kazutaka Ogihara, Kawasaki (JP); Masahisa Tamura, Kawasaki (JP); Toru Yokohata, Kawasaki (JP); Satoshi Ikuta, Shizuoka (JP); Yasuo Noguchi, Kawasaki (JP); Riichiro Take, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1079 days.

(21) Appl. No.: 11/140,360

(22) Filed: May 31, 2005

(65) Prior Publication Data

US 2005/0235109 A1 Oct. 20, 2005

Related U.S. Application Data

(63) Continuation of application No. PCT/JP03/06355, filed on May 21, 2003.

(51) Int. Cl.
*G06F 12/00* (2006.01)
*G06F 12/12* (2006.01)

(52) U.S. Cl.
CPC .................................... *G06F 12/12* (2013.01)
USPC .......................................... 711/161; 711/154

(58) Field of Classification Search
CPC ...................................................... G06F 12/12
USPC ................................................. 711/161, 154
See application file for complete search history.

(56) References Cited

U.S. PATENT DOCUMENTS

| | | | | |
|---|---|---|---|---|
| 6,601,187 | B1 * | 7/2003 | Sicola et al. | 714/6 |
| 6,606,694 | B2 * | 8/2003 | Carteau | 711/162 |
| 6,654,862 | B2 * | 11/2003 | Morris | 711/162 |
| 2003/0046602 | A1 | 3/2003 | Hino et al. | |
| 2003/0088746 | A1 | 5/2003 | Hino et al. | |
| 2004/0128442 | A1 * | 7/2004 | Hinshaw et al. | 711/114 |

FOREIGN PATENT DOCUMENTS

| | | | |
|---|---|---|---|
| JP | 2000-293321 | | 10/2000 |
| JP | 2001-184176 | | 7/2001 |
| JP | 2002-182862 | | 6/2002 |
| JP | 2002-215473 | | 8/2002 |
| JP | 2002-244922 | | 8/2002 |
| JP | 2002-259172 | A | 9/2002 |
| JP | 2002-268825 | | 9/2002 |
| JP | 2003-76592 | A | 3/2003 |
| WO | WO 00/67250 | | 11/2000 |

OTHER PUBLICATIONS

Office Action from the Japanese Patent Office dated Aug. 26, 2008 in the corresponding Japanese Patent Application No. 2004-572102.

* cited by examiner

*Primary Examiner* — Matthew Bradley

(74) *Attorney, Agent, or Firm* — Westerman, Hattori, Daniels & Adrian, LLP

(57) ABSTRACT

A storage system is disclosed that stores data across plural storage devices. The storage system includes plural modules. Each of the modules includes a storage device including a data storage section that has plural slice areas to store data elements one in each, and a control-information storage section that stores control information of the plural slice areas, a communications-function section having a function of sending and receiving the data elements stored in the slice areas in the data storage section. The modules communicate with each other to replicate the data element stored in the slice area into an unused slice area in another module so as to have data redundancy.

20 Claims, 62 Drawing Sheets

MODULE A 11

MODULE A 11

VOLUME-INFORMATION MODULE M 64

VOLUME-INFORMATION MODULE M 64

VOLUME-INFORMATION MODULE M 64

STORAGE SYSTEM INCLUDING A PLURALITY OF MODULES HAVING DIFFERENT CONTROL INFORMATION

CROSS-REFERENCE TO RELATED APPLICATIONS

This application is a U.S. continuation application filed under 35 USC 111(a) claiming benefit under 35 USC 120 and 365(c) of PCT application JP2003/006355, filed on May 21, 2003, the entire contents of which are hereby incorporated herein by reference.

BACKGROUND OF THE INVENTION

1. Field of the Invention

The present invention relates to a storage system that stores data across plural storage devices, and more particularly relates to a storage system that provides redundancy of stored data.

2. Description of the Related Art

Systems for processing a large volume of data have been configured to access plural hard disks in parallel for increasing data reading and writing speed when they need to store data across the plural hard disks. Such systems usually employ storage systems that provide data redundancy to prevent data from being lost in case one of hard disks fails. One method for constructing this type of storage system is RAID.

RAID is classified into some versions according to fault tolerance levels or features such as striping used to write data across plural drives simultaneously for increasing access speed, mirroring used to write identical copies of data across plural drives for providing improved reliability compared to writing on a single drive, and data restoration by data error detections. Currently available versions of RAID include RAID 0, which implements striping for increasing access speed, through RAID 5, which adds parity and can restore data even if one disk fails. For constructing a storage system with these versions of RAID, one or a combination of the RAID versions are selected according to the level required by the system.

For example, RAID 1 employs a process called mirroring that uses two physical disks, which form a single virtual disk, with identical copies of data. When data are written on the virtual disk, the data are actually written on the two physical disks at the same time. If the two physical disks have different capacities, the volume of data corresponds to the physical disk having a smaller capacity. When responses reporting successful completion of data writing are sent from both of the disks, the completion of the data writing is reported to the source that sent a request of the data writing. On the other hand, the response is not sent from either one of the disks, if an error is reported to the source of the request. In case one of the physical disks fails, data are read from the other physical disk and written on another disk substituting for the failed disk so as to maintain data redundancy.

RAID 0+1 is a combination of RAID 0 and RAID 1. RAID 0 employs a process called data striping. According to RAID 0, plural physical disks of the same capacity are each divided into slices having the same size, and data are allocated across the slices in accordance with a predetermined allocation priority of the physical disks. Although this process does not provide data redundancy, simultaneous access to plural disks can reduce total access time and thereby improve data reading and writing performances. Raid 0+1, having both features of RAID 0 and RAID 1, employs a process of mirroring each slice of physical disks.

Storage systems using RAID 1 or RAID 0+1 need a controller for executing various operations. If doubling the controller for safer handling of stored data, channels for accessing each of the physical disks from each of the doubled controllers need to be provided. Thus, cost of the storage system is increased. In the case where one of the physical disks fails, even when other disks have plenty of unused areas, these unused areas cannot be used to substitute for the failed physical disk due to RAID 1 restrictions. For this reason, a spare physical disk has to be prepared.

For controlling storage systems, there is a system that performs storage control operations at a host computer side using the same interface used for data reading and writing. There is another system for performing control operations, which uses an interface different from the one used for data reading and writing without depending on a host computer. The first system can perform storage control operations in conjunction with applications installed in the host computer, but the storage control operations cannot be performed when the host computer is not in operation. On the other hand, the latter system can independently perform storage control operations without depending on the host computer, but the storage control operations cannot be performed in conjunction with applications installed in the host computer.

In view of these disadvantages, Japanese Patent Laid-Open Publication No. 2002-268825 discloses a system provided with a storage control server having interfaces to both a host computer and a storage system to allow storage control operations by the server.

In most cases, clients that access data stored in a storage system via a network do not know the reliability level of the storage system. Therefore, the clients have to backup their data in case of unexpected events. If data are frequently updated, the clients may need to backup each time the data are updated. Such frequent backup operations might be a troublesome task.

To eliminate the need for data backup by clients, there is proposed a system having storage devices of various reliability levels such that data are stored in the most suitable one of the storage devices according to reliability level information added to the data (see Japanese Patent Laid-Open Publication No. 2002-244922 paragraph number 0012 through 0021, FIG. 1). Even if the reliability level information is changed when a client refers to or updates the data, the most suitable on one of the storage devices is selected according to the changed information.

However, neither of the systems disclosed in the publications can completely solve the problems including controller doubling, cost increase due to communication channels increased by the controller doubling, unused areas that cannot be used in a storage system having storage devices of different capacities, and necessity of spare physical disks.

SUMMARY OF THE INVENTION

A general object of the present invention is to provide a storage system that solves at least one problem described above. A specific object of the present invention is to provide a storage system that can improve usage efficiency of the storage device, reduce a workload due to doubled controllers, and assure security of stored data.

According to an aspect of the present invention, there is provided a storage system that stores one or more sets of plural data elements across plural storage devices. The storage system comprises plural modules each of which includes a storage device and a communications-function section. The storage device includes a data storage section that has plural slice areas configured to store the data elements one in each slice area, and a control-information storage section that stores control information of the slice areas. The communications-function section has a function of sending and receiving information including the data elements stored in the slice areas in the data storage section and the control information stored in the control-information storage section. As the data are stored across the data storage sections in the storage devices, usage efficiency of the storage device is improved. Also, safety of the stored data is improved at low cost.

The modules can send and receive the information including the data elements stored in the slice areas and the control information stored in the control-information storage section among the modules. A first module can replicate the data element stored in the slice area in the first module into a predetermined slice area in a second module.

By using the communication function and duplication function, the storage system stores identical data elements respectively in the slice areas provided in at least two of the modules. The pair of the slice areas in which the identical data elements are stored form a segment. Thus, redundancy of the stored data is provided. The redundancy allows the data to be restored by a parity check in order to improve fault tolerance.

The control-information storage section can store control information of unused slice areas and slice areas forming segments in the data storage sections, and information related to a logical volume representing a set of data elements stored across the slice areas in the modules.

The control information stored in the control-information storage section is important in managing and controlling the storage system of the present invention. If the control information storage section in the first module receives an update request for update of the control information stored therein from the second module, the control information storage section in the first module updates the control information stored therein upon receiving an update completion request from the second module, but restores the control information stored therein to a state immediately before receiving the update request upon receiving an update abort request from the second module.

In case any one of the modules is abnormally terminated, an operator can restore the module by operating a forced-activation section for manual forced-activation instead of automatically restoring the failed module.

The modules respectively have heartbeat transmitters to transmit heartbeats (e.g. pulse signals generated at predetermined time intervals) that indicate operation states thereof. Therefore, the modules can regularly report the operation states to each other, and thus can detect errors in the modules. If an error is detected in one of the modules, data elements stored therein are transferred to other modules. This configuration provides improved safety.

The storage system may comprise an access module having information about the data elements stored in the slice areas in the modules such that the access module handles all the access requests from external computers to directly pass each of the access requests to the module that meets the request. The access time to the modules can be thus reduced.

Each of the modules may comprise a heartbeat transmitter to transmit a heartbeat that indicates an operation state thereof, and the storage system may comprises a state-control module to control all the operational states of the modules based on the heartbeat received from the heartbeat transmitter of the corresponding module. With this configuration, the workload on each of the modules can be reduced while promptly correcting errors occurring in the modules.

The storage system may comprise a volume-information module to collect the control information from each of the modules and reconstruct information related to a logical volume representing a set of plural data elements stored across the slice areas in the modules based on the collected control information. The volume-information module contributes to increasing operating speed due to consolidation of the control information, which is important for operating the storage system, and to improving the safety of the stored data due to duplication of the control information in the storage-information control section of the modules.

The storage system of the present invention may be used in combination with any one or all of the access module, state-control module, and the volume-information module according to characteristics or workload of information processing systems that access the storage system, and the reliability level of data.

With the configuration described above, the present invention can provide a storage system having high usage efficiency of a storage device and assuring safety of stored data.

DETAILED DESCRIPTION OF THE PREFERRED EMBODIMENT (First Embodiment)

Figure 1:
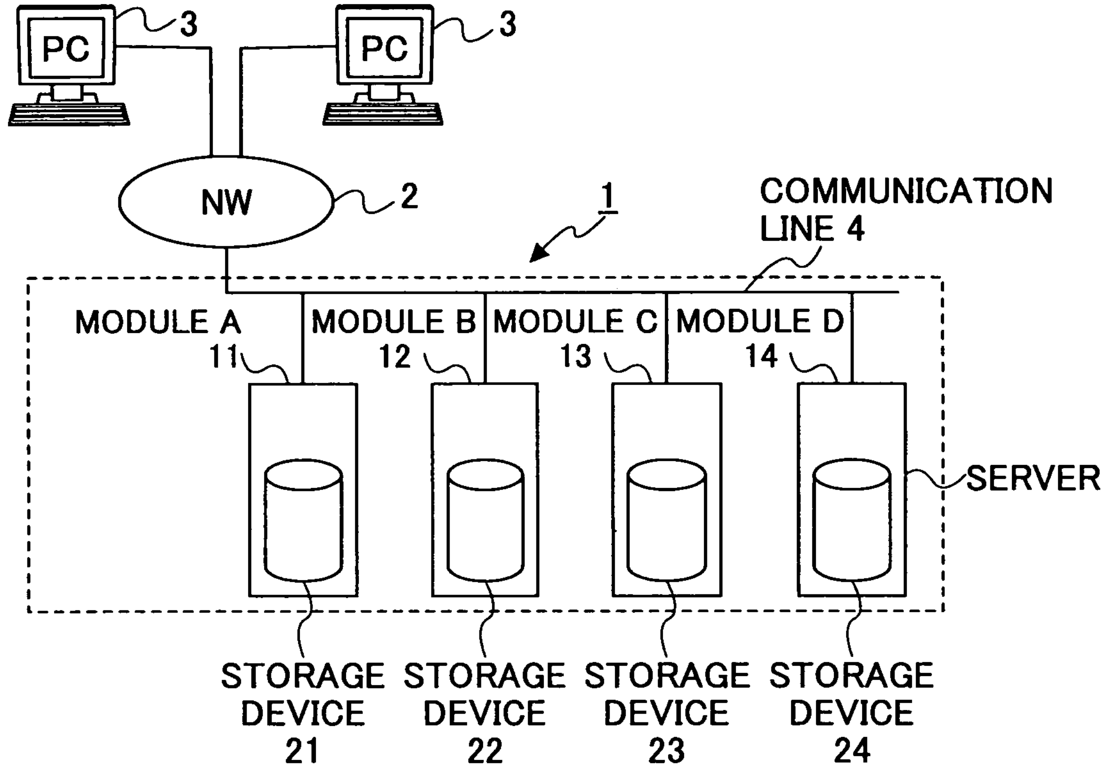
FIG. 1 is a schematic block diagram showing a configuration example of an information processing system including a storage system of a first embodiment.

FIG. 1 is a schematic block diagram showing a configuration example of an information processing system including a storage system 1 of a first embodiment of the present invention.

As shown in FIG. 1, the storage system 1 is provided with a module A11 comprising a server (which may be a personal computer or a work station) having a storage device 21, a module B12 comprising a server having a storage device 22, a module C13 comprising a server having a storage device 23, and a module D14 comprising a server having a storage device 24. These four modules A11 through D14 are connected to a network 2 via communication lines 4. Two computers 3 are connected to the network 2. Each of the computers 3 can make requests for data storage, addition, deletion and change by accessing the storage system 1. The storage devices 21 through 24 are hard disks in this embodiment, although not they are limited to being hard disks.

The four modules A11 through D14 provided in the storage system 1 are controlled by the corresponding servers. The modules A11 through D14 can send and receive information and data to each other as well as the network 2 via the communication lines 4 using communication functions of the corresponding servers. Therefore, data stored in each one of the storage devices 21 through 24 of the modules A11 through D14 can be replicated to any other of the storage devices. Thus, the storage system 1 can provide redundancy of data stored therein.

Figure 2:
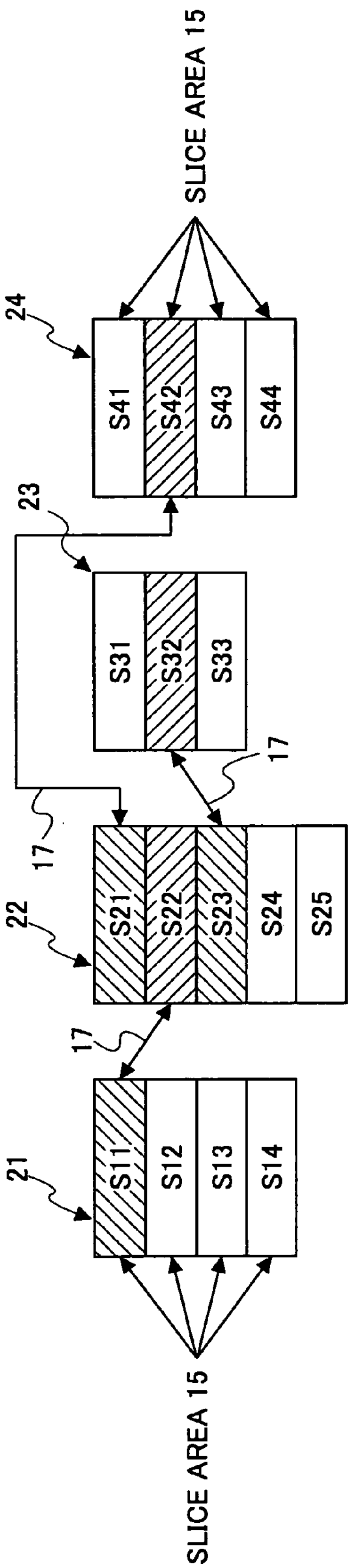
FIG. 2 is a diagram illustrating a basic concept of storing data in four storage devices in the storage system of the first embodiment.

FIG. 2 is a diagram illustrating a basic concept of storing data in the four storage devices 21 through 24 in the storage system 1 of this embodiment.

As shown in FIG. 2, each of the four storage devices 21 through 24, which may or may not have the same capacity, provided in the modules A11 through D14 is divided into plural small areas S each configured to store a predetermined volume of data. These small areas S (to which numbers S11 through S14, numbers S21 through S25, numbers S31 through S35, and numbers S41 through S44 are attached) are referred to as slice areas 15. When a request to store data is sent to the storage system 1, the data are stored across the slice areas 15. A set of data stored across plural modules based on a storage request is called a logical volume.

For example, slice areas S11, S21 and S23 indicated by a forward diagonal line pattern compose one logical volume.

In the storage system 1 in this embodiment, individual data elements of the data stored in the slice areas 15 are replicated and stored in unused slice areas 15 in any of the modules in which their original data element is not stored.

Thus, the storage system 1 can efficiently use the storage devices 21-24 while providing for redundancy of the stored data.

A pair of slice areas 15 storing identical data elements is called as a segment 17. The segment 17 is created as follows. When one of the modules receives a logical volume allocation request, the module replicates a data element stored in a slice area 15 to an unused slice 15 in any one of the other modules with use of communications functions.

For example, a segment 17 is formed by the slice area S11 indicated by a forward diagonal line pattern and a slice area S22 indicated by a backward diagonal line pattern. Another segment 17 is formed by the slice area S21 indicated by a forward diagonal line pattern and a slice area S42 indicated by a backward diagonal line pattern. Another segment 17 is formed by the slice area S23 indicated by a forward diagonal line pattern and a slice area S32 indicated by a backward diagonal line pattern.

While there are the four modules used in this embodiment, the number of modules is not limited to four. Also, the modules A11 through D14 are connected to the network 2 via the communication lines 4, although they may be directly connected to the network 2. The storage system, not only providing the redundancy of the data stored in the storage device 1 by duplicating the data and creating segments 17 each consisting of a pair of slice areas 15, but also provides data error detection by parity checks, or data error detection and correction may additionally be implemented for assuring redundancy of the stored data.

Figure 3:
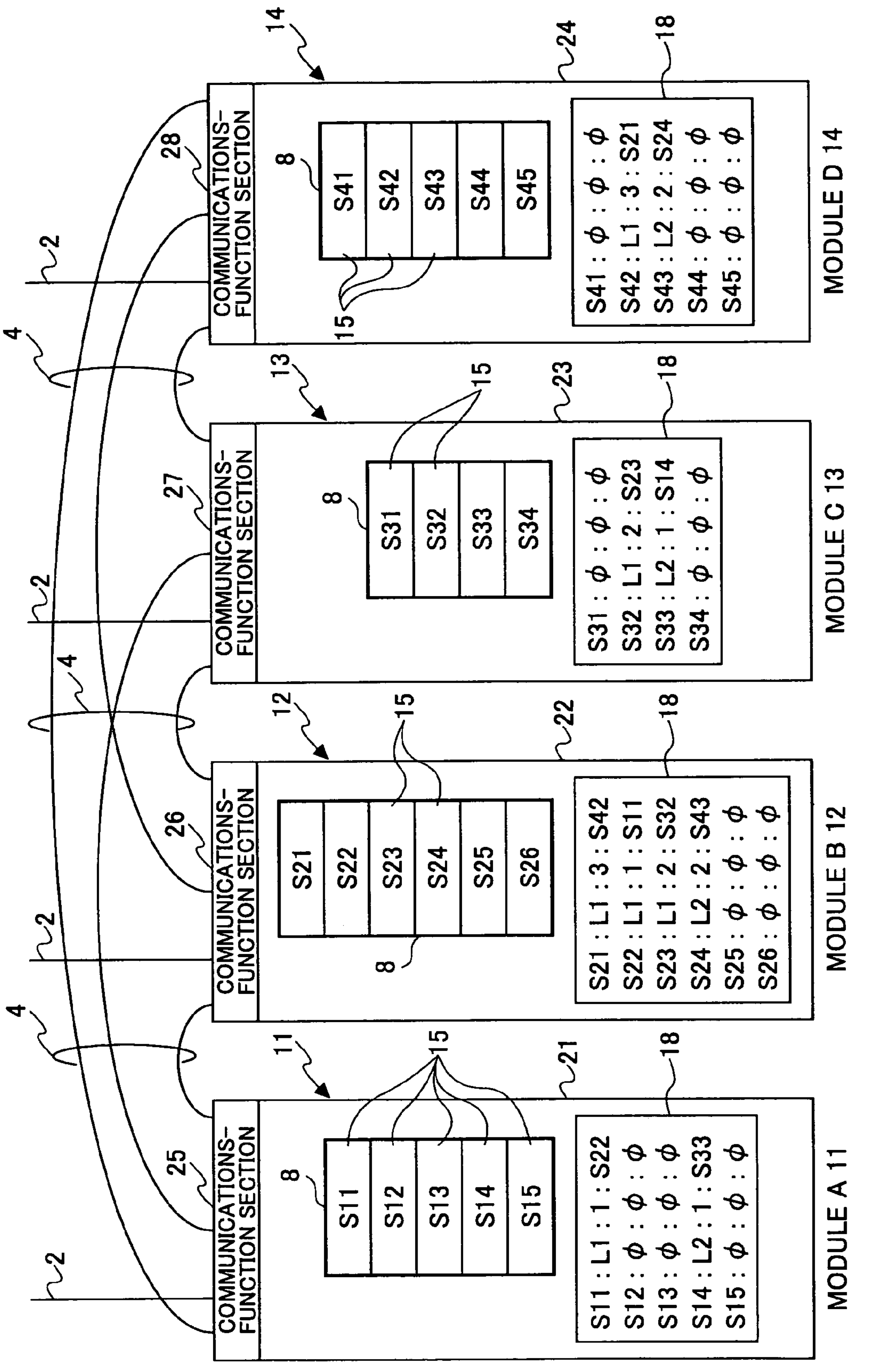
FIG. 3 is a functional block diagram of a storage system of the first embodiment.

FIG. 3 is a functional block diagram of a storage system of the first embodiment.

The storage system shown in FIG. 3 comprises modules A11, B12, C13 and D14 each having a server. Each of the modules A11 through D14 can send data to and receive data from external devices via a network 2 connected to the servers using communications-function sections 25 through 28 included in the corresponding servers. The servers are connected one-to-one via communication lines 4, and therefore the modules A11 through D14 can communicate with each other using the communications-function sections 25 through 28. While the servers are connected one-to-one via the communication lines 4, they may be connected by other means that allow communications among the modules A11 through D14.

Each of storage devices 21 through 24 respectively provided in the modules A11 through D14 comprises a data storage section 8 having plural slice areas 15 configured to store data, and a control-information storage sections 18 configured to store control information of the plural slice areas 15. The control information stored in each of the control-information storage section 18 includes information on the name of a logical volume Ln, a data allocation position n on the logical volume, and a slice area 15 belonging to the same segment in a different module for each of the slice areas (S11-S15, S21-S26, S31-S34, S41-S45).

In the storage system of this embodiment, there are two logical volumes: L1 and L2. The logical volume L1 has three segments. Data of the logical volume L1 are stored in, in the order of the data allocation position, the slice areas S11, S23, S42. The segments of the logical volume L1 are respectively formed by a pair of the slice areas S11 and S22, a pair of the slice areas S23 and S32, and a pair of the slice areas S42 and S21. On the other hand, the logical volume L2 has two segments. Data of the logical volume L2 are stored in, in the order of the data allocation position, the slice areas S14 and S43. The segments of the logical volume L2 are respectively formed by a pair of the slice areas S14 and S33 and a pair of the slice areas S43 and S24.

The slice areas 15 and the control-information storage sections 18 may be provided integrally, but now the slice areas 15 and the control-information sections 18 are separately located in the storage device for simple description.

In this way, data are stored across the plural slice areas 15 each having a small capacity. Therefore, even if the capacities of the storage devices are different, usage efficiencies of the individual storage devices are improved. Moreover, each of data elements stored in a module is replicated to another module using communication functions, so that the stored data are duplicated to provide data redundancy.

The following describes how data are stored in a storage system.

Figure 4:
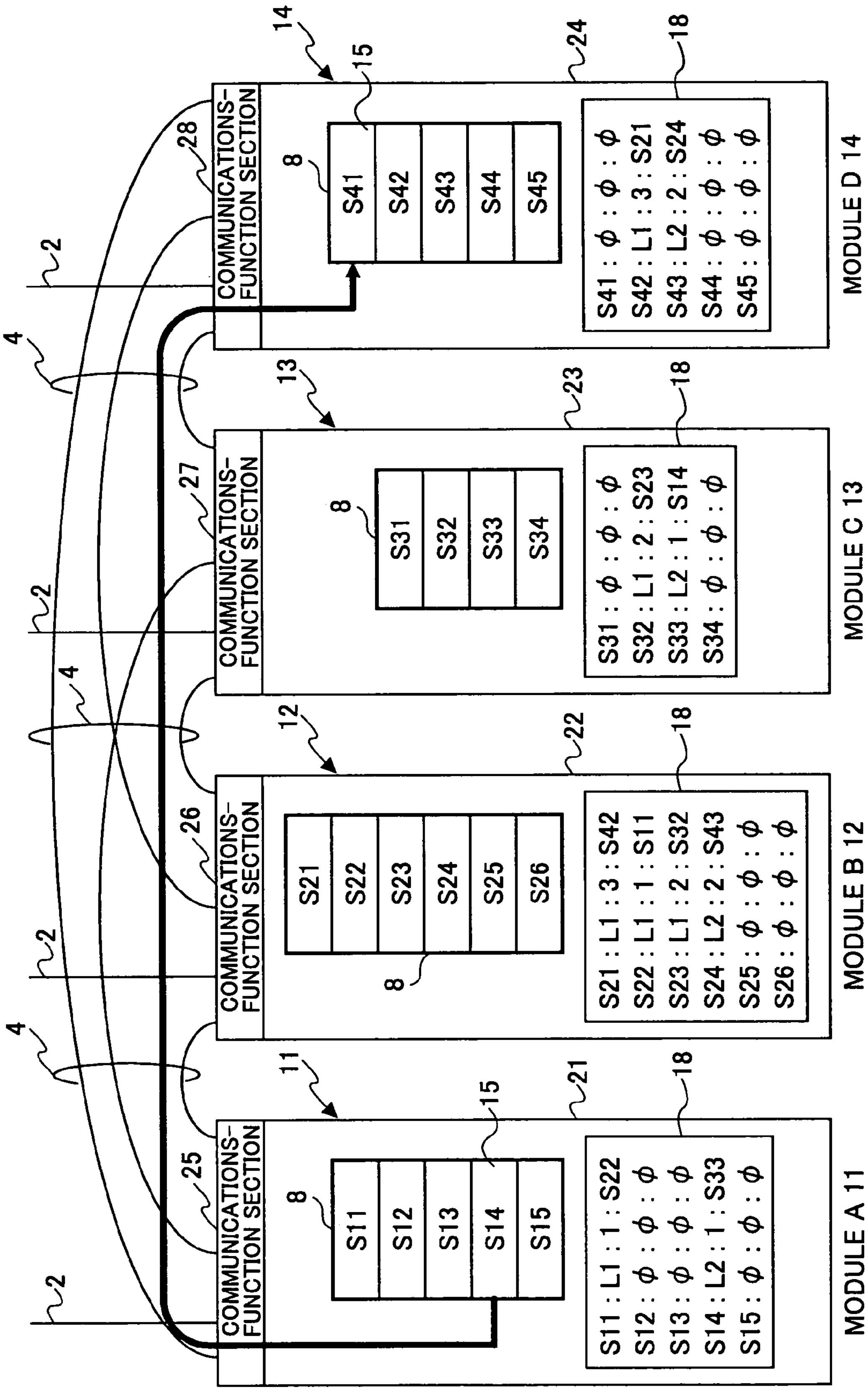
FIG. 4 shows an example of a procedure for replicating data stored in slice areas.

FIG. 4 shows an example of a procedure for replicating data stored in slice areas.

Referring to FIG. 4, each of the storage devices 21 through 24, which are respectively included in the modules A11 through D14, comprises plural slice areas 15 configured to store data based on a write request, and a control-information storage section 18 configured to store control information on the name of a logical volume Ln, a data allocation position n on the logical volume, and a slice area 15 belonging to the same segment in a different module for each of the slice areas (S11-S15, S21-S26, S31-S34, S41-S45).

If, for some reason, there arises a need to replicate a data element stored in the slice area S14 in the module A11 to the slice area S41 in the module D14, the module A11 activates the communications-function section 25 to be connected to the communications-function section 28 in the module D14 and queries whether the slice area S41 is unused. If the module A11 receives a response that the slice area S41 is unused from the module D14, the module A11 sends a copy of the data element stored in the slice area S14 to the module 14.

FIGS. 5 through 10 show an example of a procedure performed when a storage system receives a logical volume allocation request from the outside.

The storage system shown in FIGS. 5 through 10 comprises modules A11, B12, C13, and D14, which respectively include communications-function sections 25 through 28. Each of the storage devices 21 through 24, which are respectively included in the modules A11 through D14, comprises a data storage section 8 having plural slice areas 15 and a control-information storage section 18, although the data storage section 8 is not shown for the sake of simplicity.

Figure 5:
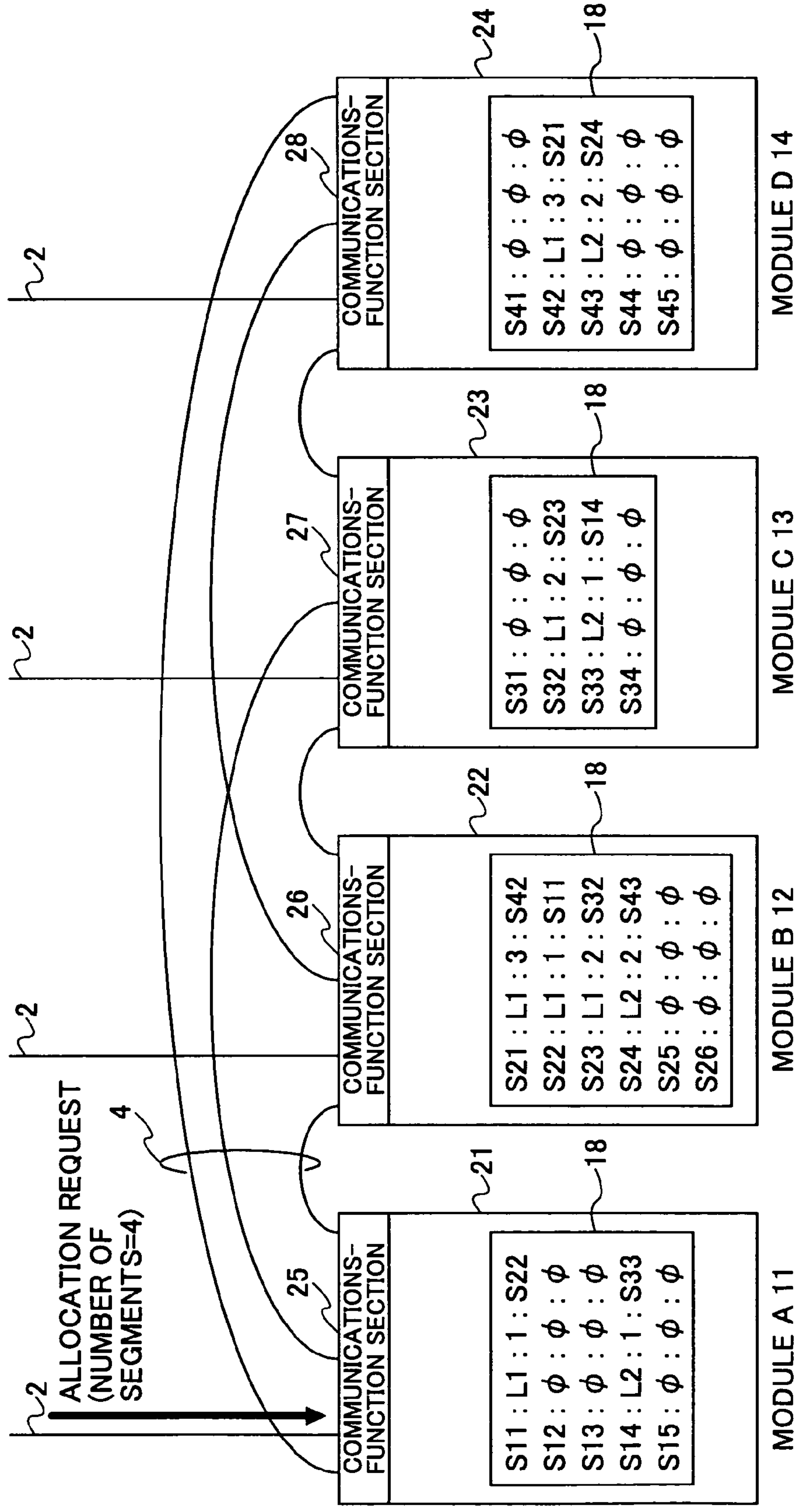
FIG. 5 shows an example of a procedure performed when a storage system receives a logical volume allocation request from the outside.

Referring to FIG. 5, in the module A11, data elements are stored in slice areas S11 and S14, while slice areas S12, S13 an S15 are unused. In the module B12, data elements are stored in slice areas S21, S22, S23 and S24, while slice areas S25 and S26 are unused. In the module C13, data elements are stored in slice areas S32 and S33, while slice areas S31 and S34 are unused. In the module D14, data elements are stored in slice areas S42 and S43, while slice areas S41, S44 and S45 are unused.

The following is an example where a request to store a logical volume having four segments is received.

In this example, the logical volume is allocated according to a rule that gives allocation priority to its own slice areas although other rules may be applied to logical volume allocation. A module that has allocated a data element of a logical volume therein secures an unused (or available) slice area in the other modules, and replicates the data element to the secured slice area to create a segment.

Figure 6:
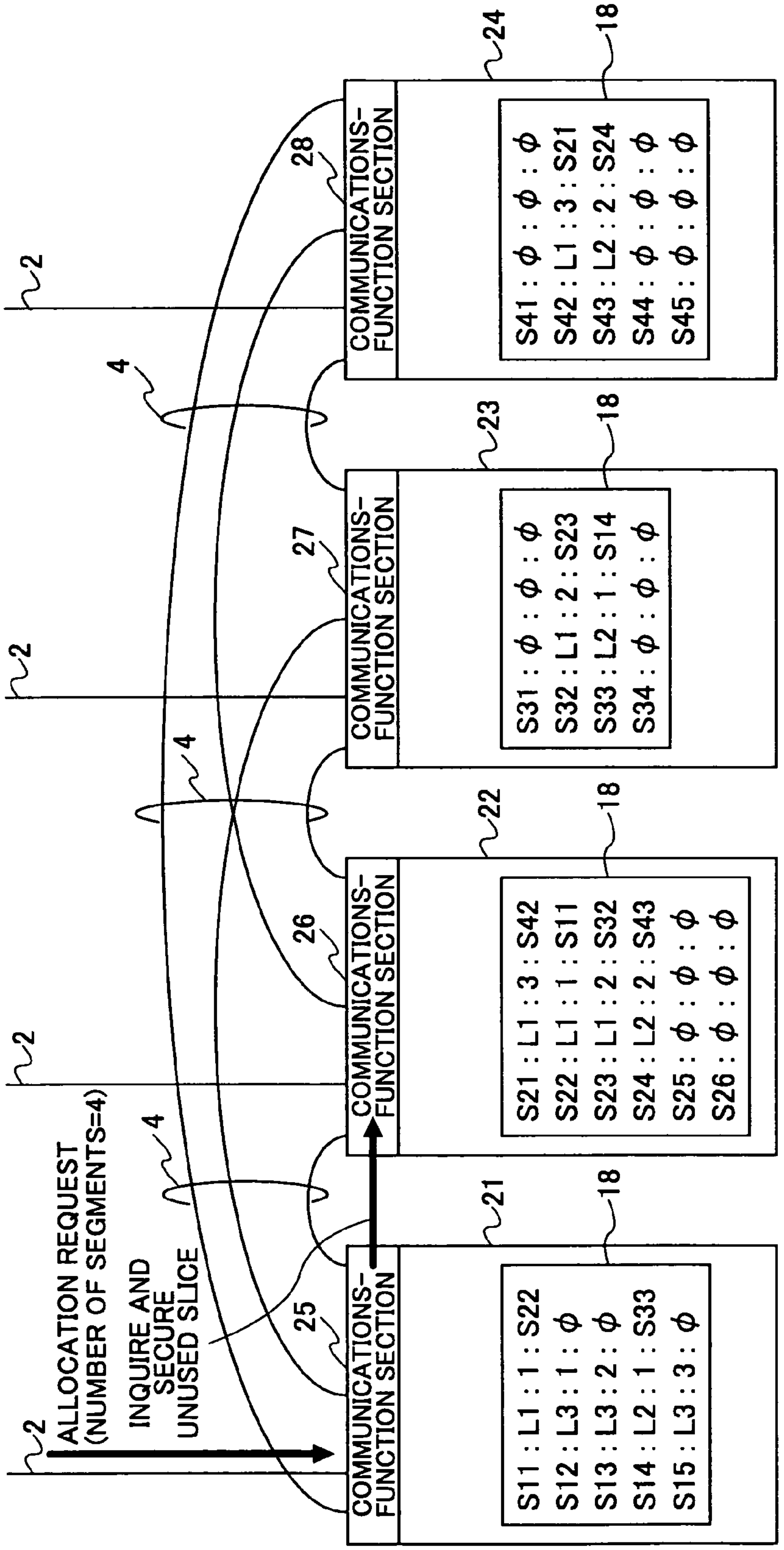
FIG. 6 (continued from FIG. 5) shows the procedure performed when a storage system receives a logical volume allocation request from the outside.

As the slice areas S12, S13 and S15 are unused, the module A11 allocates data elements of a logical volume L3 to the slice areas S12, S13, and S15 as shown in FIG. 6. Then, in order to find unused slice areas in the other modules for creating segments with the slice areas S12, S13, and S14, the module A11 first sends a query for slice area availability and a request to secure unused slice areas to the module B12.

Figure 7:
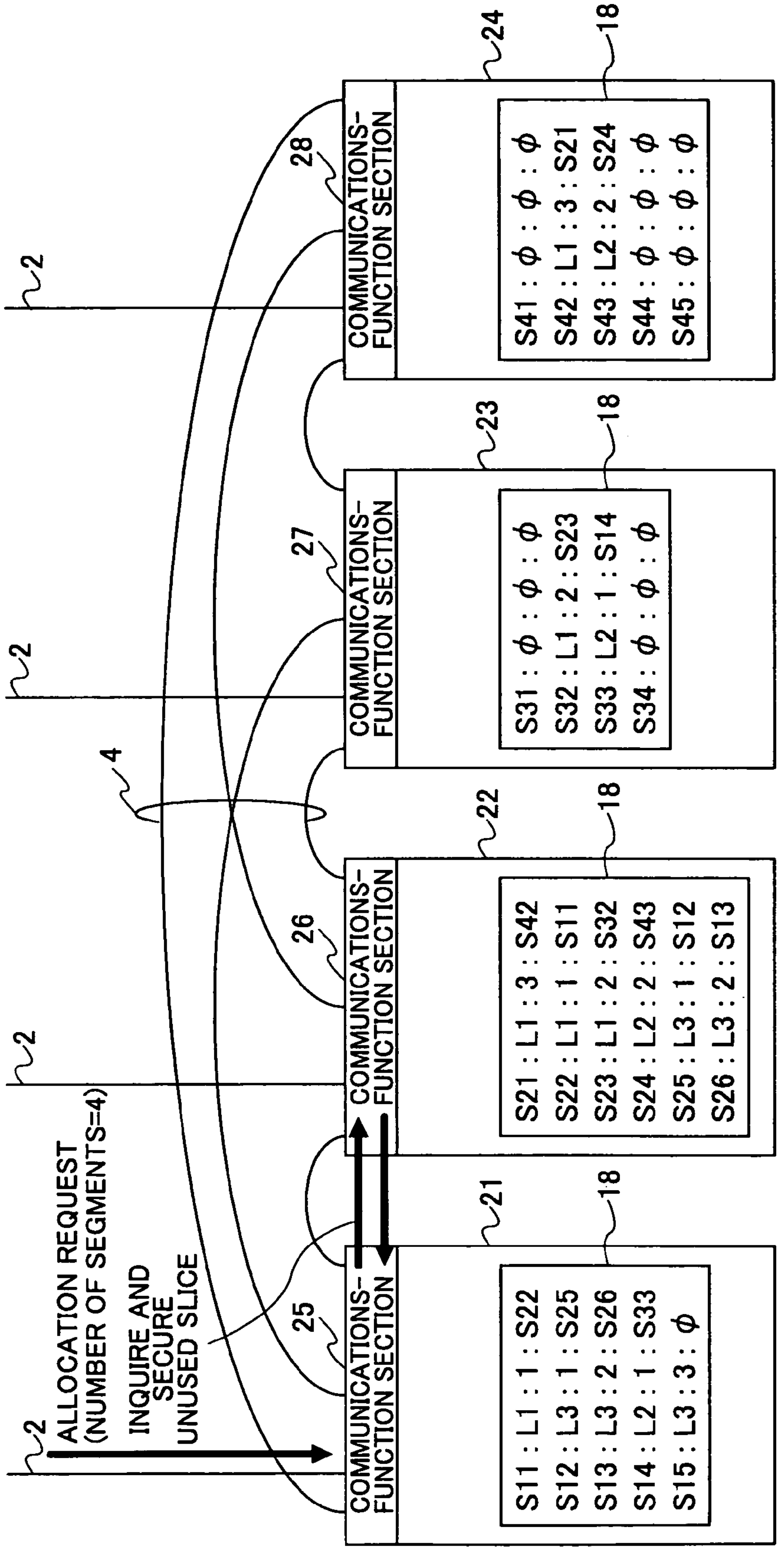
FIG. 7 (continued) shows the procedure performed when a storage system receives a logical volume allocation request from the outside.
Figure 8:
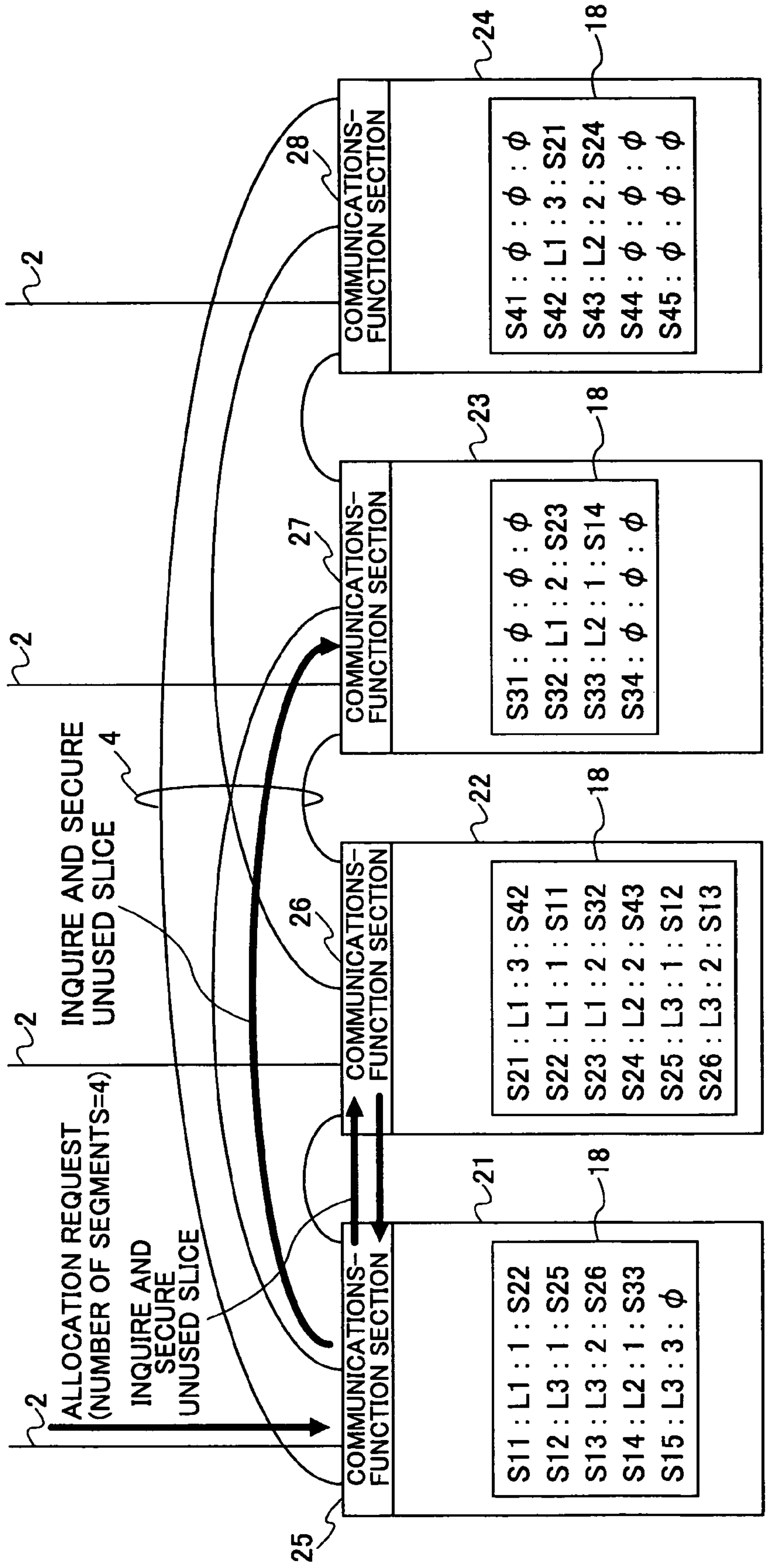
FIG. 8 (continued) shows the procedure performed when a storage system receives a logical volume allocation request from the outside.

The module B12, having two unused slice areas S25 and S26, sends a response to the module A11 to report that the slice areas S25 and S26 are allocated for the segment 1 and segment 2 of the logical volume L3. The module A11 replicates the data element stored in the slice area S12 to the slice area S25, and replicates the data element stored in the slice area S13 to the slice area S26. Thus, the slice areas S12 and S25 form a segment and the slice areas S13 and S26 form another segment (FIG. 7).

Figure 9:
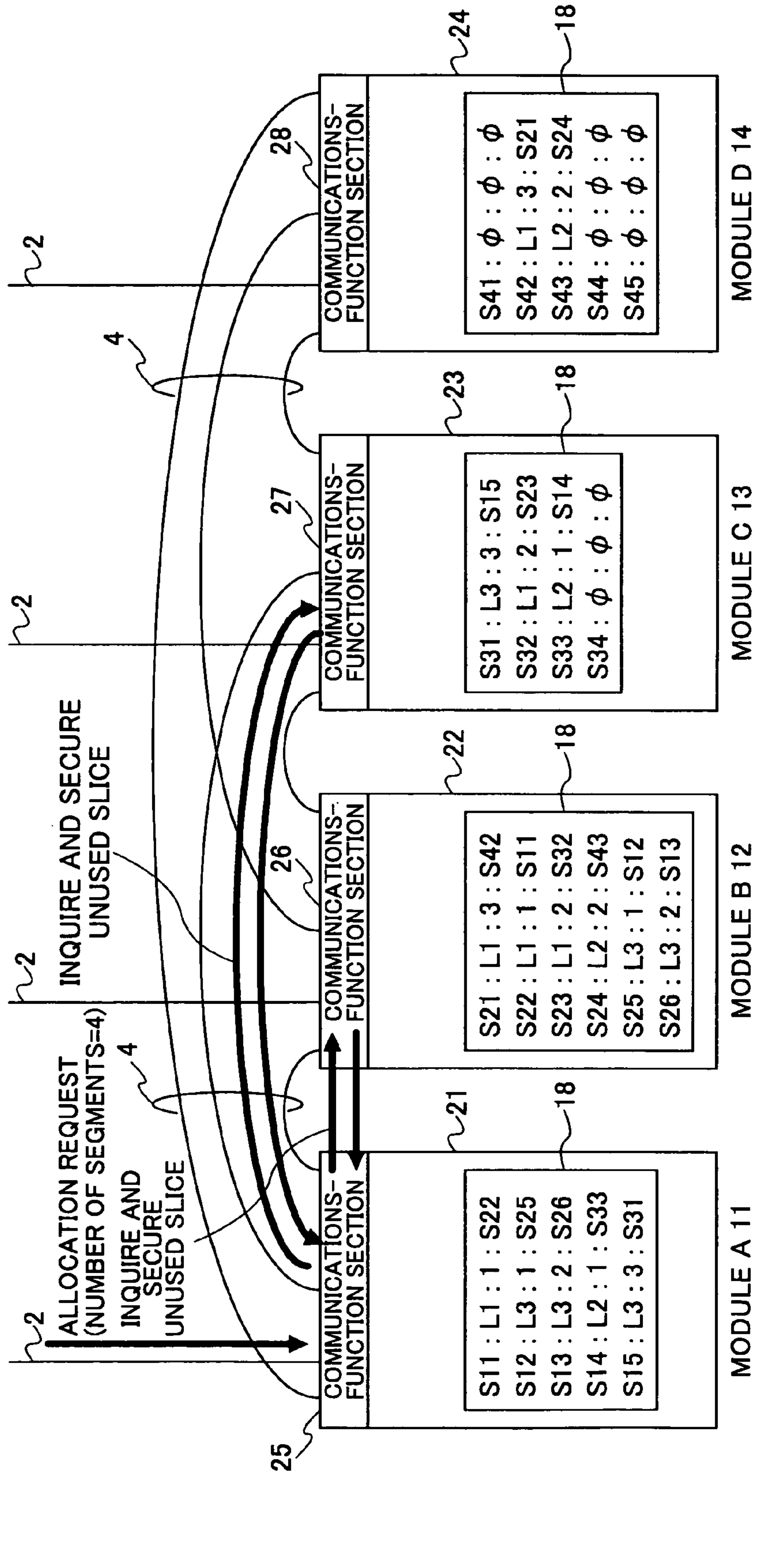
FIG. 9 (continued) shows the procedure performed when a storage system receives a logical volume allocation request from the outside.

As the module A11 still needs another slice area for forming a segment, the module A11 sends a query and a request to the module C13 (FIG. 8) as in the case of the module B12. The module C13, having two unused slice areas S31 and S34, secures only the slice area S31 because the module A11 needs only one slice area. Then, as shown in FIG. 9, the module C13 sends a response to the module A11 to report that the slice area S31 is allocated for the segment 3. The module A11 replicates the data element stored in the slice area S15 to the slice area S31, so that the slice areas S15 and S31 form a segment.

After that, because the module A11 cannot secure the number of unused slice areas therein corresponding to the number of slice areas of the logical volume L3, the module A11 requests the module B12 to allocate the logical volume L3. However, the module B12 does not have any more unused slice areas, so the logical volume allocation request is submitted to the module C13.

The module C13 allocates the slice area S34, which is still unused, for the logical volume L3. Then, the module C13 sends a query for slice area availability to the module D14 and requests the module D14 to secure an unused slice area in order to form a segment. The module D14, having three unused slice areas, sends a response to the module C13 to report that the slice area S41, which is one of the unused slice areas, is allocated for a segment 4.

Figure 10:
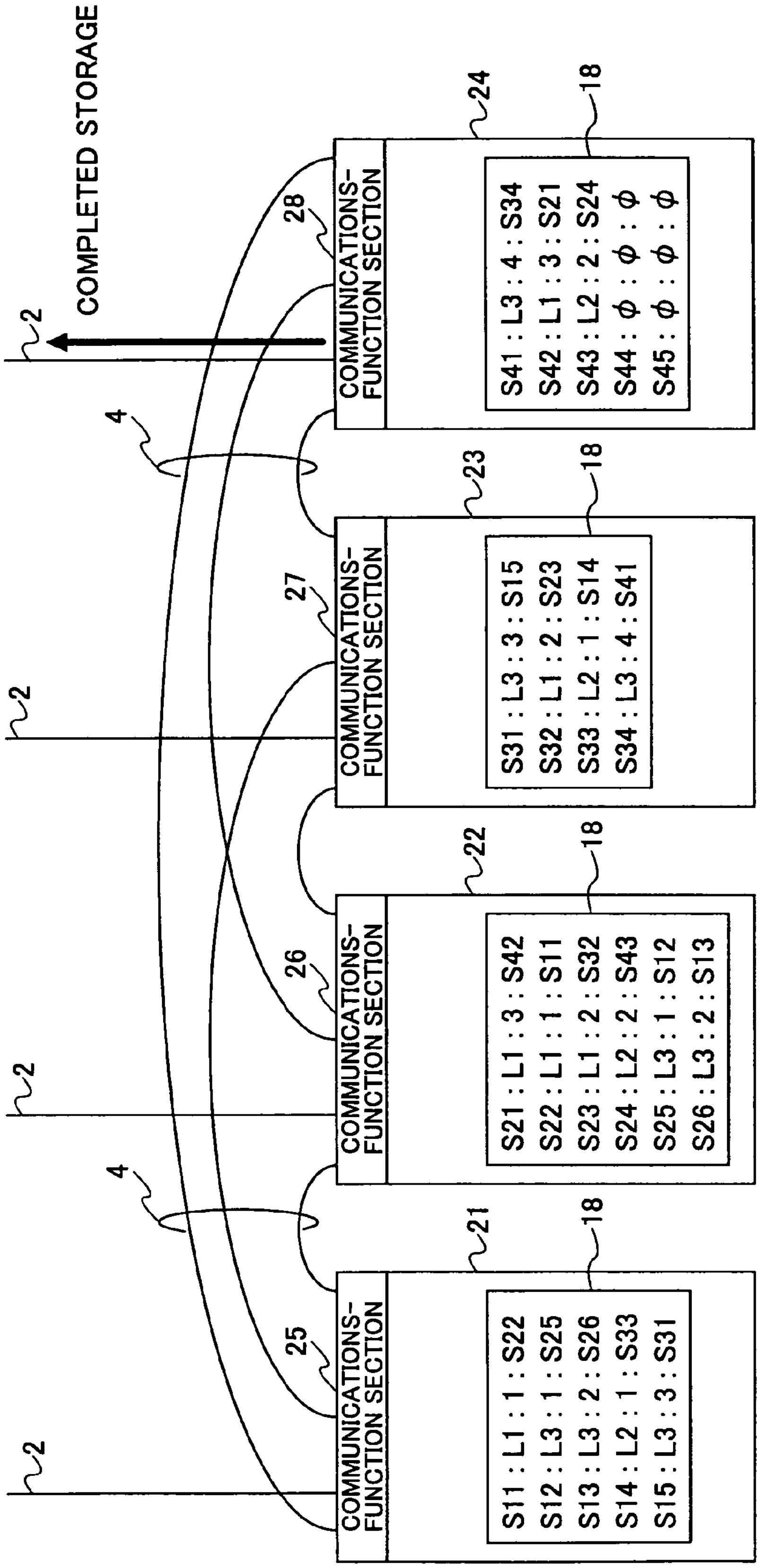
FIG. 10 (continued) shows the procedure performed when a storage system receives a logical volume allocation request from the outside.

The module C13 replicates a data element stored in the slice area S34 into the slice area S41. Thus, the slice areas S34 and S41 form the segment 4 as shown in FIG. 10. The number of the segments required for the logical volume L3 are secured in this way, and then the module D14 sends a response to the source of the request to report that the allocation is completed.

The response to the source of the request does not have to be sent by the module D14, and the module A11 may alternatively send the response to the source of the request after receiving a completion report from the module D14.

With this procedure, data redundancy is provided by duplicating the stored data while improving usage efficiency of the respective storage devices of the modules.

In this example, the slice areas required for allocating the logical volume can be secured. However, if there are not enough slice areas and therefore the logical volume allocation fails, a module that has received the logical volume allocation request or a module that has received a query may send an allocation abort request to the source of the request. Then, the slice areas that have been secured are released to be used for other logical volumes. While the above example only describes requests for logical volume allocation requests for data addition, deletion and change can be processed in the same manner.

Figure 11:
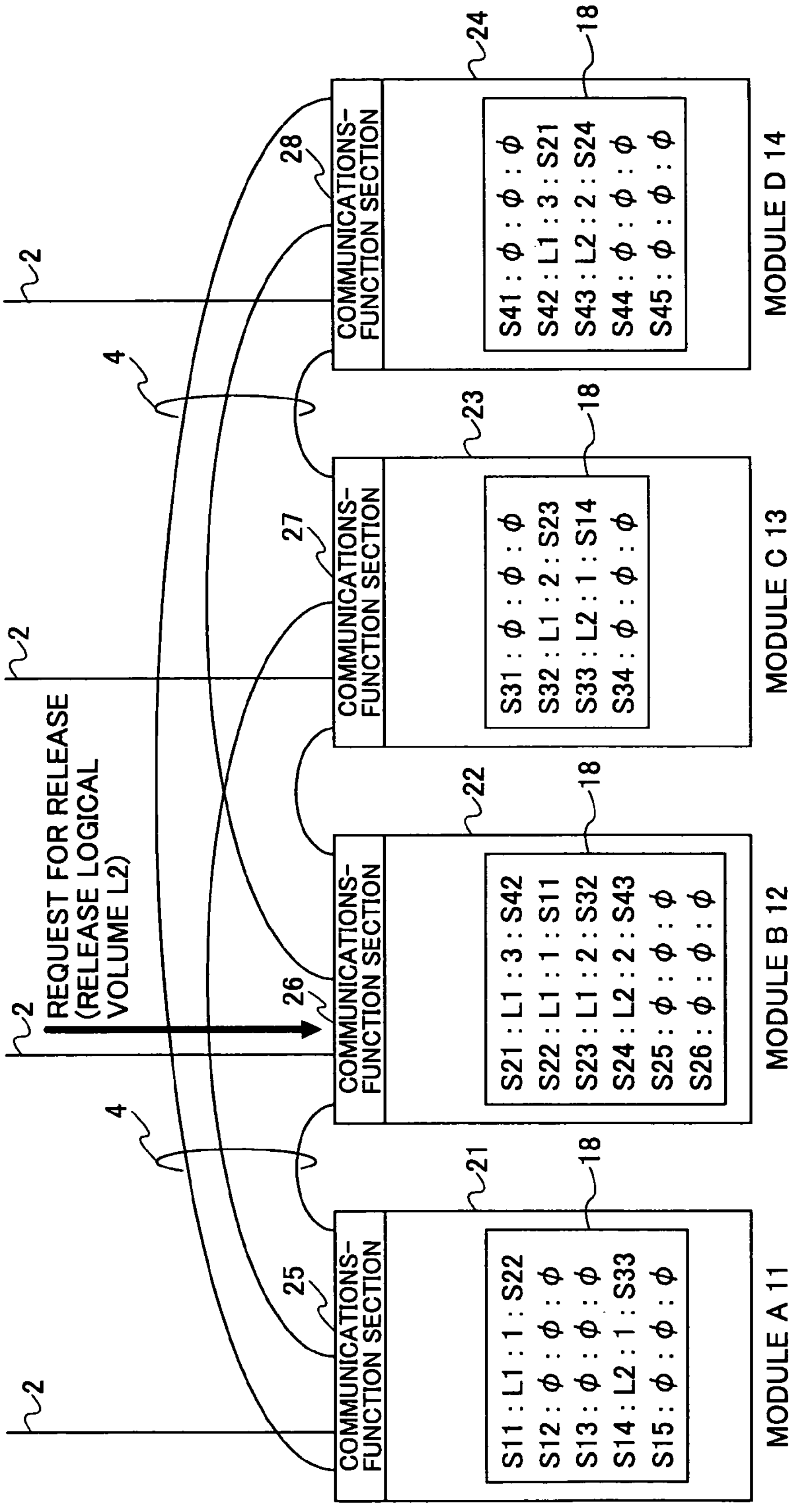
FIG. 11 shows operations conducted upon reception of a release request while a storage system is in operation.
Figure 12:
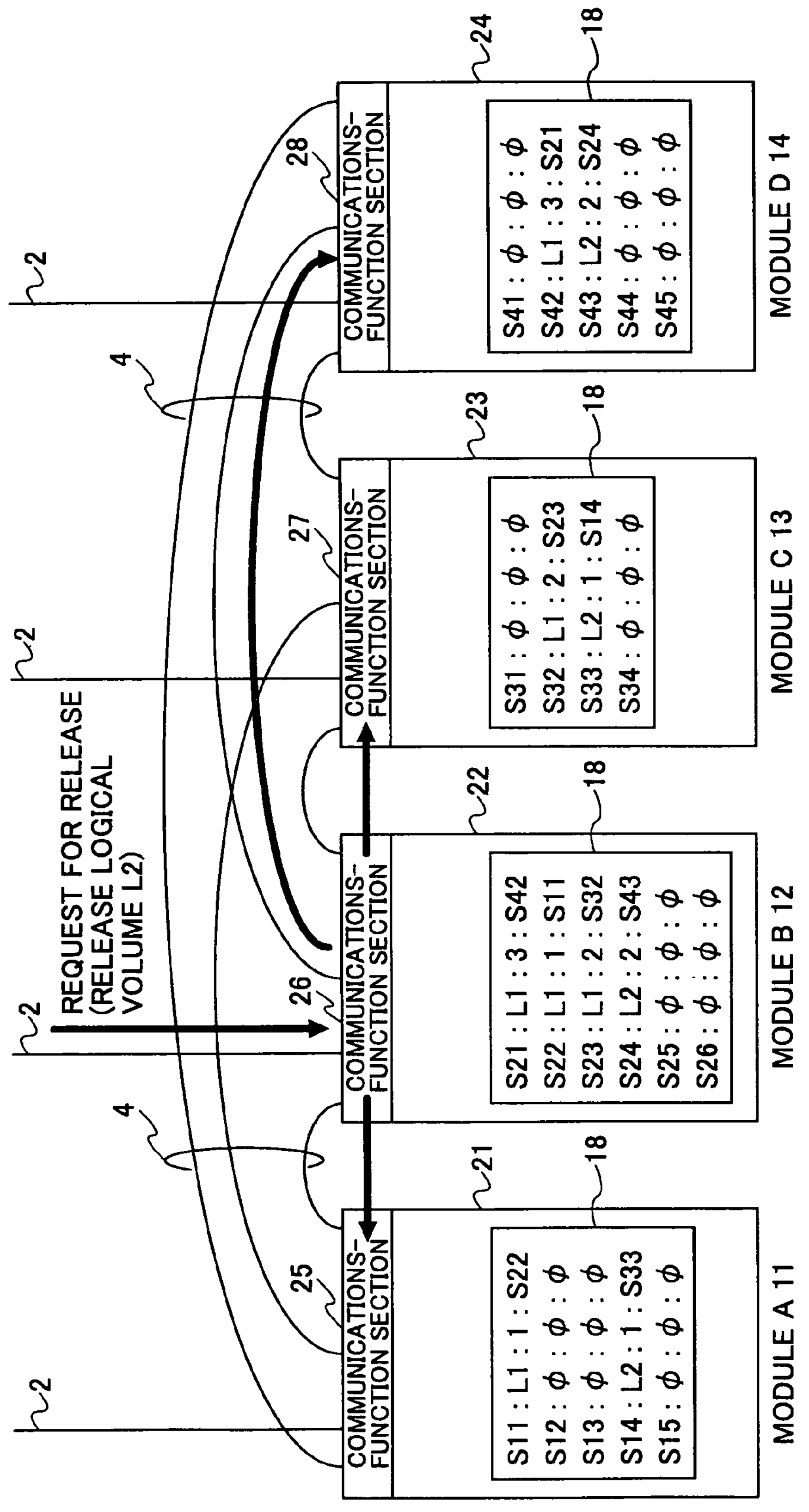
FIG. 12 (continued from FIG. 11) shows the operations conducted upon reception of a release request while a storage system is in operation.
Figure 13:
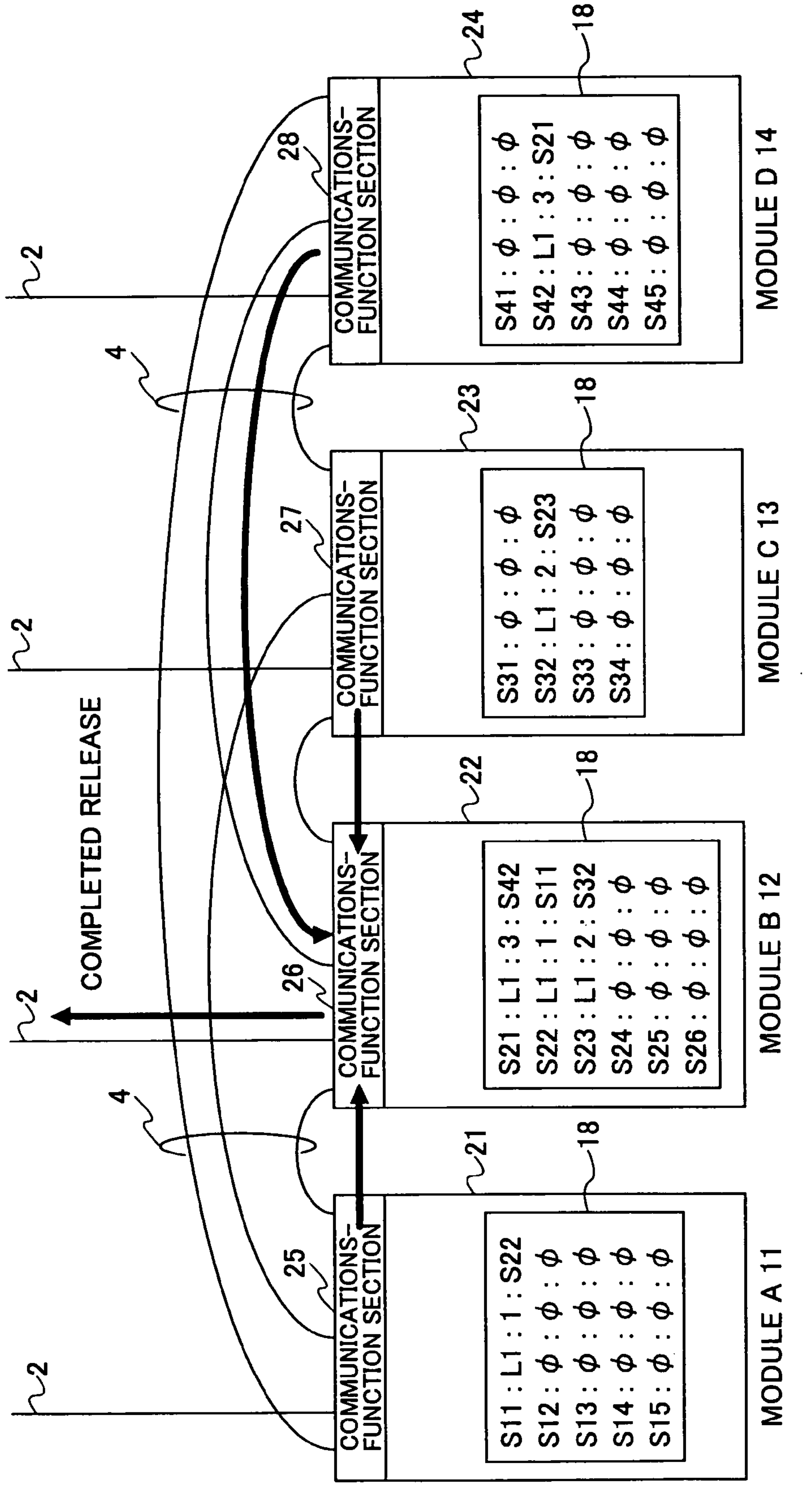
FIG. 13 (continued) shows the operations conducted upon reception of a release request while a storage system is in operation.

FIGS. 11 through 13 shows operations conducted upon reception of a release request while a storage system is in operation.

The storage system shown in FIGS. 11 through 13 comprises modules A11, B12, C13, and D14, which respectively include communications-function sections 25 through 28. Each of the storage devices 21 through 24, which are respectively included in the modules A11 through D14, comprises a data storage section 8 having plural slice areas 15 and a control-information storage section 18, although the data storage section 8 is not shown for the sake of simplicity.

Referring to FIG. 11, the module B12 receives a request for release of a logical volume L2. Then, as shown in FIG. 12, the module B12 sends instructions for releasing the logical volume L2 to the other modules A11, C13 and D14. Each of the modules that have received the instructions finds slice areas allocated for the logical volume L2 with reference to information stored in the control-information storage section 18 provided therein. Thus, data elements stored in slice areas S14, S24, S33, S43 allocated for the logical volume L2 are removed as shown in FIG. 13, and the modules A11, C13 and D14 report to the module B12 that data release is completed. The module B12 then sends a response to the source of the request to report that the request is satisfied.

The next example illustrates how all the data stored in a module are transferred.

Figure 14:
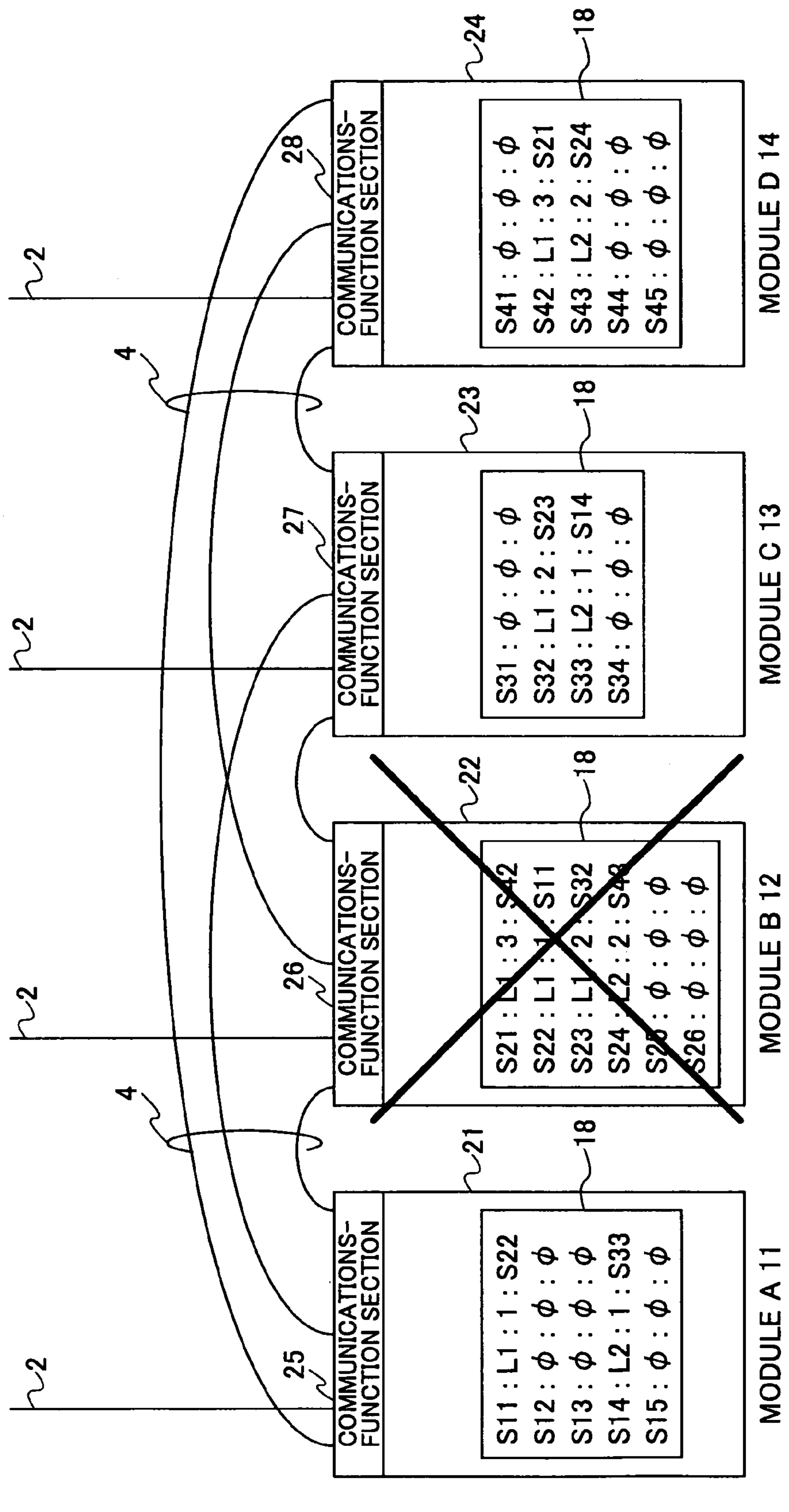
FIG. 14 shows an example of a procedure performed when one of the modules in a storage system fails.
Figure 15:
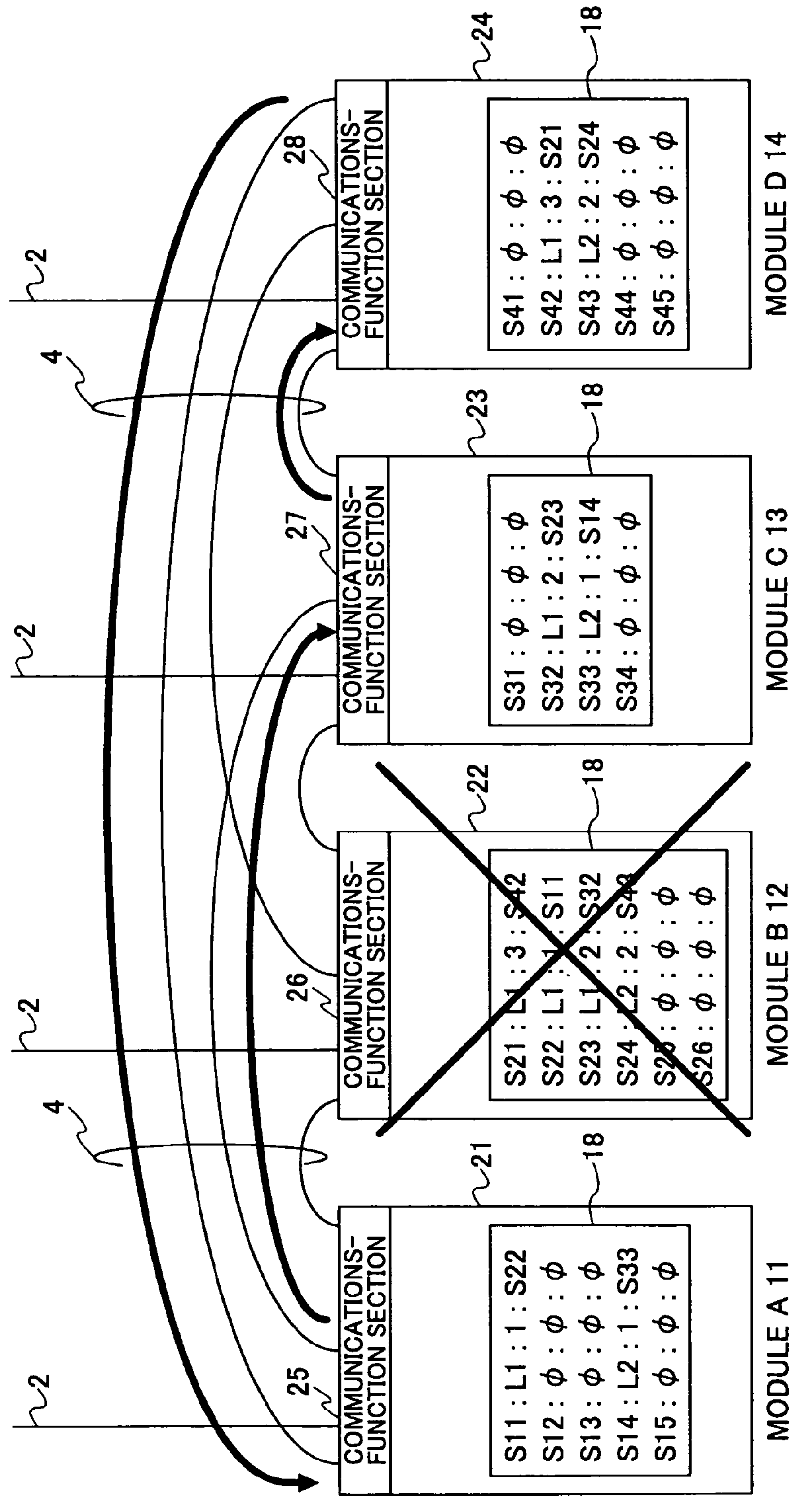
FIG. 15 (continued from FIG. 14) shows the procedure performed when one of the modules in a storage system fails.
Figure 16:
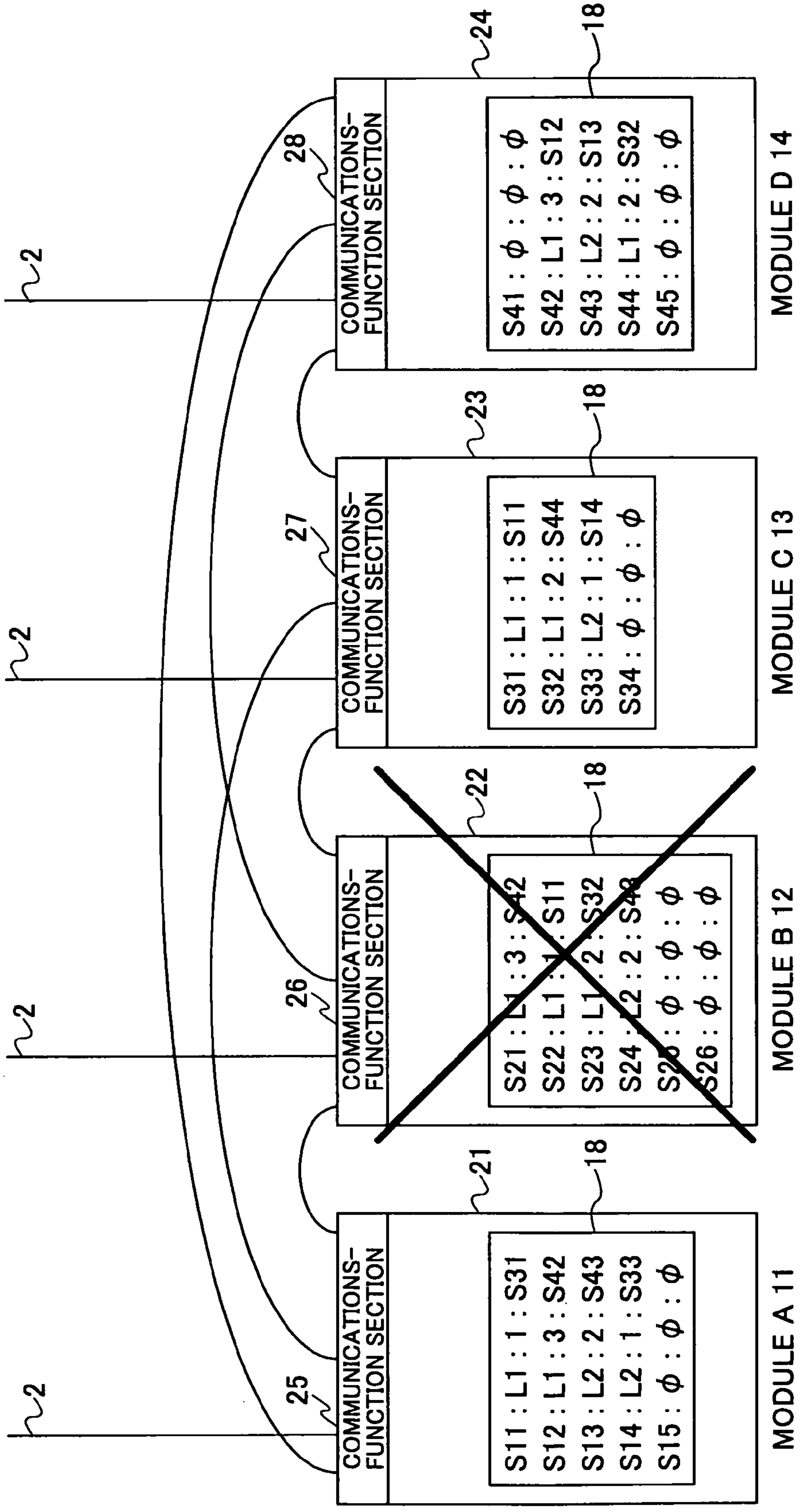
FIG. 16 (continued) shows the procedure performed when one of the modules in a storage system fails.

FIGS. 14 through 16 show an example of a procedure performed when one of the modules in a storage system fails.

The storage system shown in FIGS. 14 through 16 comprises modules A11, B12, C13, and D14, which respectively include communications-function sections 25 through 28. Each of the storage devices 21 through 24, which are respectively included in the modules A11 through D14, comprises a data storage section 8 having plural slice areas 15 and a control-information storage section 18, although the data storage section 8 is not shown for the sake of simplicity.

With reference to FIG. 14, when the module B12 fails, the other modules A11, C13 and D14 recognize the failure by some kind of method. The modules A11, C13 and D14 detect slice areas S11, S32, S42 and S43 forming segments with slice areas belonging to the module B12 based on information stored in the corresponding control-information storage sections 18. Since new segments need to be formed with the slice areas S11, S32, S42 and S43, the module A11 secures an unused slice area in the module C13. Likewise, the module C13 secures an unused slice area in the module D14, and the module D14 secures unused slice areas in the module A11 (FIG. 15). Thus, the slice area S11 forms a segment with a slice area S31; the slice area S32 forms a segment with a slice area S44; the slice area S42 forms a segment with a slice area S12; and the slice area S43 forms a segment with a slice area S13.

Then, as shown in FIG. 16, data elements stored in the slice areas S11 in the module A11, the slice area S32 in the module C13, and the slice areas S42 and S43 in the module D14 are replicated into corresponding slice areas for forming segments. When the data duplication is completed, control information stored in each of the control-information storage sections 18 is determined.

With a following procedure, requests to release data in a predetermined module are satisfied without losing redundancy of data stored in modules.

Figure 17:
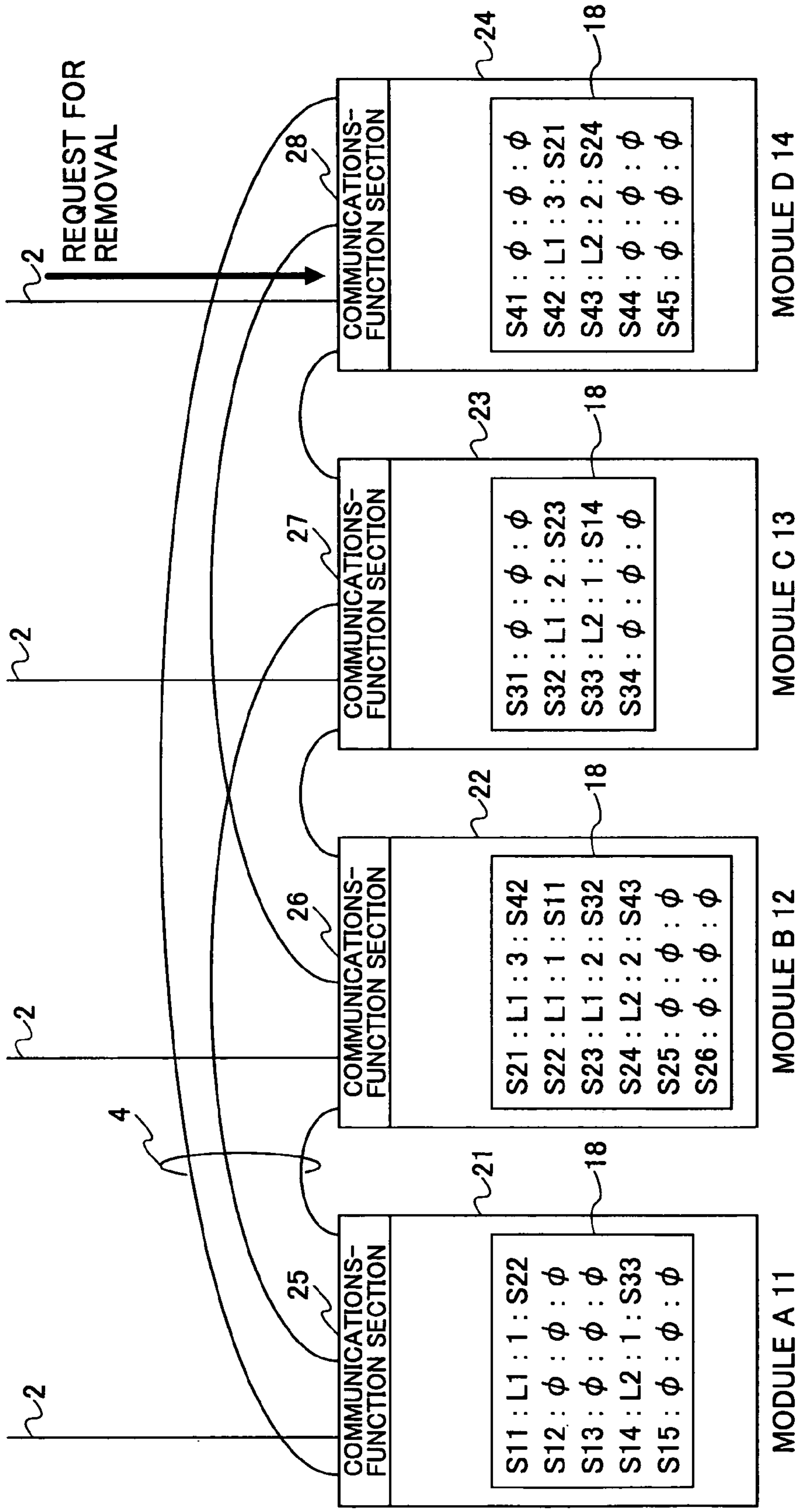
FIG. 17 shows an example of a procedure for removing one of the modules in a storage system.
Figure 18:
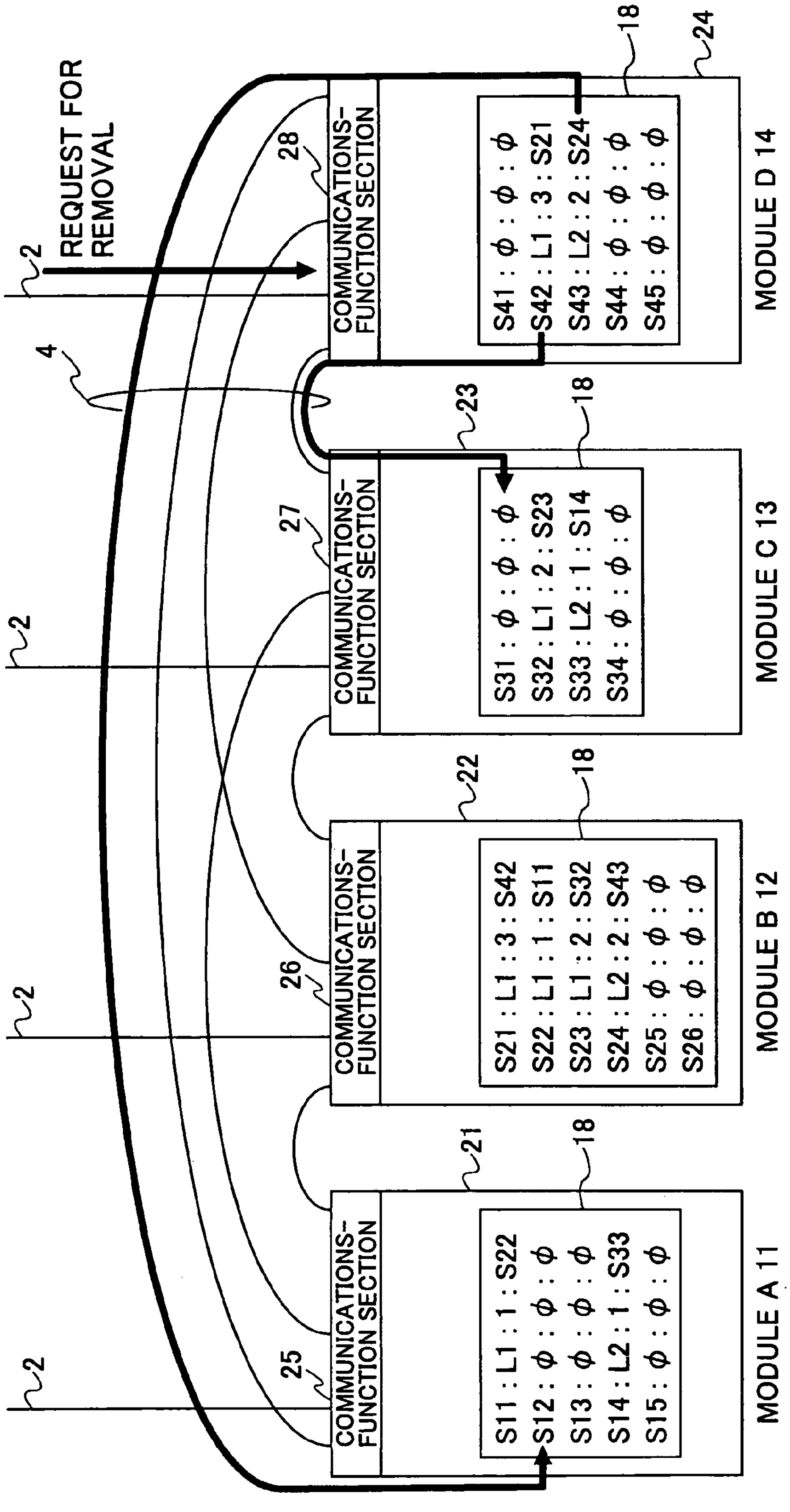
FIG. 18 (continued from FIG. 17) shows the procedure for removing one of the modules in a storage system.
Figure 19:
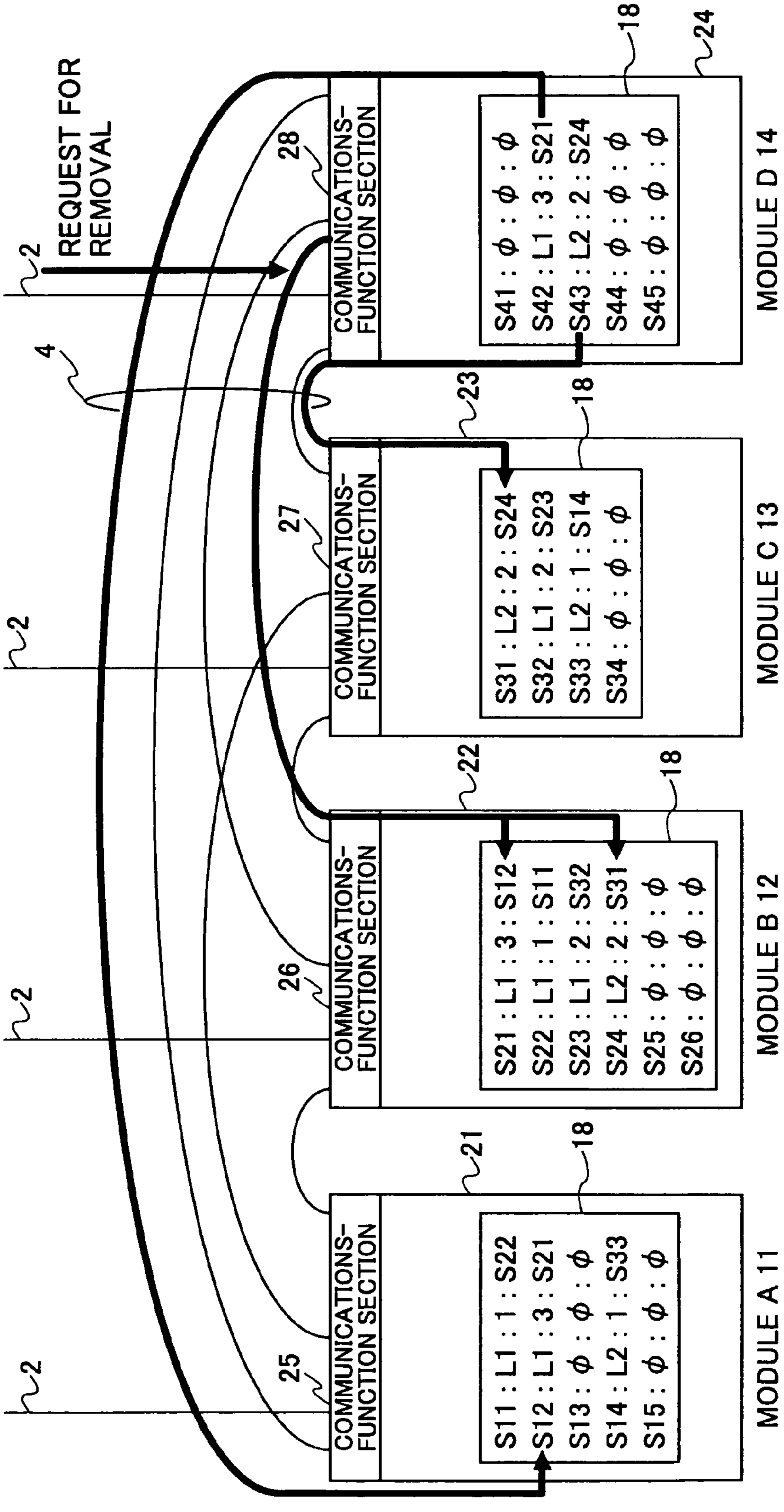
FIG. 19 (continued) shows the procedure for removing one of the modules in a storage system.

FIGS. 17 through 19 show an example of a procedure for removing one of the modules in a storage system.

The storage system shown in FIGS. 17 through 19 comprises modules A11, B12, C13, and D14, which respectively include communications-function sections 25 through 28. Each of the storage devices 21 through 24, which are respectively included in the modules A11 through D14, comprises a data storage section 8 having plural slice areas 15 and a control-information storage section 18, although the data storage section 8 is not shown for the sake of simplicity.

With reference to FIG. 17, when the module D14 receives a removal request, the module D14 finds destinations to which data elements stored in slice areas S42 and S43 are to be transferred. In other words, the module D14 finds slice areas that can replace the slice areas S42 and S43 to form new segments with slice areas S21 and S24. In this case, the module B12 is not appropriate as the destination because the slice areas S21 and S24 in the module B12 respectively form the segments with the slice areas S42 and S42 in the module D14.

Therefore, as shown in FIG. 18, the destinations of the data elements stored in the slice areas S42 and S43 are respectively found in the module A11 and the module C13. The data element stored in the slice area S42 is replicated to a slice area S31, and the data element stored in the slice area S43 is replicated to a slice area S12.

When the duplication is completed, as shown in FIG. 19, the module D14 reports these changes in segment configurations to the modules A11, C13 and B12. Thus, the module D14 becomes ready to be removed. Each of the control-information storage sections 18 in the module A11, B12 and C13 updates control information stored therein.

With this procedure, requests to remove a module are satisfied without losing the redundancy of data stored in modules.

Figure 20:
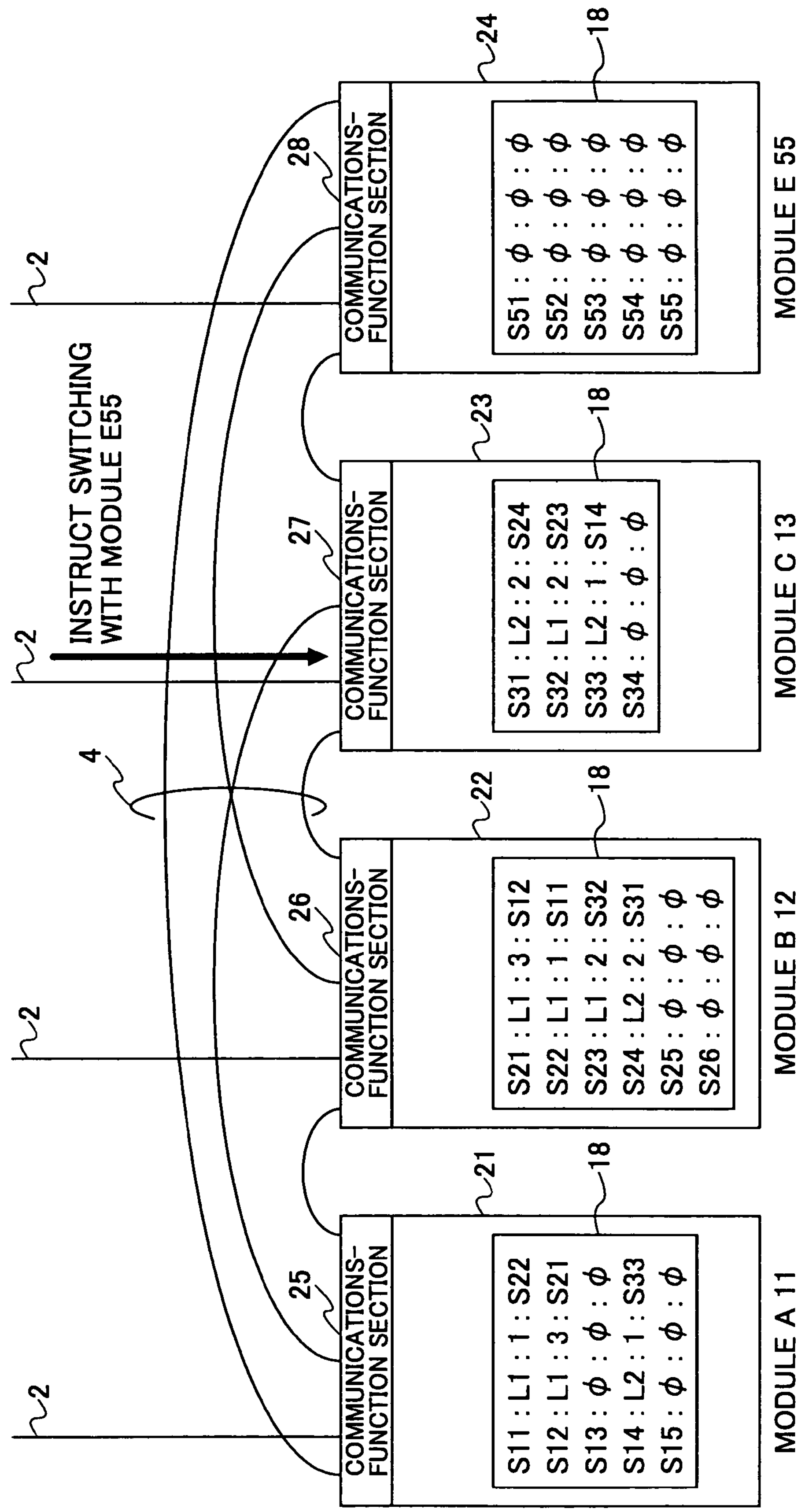
FIG. 20 shows an example of a procedure for substituting one of the modules in a storage system with another module.
Figure 21:
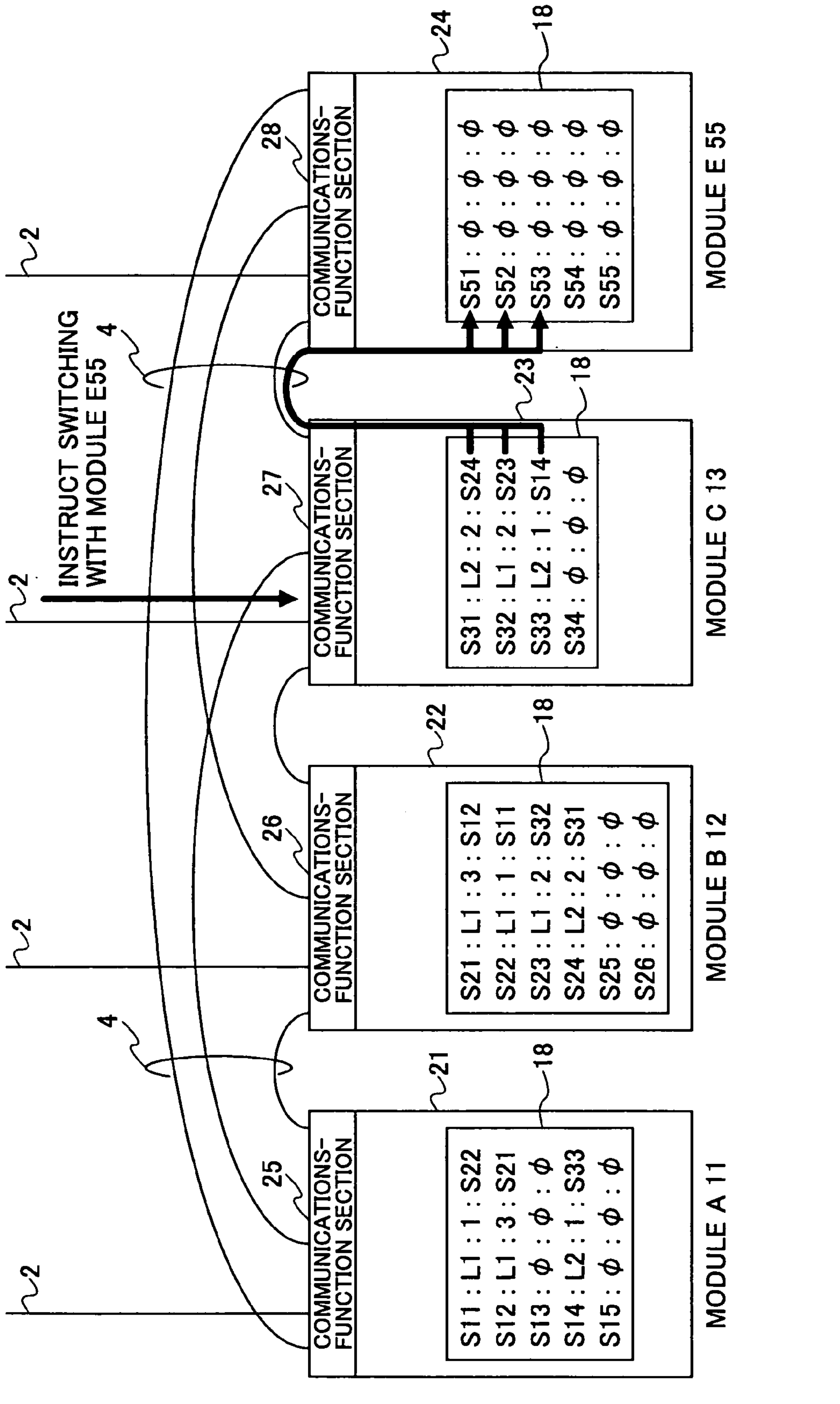
FIG. 21 (continued from FIG. 20) shows the procedure for substituting one of the modules in a storage system with another module.
Figure 22:
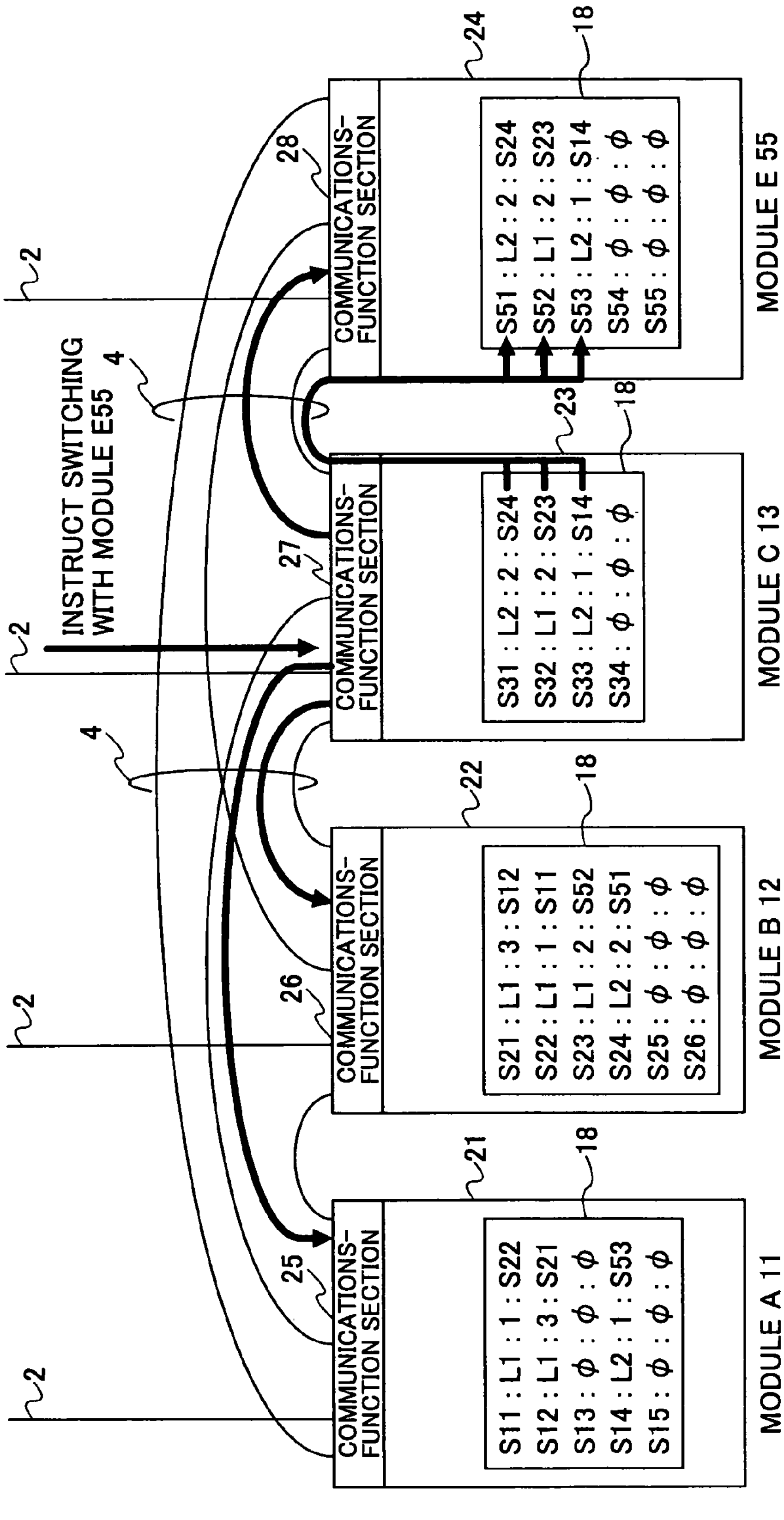
FIG. 22 (continued) shows the procedure for substituting one of the modules in a storage system with another module.

FIGS. 20 through 22 show an example of a procedure for substituting one of the modules in a storage system with another module.

In this example, after removing a module D14, a module E55 is newly added and data stored in a module C13 are transferred to the module E55. Operations for removing the module D14 are the same operations described with reference to FIGS. 17 through 19, and therefore are not described herein.

The storage system shown in FIGS. 20 through 22 comprises the modules A11, B12, C13 and D14. The module D14 is removed and the module E55 is added in place of the module D14. The modules A11, B12, C13 and E55 respectively include the communications-function sections 25 through 28. Each of storage devices 21 through 24, which are respectively included in the modules A11 through E55, comprises a data storage section 8 having plural slice areas 15 and a control information storage section 18, though the data storage section 8 is not shown for the sake of simplicity.

Referring to FIG. 20, the addition of the new module E55 is completed, and, for example, the module C13 receives an instruction to be replaced by the module E55.

When the module C13 receives the replacement instruction, the module C13 secures three slice areas to which data elements in the module C13 can be transferred as shown in FIG. 21. When the slice areas are secured, the module C13 replicates the data elements stored in slice areas S31, S32 and S33 to slice areas S51, S52 and S53, respectively as shown in FIG. 22. When the duplication is completed, the module C13 updates information stored in the control-information storage sections 18 in the module A11 and the module B12 to which slice areas forming segments with the slice areas S31, S32 and S33 belong. Thus, all the data elements stored in the module C13 are transferred to the module E55, and the module C13 is removed to complete the replacement.

With this procedure, module replacement is performed without losing the redundancy of the data stored in the modules.

The next example illustrates how to update control information stored in a control-information storage section.

Figure 23:
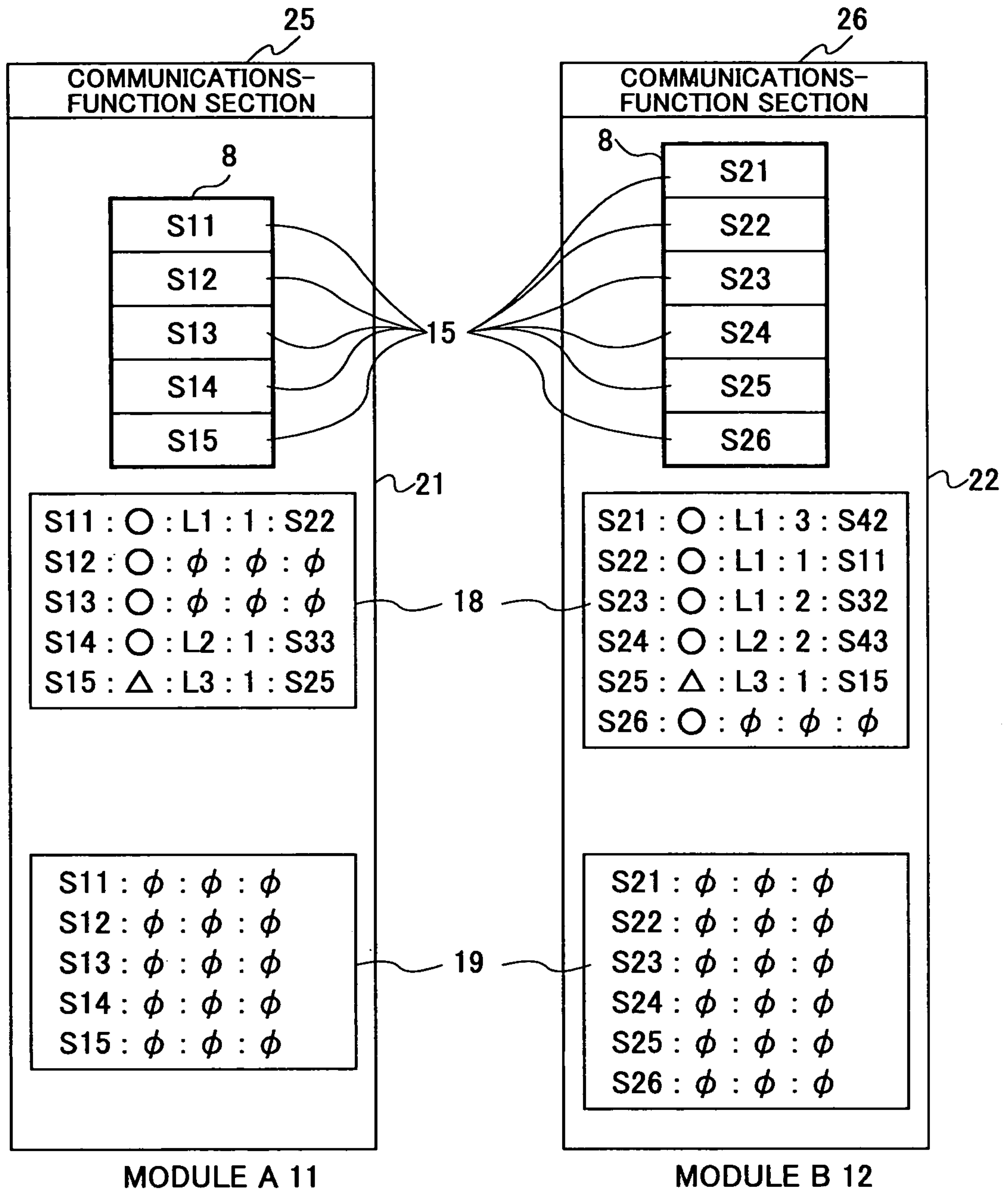
FIG. 23 shows an example of a procedure for updating control information stored in a module.
Figure 24:
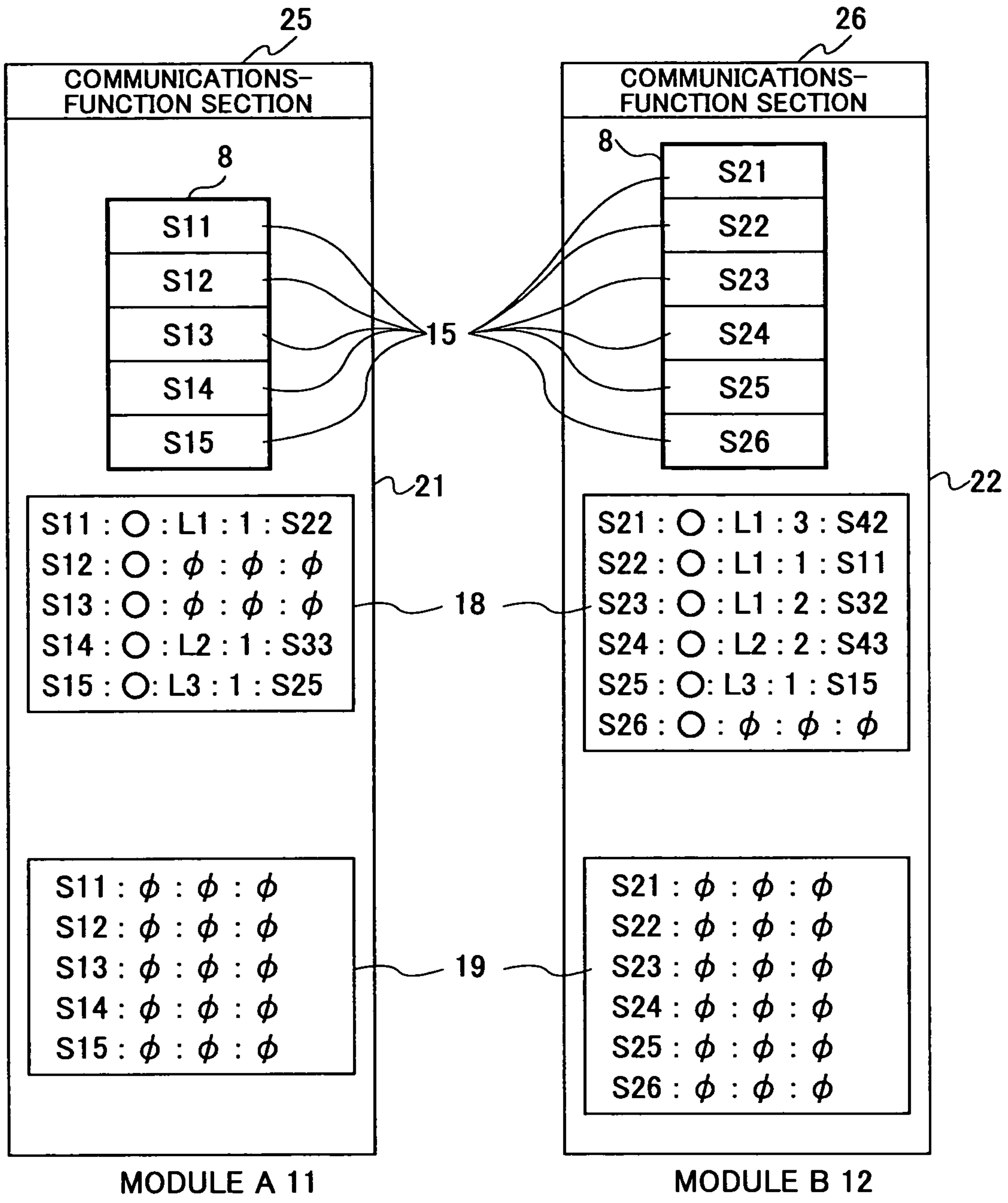
FIG. 24 (continued from FIG. 23) shows the procedure for updating control information stored in a module.
Figure 25:
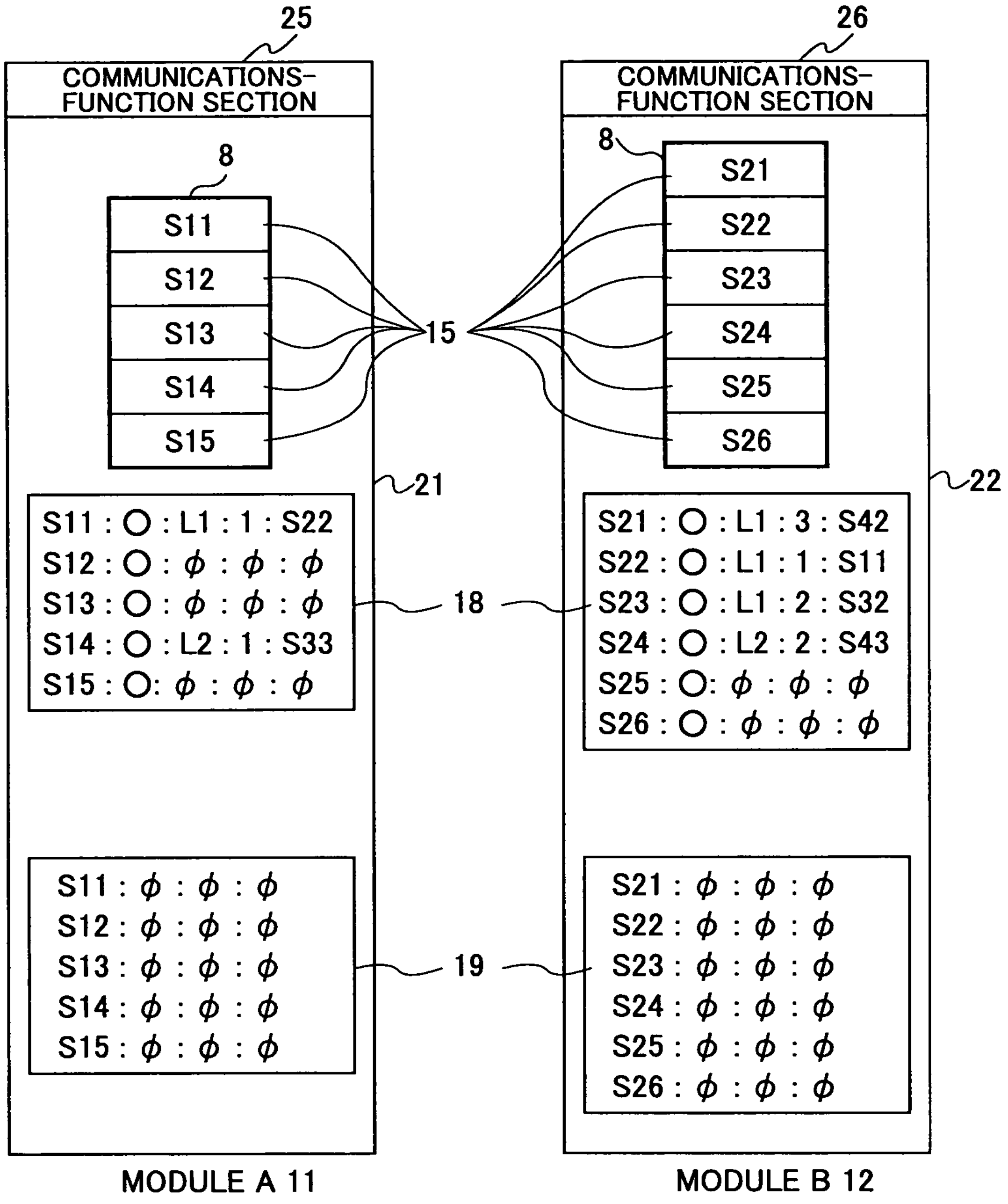
FIG. 25 (continued) shows the procedure for updating control information stored in a module.

FIGS. 23 through 25 show an example of a procedure for updating control information stored in a module.

FIGS. 23 through 25 show only modules A11 and B12 out of plural modules provided in a storage system in order to simplify the explanation.

The modules A11 and B12 are connected one-to one via a communication line to communicate with each other using respective communications-function sections 25 and 26. Each of the storage devices 21 and 22, which are respectively included in the module A11 and the module B12, comprises a data storage section 8 having plural slice areas 15 and a control-information storage section 18. The control-information storage section 18 stores control information containing the name of a logical volume Ln, a data allocation position n on the logical volume, a slice area 15 belonging to the same segment in a different module and, in addition, update processing information indicating whether the stored control information is still in update processing (Δ) or has already been updated (○) for each of the slice areas (S11-S15, S21-S26). Each of the storage devices 21 and 22 also includes an information-before-processing storage area 19 for temporarily storing control information before update processing in case of unexpected events that might occur during the update processing.

Referring to FIG. 23, slice areas S15 and S25 in the module A11 and B12 bear symbols Δ as they are being updated.

The information-before-processing storage areas 19 may be incorporated in the slice areas 15 in the corresponding storage devices 21 and 22, or may be independently provided.

On receiving an update completion request, the modules A11 and B12 determine the control information and changes the update processing information for the slice areas S15 and S25 in the control information storage sections 18 to indicate "updated" (○) as shown in FIG. 24.

If the modules A11 and B12 receive an update abort request during the update processing, the control information temporarily stored in the information-before-processing storage areas 19 is copied to recover the control information existing before the update processing, and the update processing information for the slice areas S15 and S25 in the control information storage sections 18 is changed to indicate "updated" (○) as shown in FIG. 25.

Although only one series of update processing is conducted herein, plural series of update processing may be simultaneously conducted using identifiers in place of the symbols ○ and Δ.

The next example illustrates how to send and receive state information of the modules.

Figure 26:
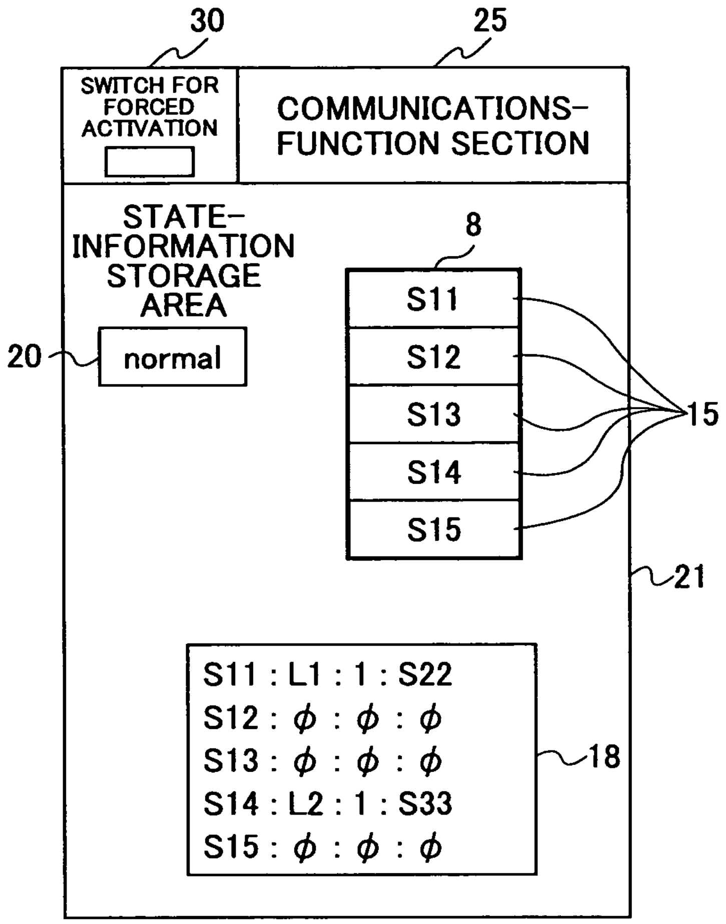
FIG. 26 shows one module out of plural modules provided in a storage system.
Figure 27:
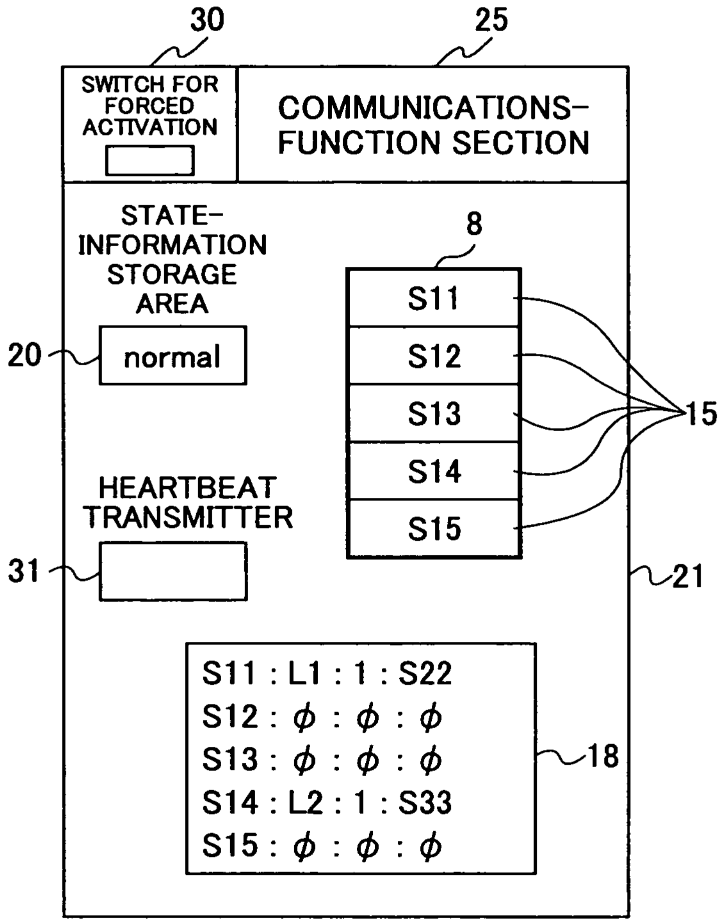
FIG. 27 (continued from FIG. 26) shows one module out of plural modules provided in a storage system.

FIGS. 26 and 27 show only a module A11 out of plural modules provided in a storage system.

Referring to FIG. 26, the module A11 comprises a switch 30 used for a forced activation of the module A, in addition to a communications-function section 25 and a storage device 21. The storage device 21 includes state information storage area 20 for storing information indicating a state of the module A11 when the module A11 has terminated operations, in addition to a data storage section 8 having plural slice areas 15 and a control-information storage section 18. The information stored in the state information storage area 20 indicates "normal" when the operations are successfully terminated, and indicates "abnormal" when the operations are forcibly terminated due to accidents such as a power interruption during operation. The module A11 is configured to determine whether to start activation with reference to the information stored in the state information storage area 20. Because the module A11 can be forcibly activated by operating the switch 30, an operator can activate the module A11 even after suffering from an accident.

The storage device 21 in the module A11 shown in FIG. 27 comprises a heartbeat transmitter 31 for sending the state information of the module A11 to other modules via the communications-function section 25 in addition to those components shown in FIG. 26. The heartbeat transmitter 31 serves to report that the module A11 is in a normal state if there is nothing abnormal in the module A11 during activation of the module A11 or to report that an error has occurred during activation or operation of the module A11. Therefore, the other modules that have received the report from the module A11 can restore stored data or information at an early stage.

The heartbeat transmitter 31 may be configured to transmit the state information at regular intervals. With this configuration, if the state information is regularly transmitted, the other modules can know that the state is kept normal. Also, if the state information is not transmitted for a certain period, it is considered that there might be an error in the module A11 and therefore some measures can be taken for it. If the module A11 becomes unable to communicate with other modules due to a failure of the communications-function section 25 thereof or trouble in a communication line, the module A11 can shut down by itself to ensure security of all the data stored in the storage system.

(Second Embodiment)

A storage system of a second embodiment is the same as the storage system of the first embodiment except that access modules (which are described in detail below) are provided to directly access a corresponding slice area upon reception of a request for access to the storage system.

Figure 28:
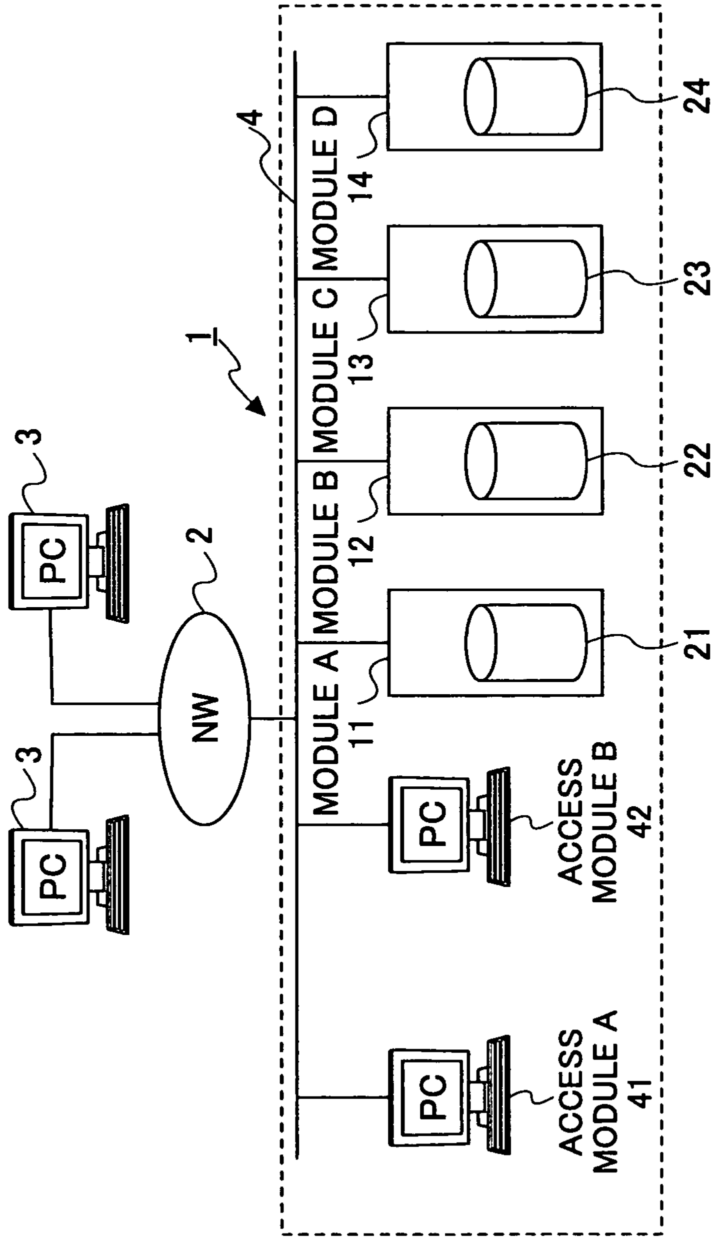
FIG. 28 is a schematic block diagram showing a configuration example of an information processing system including a storage system of a second embodiment.

FIG. 28 is a schematic block diagram showing a configuration example of an information processing system including the storage system 1 of the second embodiment.

As shown in FIG. 28, the storage system 1 is provided with a module A11 comprising a server (which may be a personal computer or a work station) having a storage device 21, a module B12 comprising a server having a storage device 22, a module C13 comprising a server having a storage device 23, a module D14 comprising a server having a storage device 24, and two access modules A41 and B42 each comprising a personal computer (referred to as "PC" hereinafter) having information for allowing direct access to a slice area in a corresponding module upon reception of a request for access to the storage system 1.

These four modules A11 through D14 are connected to a network 2 via a communication line 4. Therefore, two computers 3 connected to the network 2 can first access either one of the access modules A41 and B42 so as to access each of the modules A11 through D14 via the accessed access module.

Figure 29:
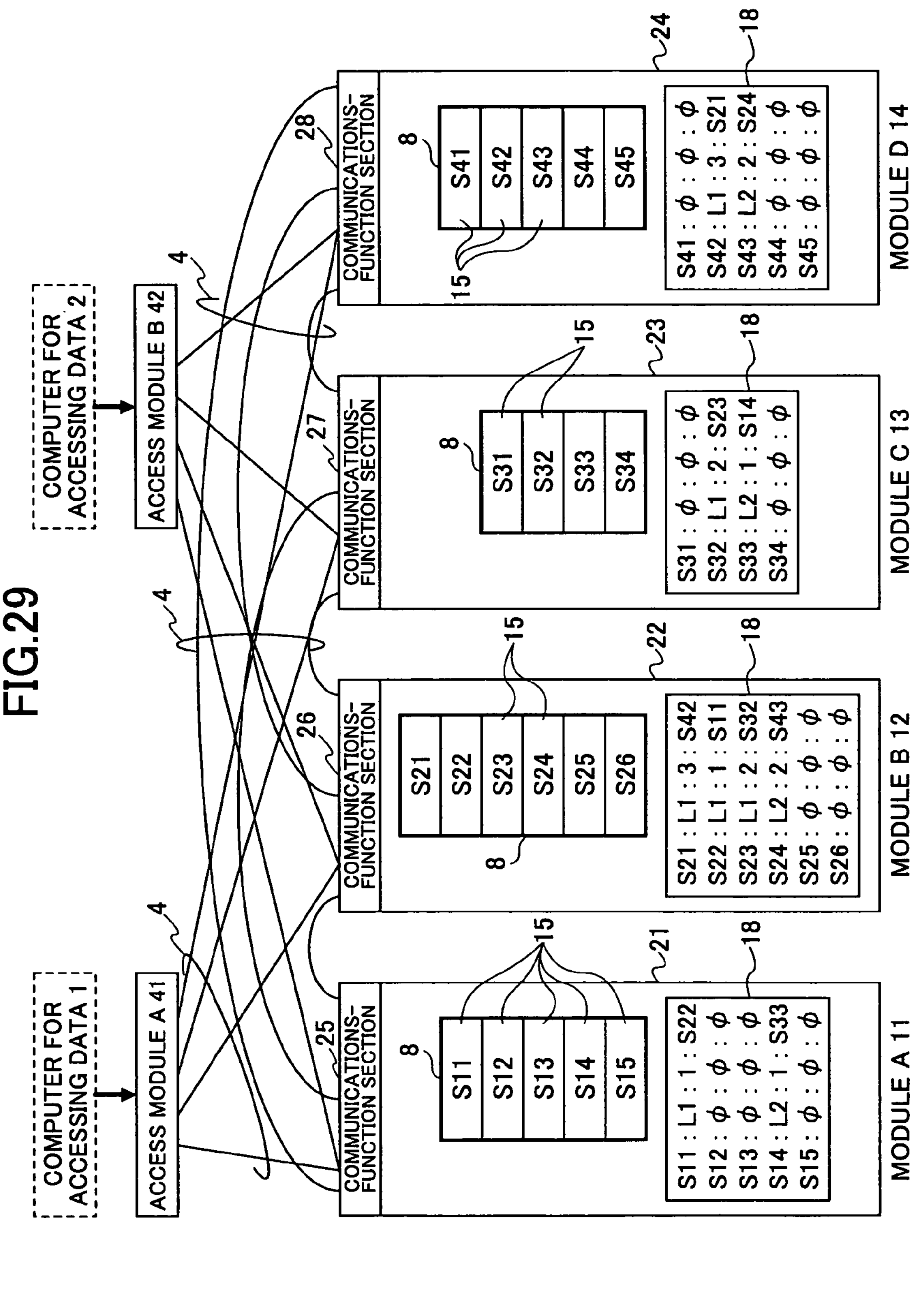
FIG. 29 is a functional block diagram of a storage system of the second embodiment.

FIG. 29 is a functional block diagram of a storage system 1 of the second embodiment.

The storage system of this embodiment is the same as the storage system 1 of the first embodiment illustrated in FIG. 3 except that access modules are provided. Therefore, elements identical to those in FIG. 3 bear the same reference numbers and are not further described.

The storage system 1 shown in FIG. 29 comprises module A11, B12, C13 and D14. The modules A11 through D14 are connected to both of two access modules A41 and B42 each comprising a PC via communications-function sections 25 through 28 included in servers respectively provided in the modules A11 through D14. The modules A11 through D14 are connected one-to-one via communication lines 4, and therefore the modules A11 through D14 can communicate with each other using the communications-function sections 25 through 28. Computers externally connected to the network 2 can directly access the desired module by accessing either one of the two access modules A41 and B42.

Each of storage devices 21 through 24 respectively included in the modules A11 through D14 comprises a data storage section 8 having plural slice areas 15 configured to store data based on a write request, and a control-information storage section 18 configured to store control information on the name of a logical volume Ln, a data allocation position n on the logical volume, and a slice area 15 belonging to the same segment in a different module for each of the slice areas (S11-S15, S21-S26, S31-S34, S41-S45).

Each of the access modules A41 and B42 comprises a table containing information on logical volume names, modules and slice areas in which data elements of the logical volumes are stored, slice areas forming segments with the slice areas, and unused slice areas in each of the modules A11 through D14. Therefore, when there is a request to add data to the slice areas 15, a request to change or delete data stored in the slice areas 15, or a request to store data in unused slice areas 15, the access modules A41 and B42 can search for and directly pass an access request to the module that can meet the request. Each of the access modules A41 and B42 may be configured to have a table containing all the information stored in the storage system. Alternatively, each of them may be configured to have a part of the information. In this case, if information that can meet a request from the outside is not contained in the table, a new table is constructed by querying the modules A11 through D14 for the information and overwriting information contained in the table while erasing unnecessary information.

As described above, since the storage system is provided with the access modules A41 and B42 having the tables to access directly the desired module with reference to the tables upon receiving an access request from the outside, the access time is reduced compared to individually accessing from the outside. While the two access modules A41 and B42 are independently operated in this embodiment, a duplex composition may be applied to improve safety.

(Third Embodiment)

A third embodiment of the present invention is the same as the first embodiment except that a storage system comprises a state-control module for controlling the state of each module and a volume-information module for reconstructing information of each logical volume of which data elements are stored across the modules, and that the storage system is operated under the initiative of the volume-information module. Therefore, the following description focuses on these differences.

Figure 30:
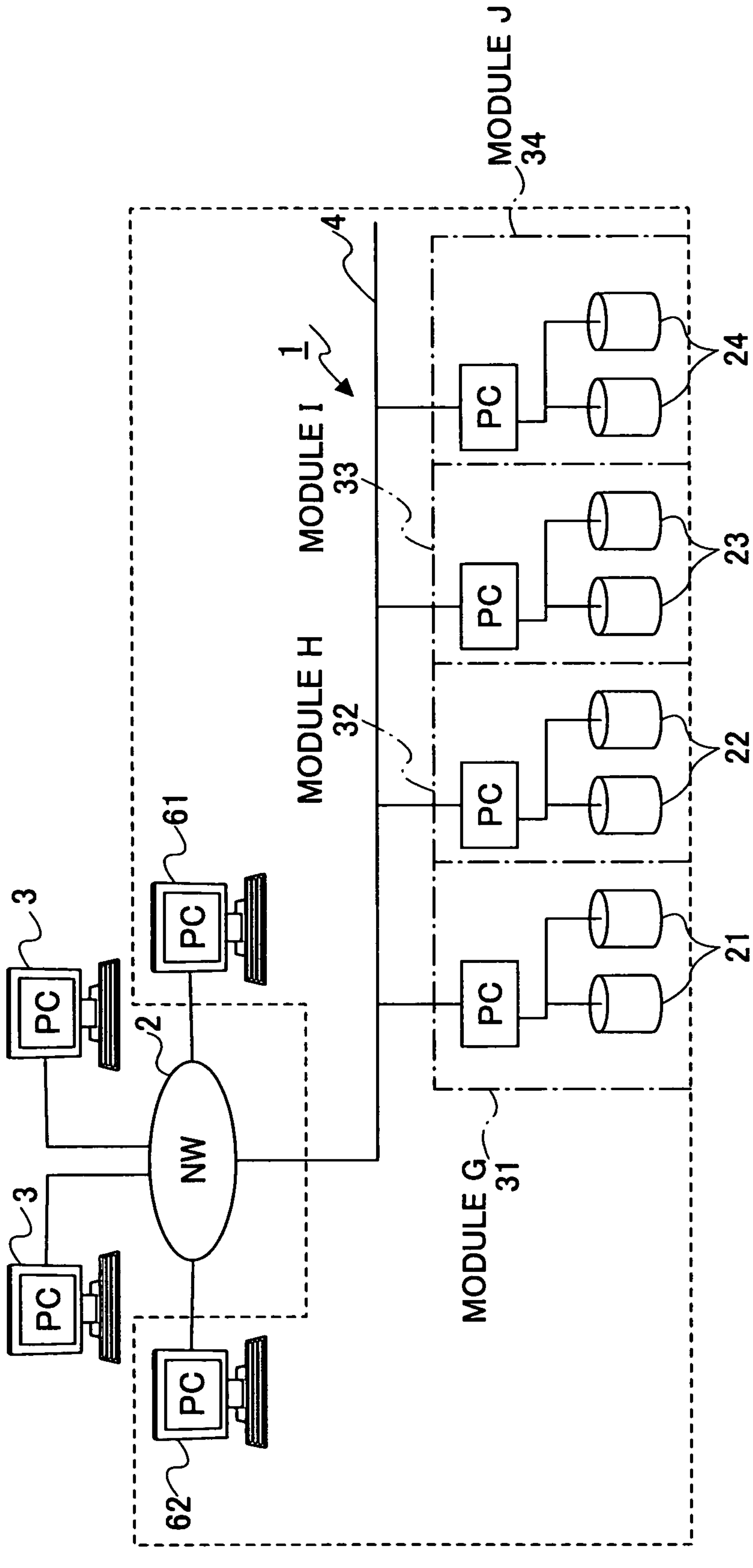
FIG. 30 is a schematic block diagram showing a configuration example of an information processing system including a storage system of a third embodiment.

FIG. 30 is a schematic block diagram showing a configuration example of an information processing system including a storage system 1 of the third embodiment.

Referring to FIG. 30, the storage system 1 is provided with four modules G31, H32, I33 and J34 each comprising a PC having a storage device. The four modules G31 through J34 are connected to a network 2 via communication lines 4. The storage system 1 is further provided with two management-control modules 61 and 62 each comprising a PC for reconstruction information of each logical volume of which data elements are stored across the modules G31 through J34 and issuing commands to the modules G31 through J34 according to the reconstructed information. The management-control modules 61 and 62 are connected to the network 2.

The management-control modules 61 and 62 have both functions of the state-control module and the volume-information module of the present invention. A dual system in which one of the management-control modules 61 and 62 monitors operations of the other management-control module may be applied. In the dual system, if one of the modules 61 or 62 fails, operations can be continued by the other module. Alternatively, a duplex system may be applied. In the duplex system, both of the modules 61 and 62 are operated simultaneously so that one of the modules 61 or 62 is used as a main module and the other module as a sub module for backup in the event of an emergency. If the dual system or the duplex system is applied to the management-control modules 61 and 62, safety of the management-control functions of the storage system 1 can be improved.

While functions of the state-control module and the volume-information module are integrated into each of the management-control modules 61 and 62 in this embodiment, the state-control module and the volume-information module may be provided as independent modules.

The following description is based on a functional block diagram where the state-control module and the volume-information module are provided as independent modules for the purpose of explanation.

Figure 31:
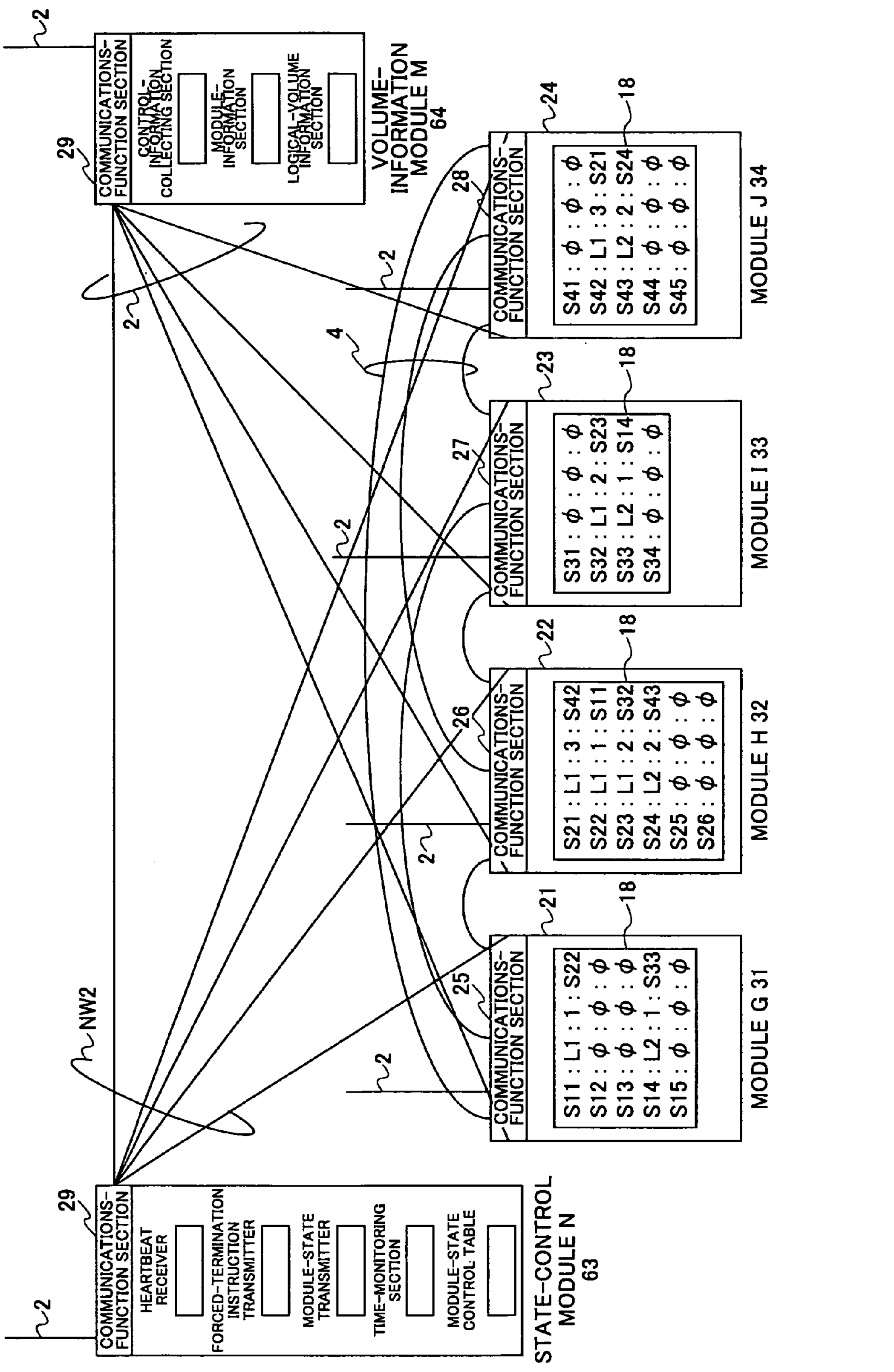
FIG. 31 is a functional block diagram of a storage system of the third embodiment.

FIG. 31 is a functional block diagram of a storage system of the third embodiment.

The storage system shown in FIG. 31 is provided with modules G31, H32, I33 and J34 each comprising a PC. The four modules G31 through J34 can communicate with external computers connected to a network 2 via communication lines 4 using communications-function sections 25 through 28 included in the respective PCs. The PCs are connected one-to-one via the communication lines 4, and therefore the modules G31 through J34 can communicate with each other using the communications-function sections 25 through 28 included in the PCs. While the PCs are connected one-to-one via the communication line 4, any topology may be applied that allows communications among the modules G31 through J34.

Each of storage devices, which are respectively included in the modules G31, H32, I33 an J34, comprises a data storage section 8 having plural slice areas 15 configured to store data based on a write request, and a control-information storage section 18 configured to store control information on the name of a logical volume Ln, a data allocation position n on the logical volume, and a slice area 15 belonging to the same segment in a different module for each of the slice areas (S11-S15, S21-S26, S31-S34, S41-S45), although the data storage section 8 is not shown for the sake of simplicity.

The storage system of this embodiment is further provided with a state-control module N63 having a function for monitoring the states of the modules G31 through J34 and forcibly terminating operations, and a volume-information module M64 for collecting control information from the modules G31 through J34 so as to manage state information thereof and for managing all the information of each logical volume.

The state-control module N63 and the volume-information module M64 each have communications-function sections 29 and are connected to the network 2 to communicate with the modules G31 through J34 via the network 2. The state-control module N63 and the volume-information module M64 can communicate with each other. Therefore, for example, the volume-information module M64 can request the state-control module N63 to terminate operations of a specific module, or to terminate all operations of the storage system according to information about the modules G31 through J34 received from the state-control module N63.

The following describes functions of the state-control modules N63 and the volume-information module M64 and effects thereof.

Figure 32:
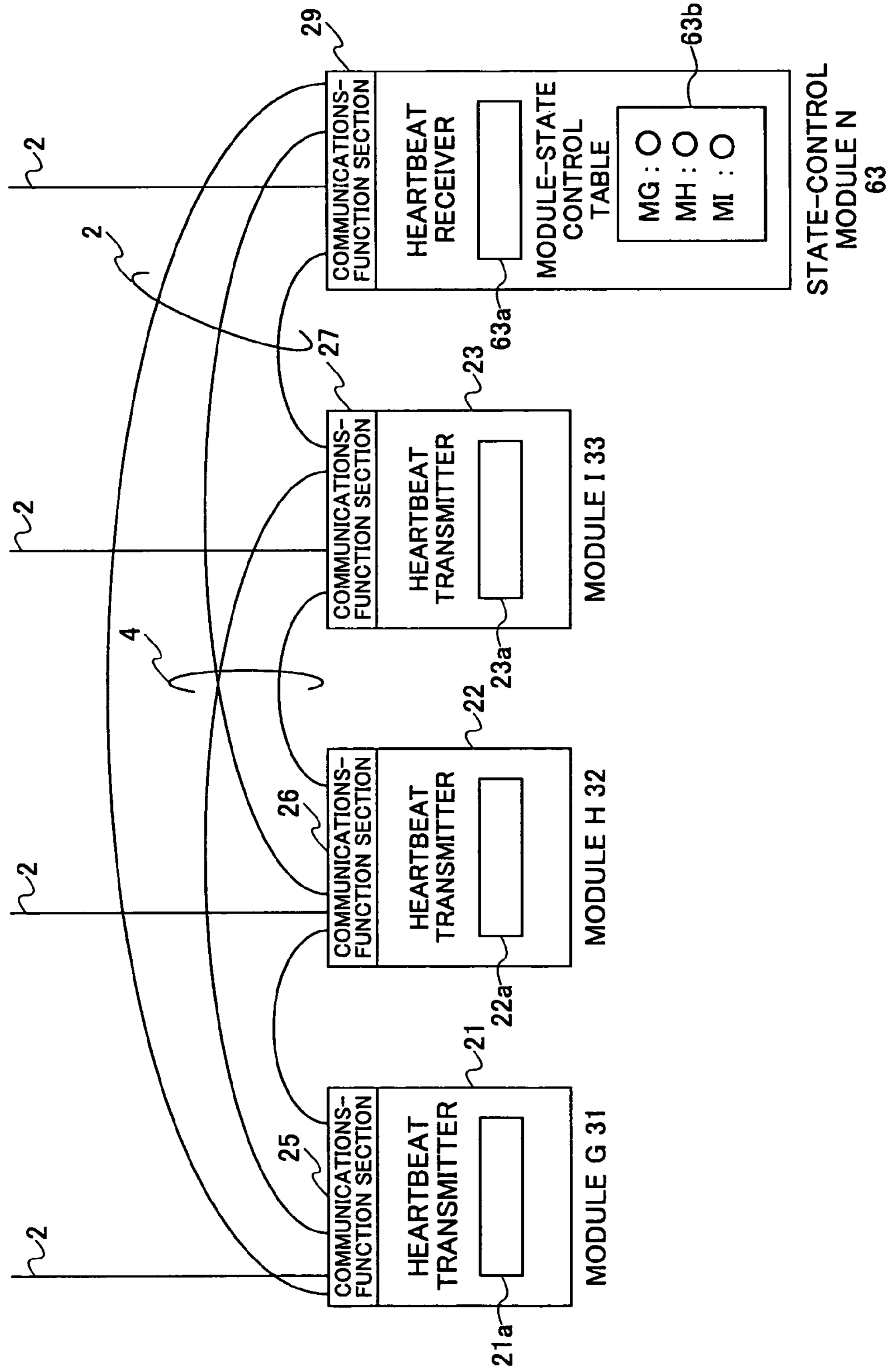
FIG. 32 shows an example of functions and a procedure of a state-control module of the third embodiment.
Figure 33:
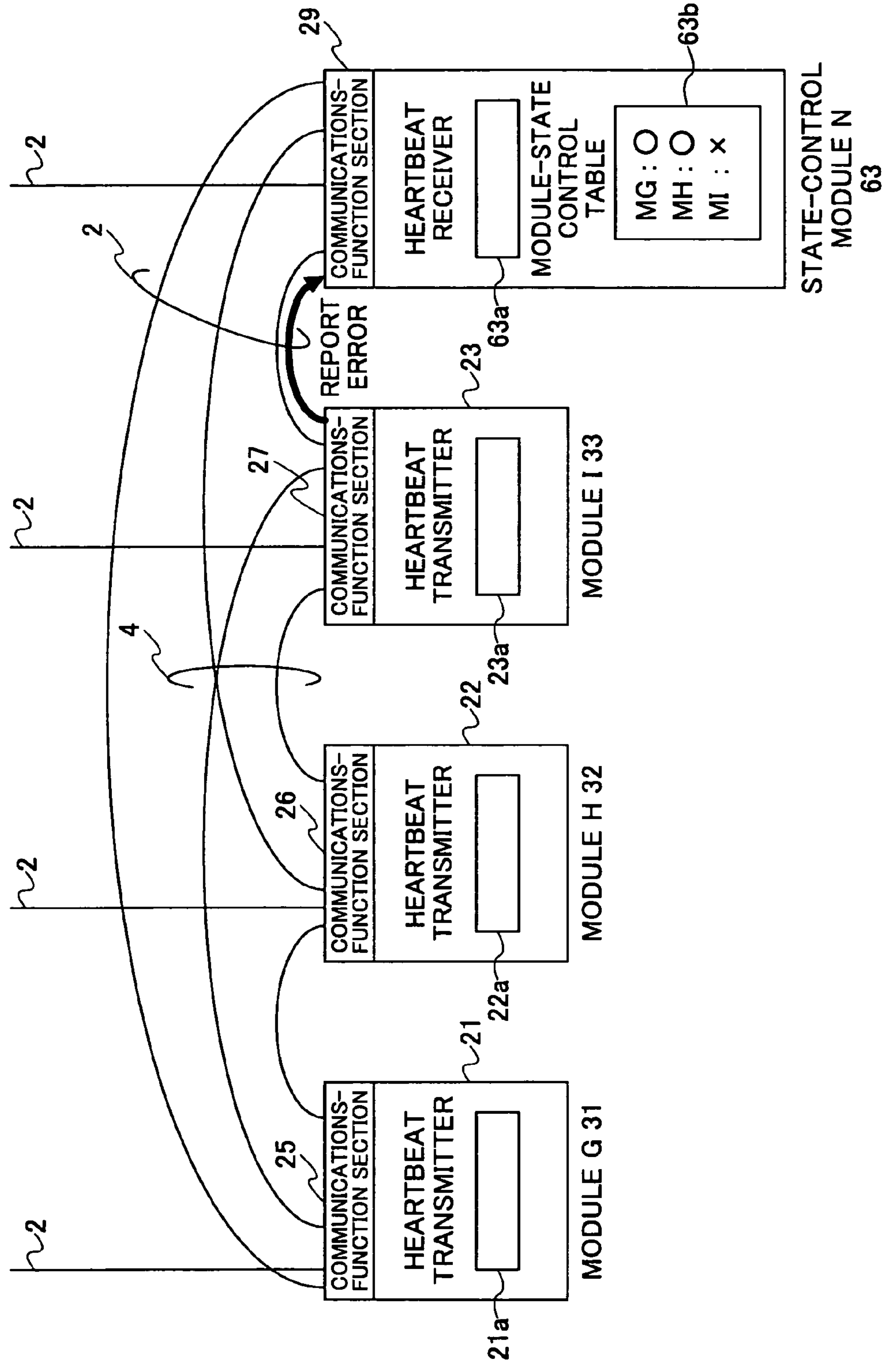
FIG. 33 (continued from FIG. 32) shows an example of functions and a procedure of the state-control module of the third embodiment.

FIGS. 32 and 33 show an example of functions and a procedure of the state-control module N63 of this embodiment.

Referring to FIG. 32, the storage system comprises modules G31, H32, I33 and the state-control module N63.

The state-control module N63 is an independent module, although it may alternatively be integrated into any one of the modules G11 through I13.

The modules G31 through I33 respectively have heartbeat transmitters 21*a*, 22*a* and 23*a* for sending state information of the corresponding modules G31 through I33 to the other modules and the state-control module N63 via communications-function sections 25 through 27. The state information may include, for example, pulse signals transmitted regularly as heartbeat. A regular transmission of heartbeat is recognized as a normal state, and no transmission of heartbeat is recognized as there being an error. The heartbeat transmitters 21*a* through 23*a* report that the corresponding modules G31 through I33 are in normal states when the modules G31 through I33 are activated, and report that an error has occurred during activation or operation of the modules G31 through I33. Thus, the modules G31 through I33 can restore data or information at an early stage as they are notified of the error by one of the heartbeat transmitters 21*a* through 23*a*.

The state-control module N63 comprises a heartbeat receiver 63*a* that receives the state information sent from the heartbeat transmitters 21*a* through 23*a* in the modules G31 through I33, and a module-state control table 63*b* that controls the received state information. The module-state control table 63*b* indicates whether the modules G31 through I33 are in a normal state (shown by a symbol ○) or there is an error (shown by a symbol x).

The modules G31 through I33 send the state information thereof to the state-control module N63. The state-control module N63 receives the state information sent from the modules G31 through I33 and displays the received information in the module-state control table 63*b*.

If the information displayed in the module-state control table 63*b* is lost, the information can be acquired from the modules G31 through I33 again. Therefore, the information does not have to be stored in a secondary storage device in a PC, and may be held in a memory.

Then, referring to FIG. 33, the module I33 detects an error therein and reports the error to the state-control module N63.

The state-control module N63 changes the state of the module I33 indicated in the module-state control table 63*b* to show the symbol x.

Figure 34:
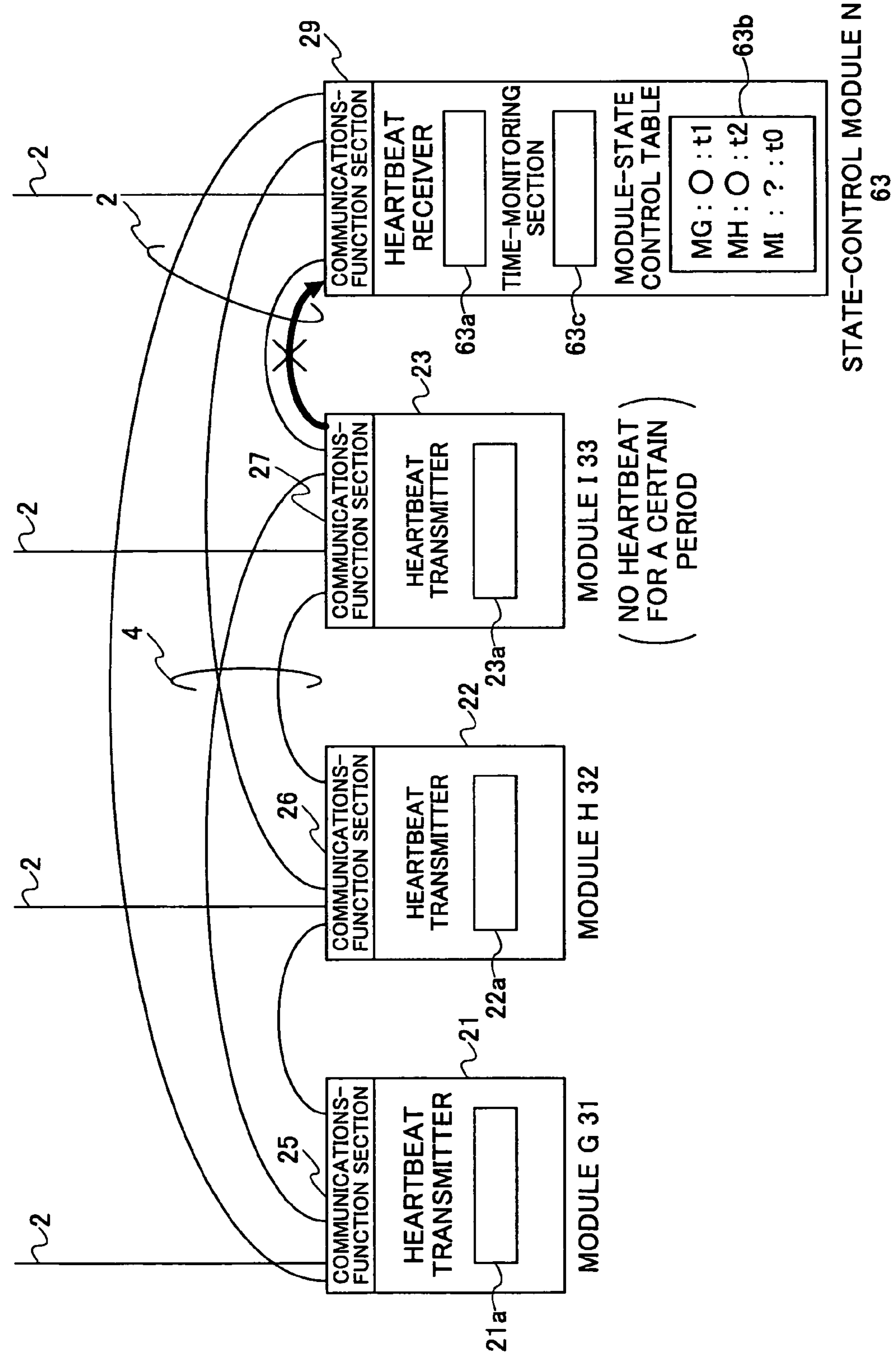
FIG. 34 shows another example of functions and a procedure of a state-control module of the third embodiment.

FIG. 34 shows another example of functions and a procedure of the state-control module N63 of this embodiment.

Referring to FIG. 34, the modules G31 through I33 are configured to send state information (heartbeat) at regular intervals. The state-control module N63 further comprises a time-monitoring section 63*c* so as to display the time of receipt of the most recently received information in the module-state control table 63*b*.

If the state information is not sent from the module I33 with reference to time-monitoring section 63*c*, the state-control module N63 changes the state indicator of the module I33 from a symbol ○ to a symbol ?. The symbol ? indicates that an error may have occurred because the state information is not received.

Figure 35:
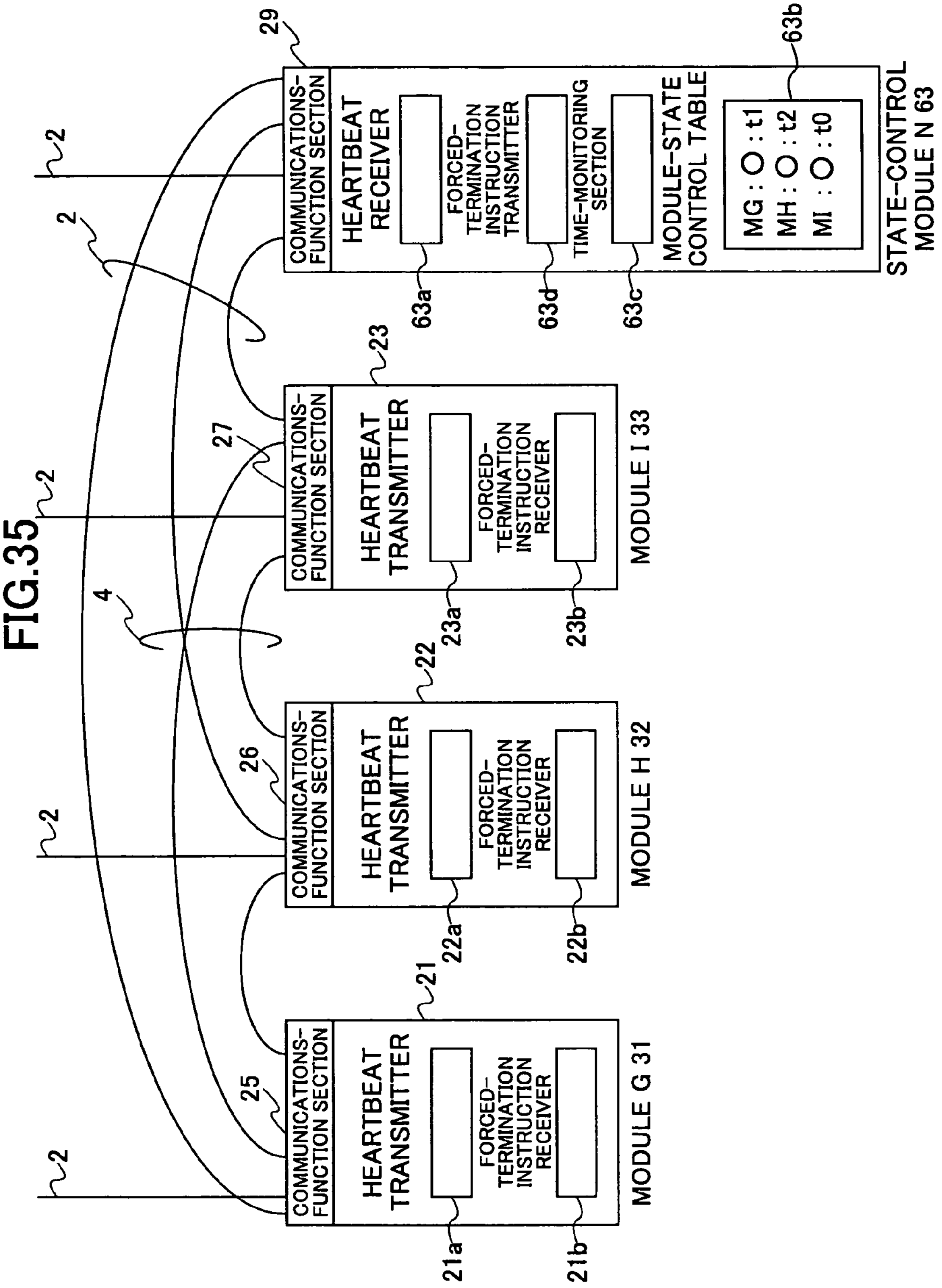
FIG. 35 shows the state-control module of FIG. 34 further having a function for forcibly terminating operations of a module in which an error has occurred.

FIG. 35 shows the state-control module N63 of FIG. 34 further having a function for forcibly terminating operations of a module in which an error has occurred.

As shown in FIG. 35, the state-control module N63 further comprises a forced-termination instruction transmitter 63*d* for sending a forced-termination instruction to a module having an error. The modules G31 through I33 further comprise corresponding forced-termination instruction receivers 21*b* through 23*b* each having a function of receiving the forced-termination instruction from the forced-termination instruction transmitter 63*d* and terminating active operations.

The state-control module N63 may also comprise a forced-termination instruction receiver.

Since the state-control module N63 is provided with a forced-termination instruction transmitting function, the state-control module N63 can quickly terminate a module having an error upon recognition of the error. Thus the module having an error is temporarily excluded from the storage system, and operations are continued by other normal modules.

Figure 36:
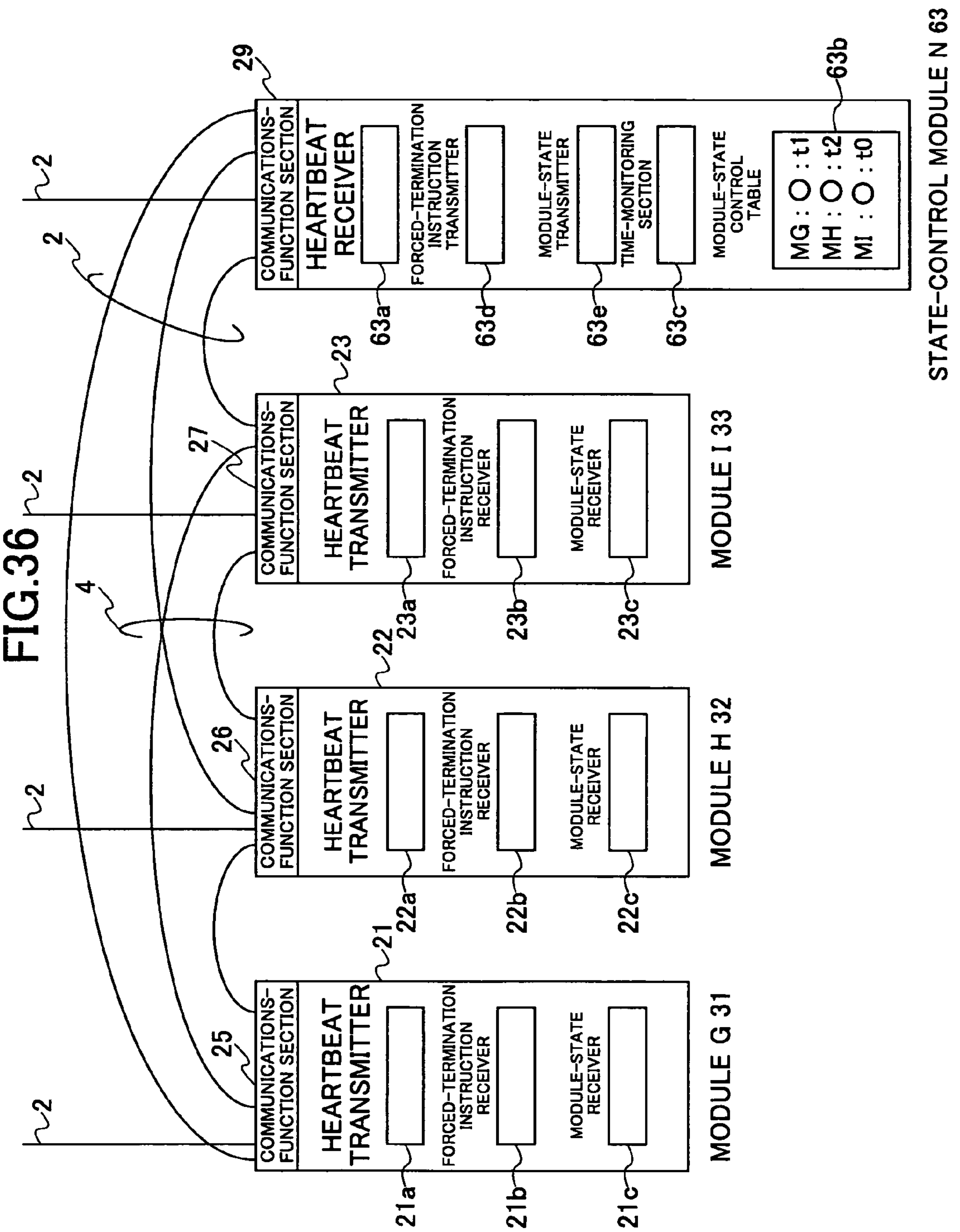
FIG. 36 shows the state-control module of FIG. 35 further having a function for sending state information to modules.

FIG. 36 shows the state-control module N63 of FIG. 35 further having a function of sending state information to the modules G31 through I33.

As shown in FIG. 36, the state-control module N63 further comprises a module-state transmitter 63*e* for sending state information stored in the state-control module N63 to the modules G31 through I33. The modules G31 through I33 further comprise corresponding module-state receivers 21*c* through 23*c* that receive the state information sent from the module-state transmitter 63*e*.

The module-state transmitter 63*e* may transmit the state information only to a module having an error. Alternatively, the module-state transmitter 63*e* may transmit the state information to all the modules G31 through I33 including those operating normally. In this case, the modules G31 through I33 receive only the corresponding state information.

Each of the modules G31 through I33 compares the state information sent from the module-state transmitter 63*e* and state information held by itself. Then, if the modules G31 through I33 find a discrepancy or determine that it should be terminated, the modules G31 through I33 terminate themselves.

If the state information held by the modules G31 through I33 is compared with the state information held by the state-control module N63 in this way and priorities are given to the state-information held by the state-control module N63, the storage system can be stably operated based on consistent information.

Figure 37:
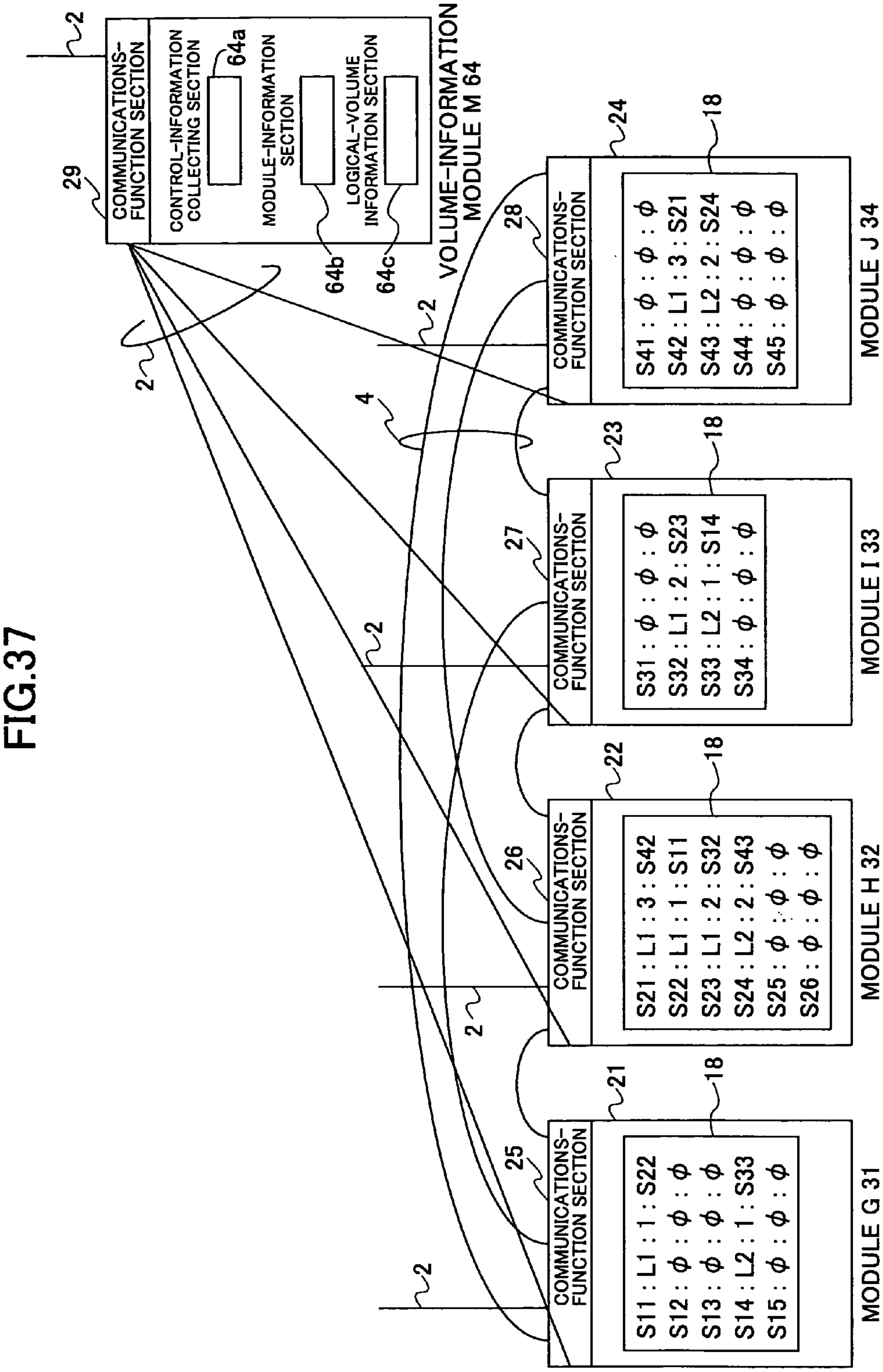
FIG. 37 is a schematic block diagram showing a configuration example of a volume-information module of the third embodiment.

FIG. 37 is a schematic block diagram showing a configuration example of a volume-information module M64 of this embodiment.

Referring to FIG. 37, a storage system is provided with modules G31, H32, I33 and J34 and a volume-information module M64. The modules G31 through J34 and M64 comprise communications-function sections 25 through 29.

The volume-information module M64 has a communication channel to a network 2 and communications channels to the modules G31 through J34. The modules G31 through J34 are connected to each other via communication lines 4.

Each of storage devices 21 through 24, which are respectively included in the modules G31 through J34, comprises a data storage section 8 having plural slice areas 15 configured to store data and a control-information storage section 18, and has a function of sending control information stored in the control-information storage sections 18 to the volume-information module M64, although the data storage section 8 is not shown for the sake of simplicity.

The volume-information module M64 comprises a control-information collecting section 64*a* that collects the control information stored in the control-information storage section 18, a module-information section 64*b* that assembles module information for indicating module state, and a logical-volume information section 64*c* that reconstructs information on each logical volume indicating slice areas 15 where the logical volume is stored.

The module information and the logical volume information reconstructed by the volume-information module M64 are assembled based on the control information stored in the modules G31 through J34. Therefore, the module information and the logical volume information on M34 can be reconstructed even if they have been lost. For this reason, the module information and the logical volume information only need to be held in memory and do not have to be stored in a secondary storage device.

Figure 38:
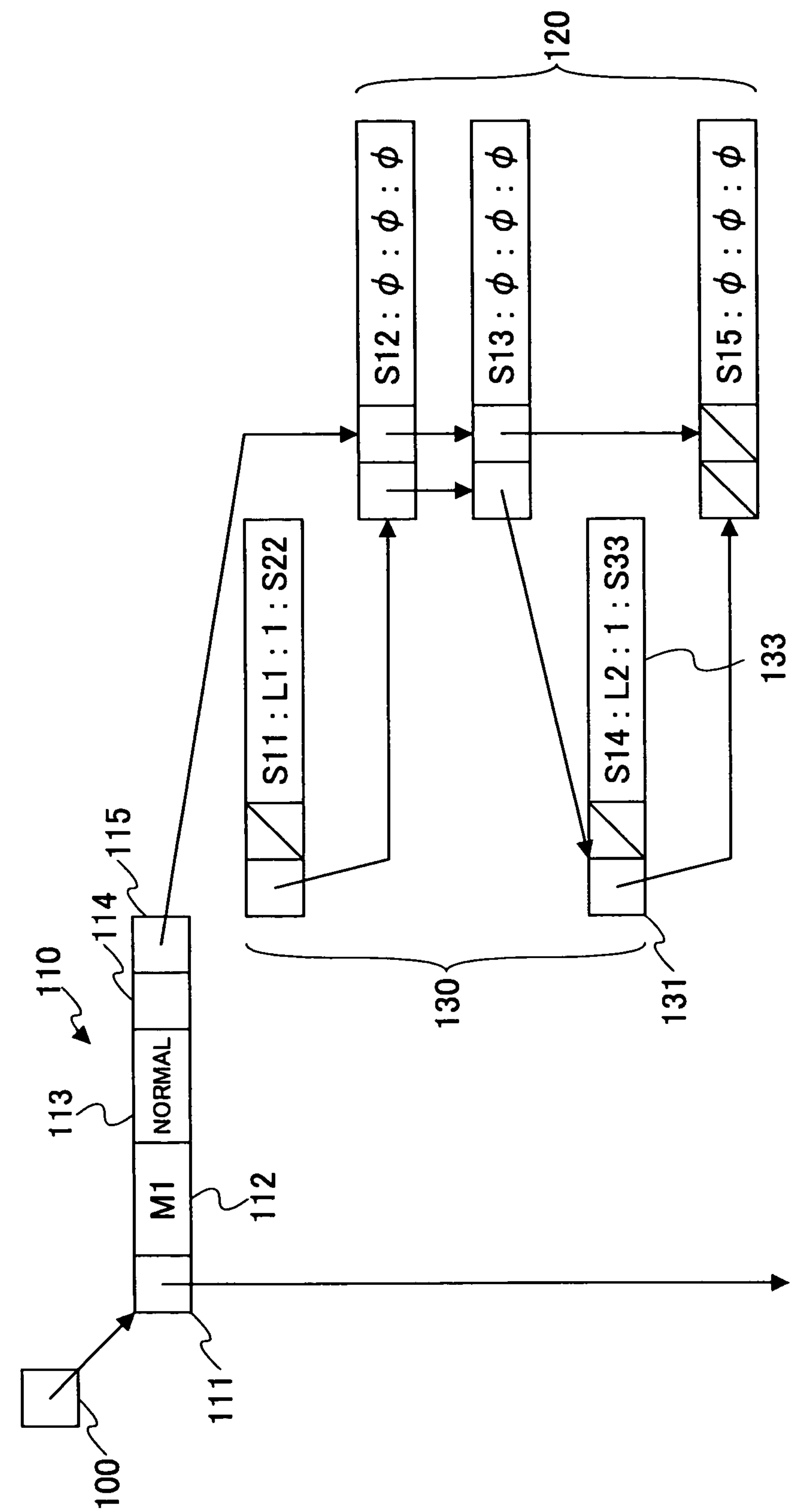
FIG. 38 shows a data structure of module information in a module-information section.

FIG. 38 shows a data structure of the module information in the module-information section 64*b*.

As shown in FIG. 38, the module information includes a first file 110 and a second file 120 for controlling unused slice areas. Both the first file 110 and the second file 120 are linked to a control-information file 130. The control-information file 130 has a pointer 131 for indicating the next control information item and information 133 for each slice area. The first file 110 includes a pointer 111 indicating the next control information item, a module name 112, and a pointer 114 indicating a slice area of the control information held by the module, and a pointer 115 indicating an unused slice area. An entry 100 is provided one for each of the modules that can communicate with the volume-information module M64. The second file 120 includes a pointer 121 indicating the next control information item, a pointer 122 indicating the next unused slice area, and information 123 for each slice area. The files are thus managed by the volume-information module M64 on the memory thereof.

Figure 39:
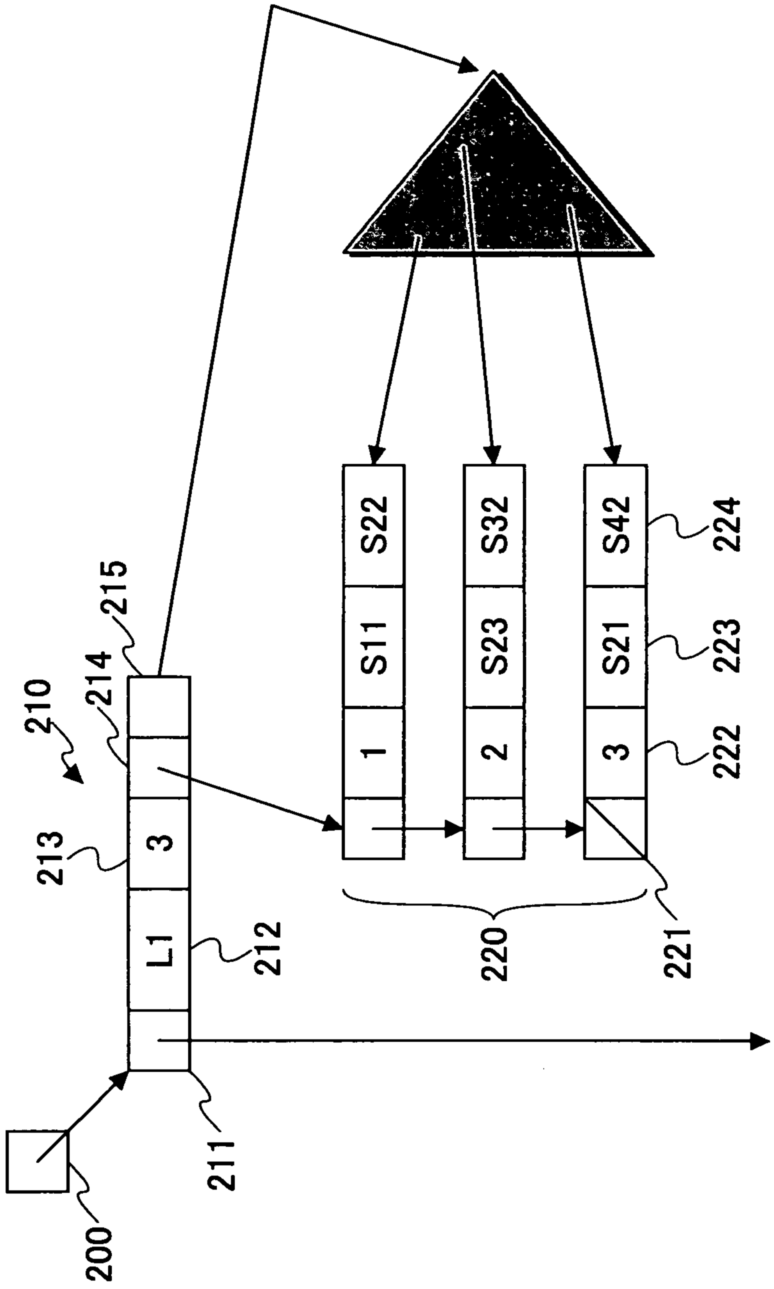
FIG. 39 shows a data structure of logical-volume information in a logical-volume section.

FIG. 39 shows a data structure of the logical-volume information in the logical-volume information section 64*c*.

As shown in FIG. 39, the logical-volume information includes a third file 210 that controls the logical volume (the number of segments) of each logical volume, and a fourth file 220 that controls the numbers attached to the slice areas forming the segments.

The third file 210 includes a pointer 211 indicating the next logical volume, the logical volume name 212, the number of segments 213, a pointer 214 to the segments, and a tree pointer that facilitates a search. An entry 200 is provided one for each module that can communicate with the volume-information module M64. The fourth file 220 includes a pointer 221 indicating the next segment, a segment serial number 222, and two slice areas 223 and 224 forming a segment. A tree includes a pointer to the slice areas 223 and 224 forming the segment in the fourth file 220. The files are thus managed by the volume-information module M64 on the memory thereof.

Figure 40:
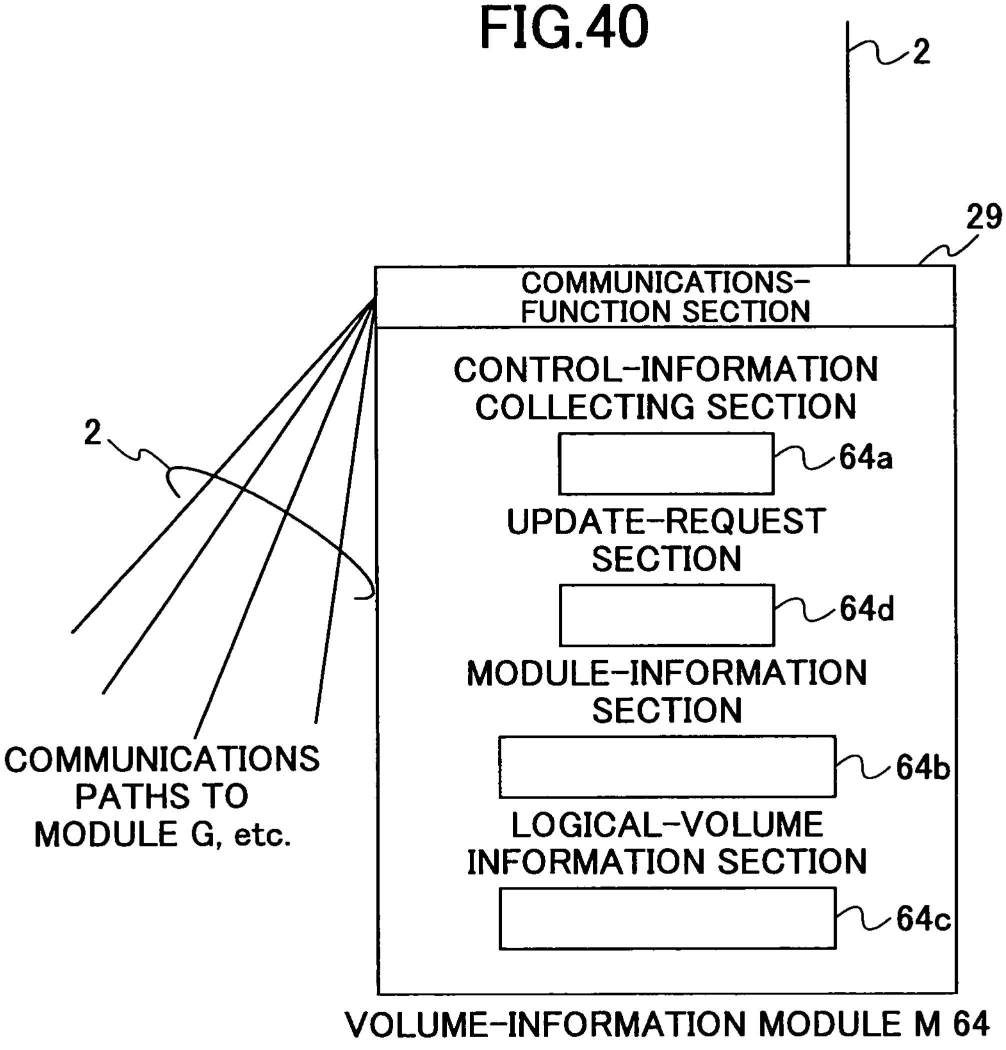
FIG. 40 shows an example of a control-information updating function provided with the volume-information module.
Figure 41:
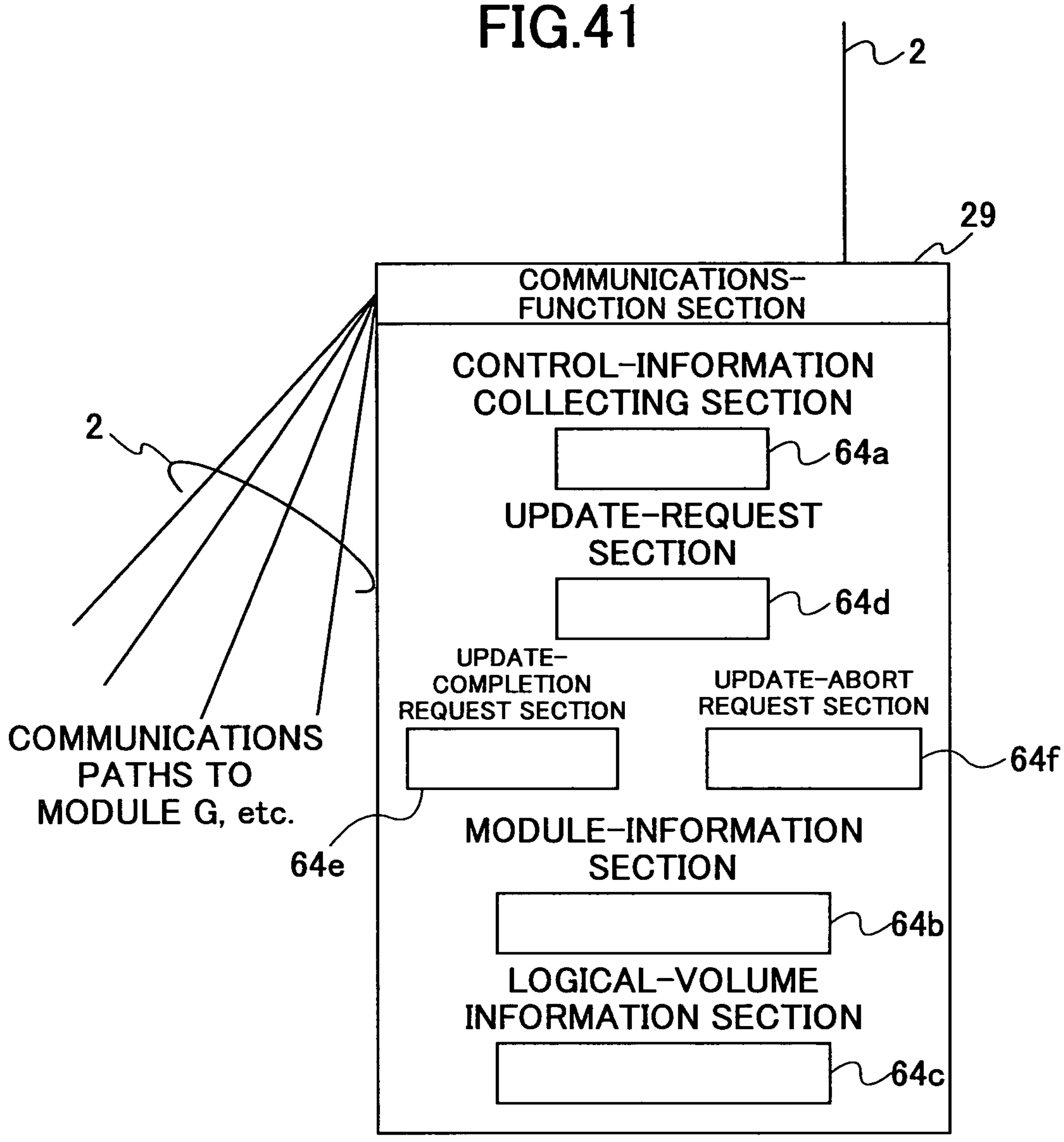
FIG. 41 (continued from FIG. 40) shows an example of a control-information updating function provided with the volume-information module.

FIGS. 40 and 41 show an example of a control-information updating function provided with the volume-information module M64.

As shown in FIG. 40, the volume-information module M64 comprises update-request section 64*d* that sends a request to update control information to the modules G31 through J34.

The update-request section 64*d* can send the request to update the control information to the modules G31 through J34 via the communications-function section 29.

FIG. 41 shows the volume-information module M64 further comprising an update-completion request section 64*e* that requests the modules G31 through J34 to send update completion information and an update-abort request section 64*f* that requests to abort the update of the control information in addition to those functions provided with the volume-information module M64 of FIG. 40.

These functions of the volume-information module M64 are effective when an error is detected in a module upon simultaneously updating the control information of the modules, or when the update of the control information must be aborted during the update of the control information.

Figure 42:
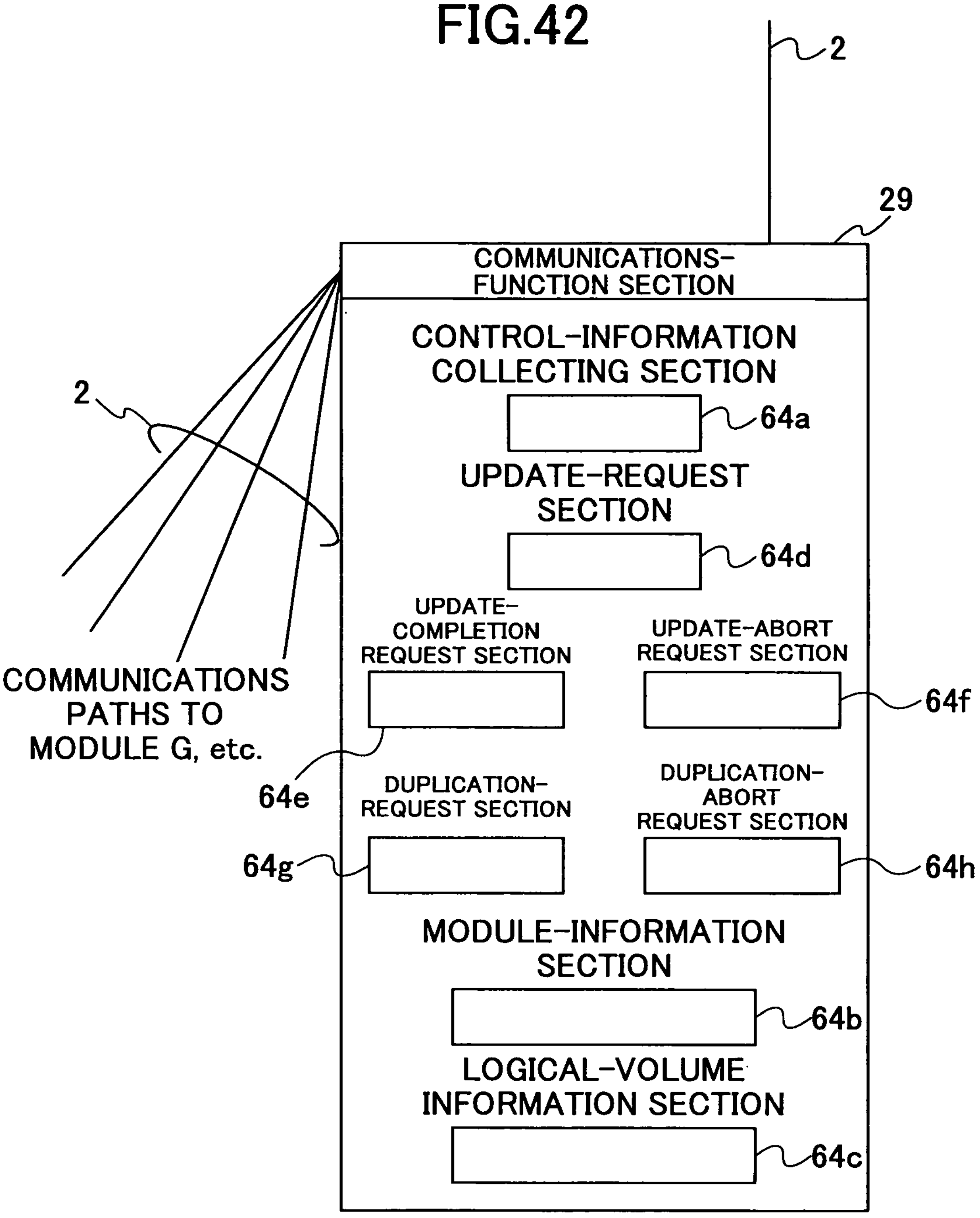
FIG. 42 shows an example of a duplication-request function provided with the volume-information module.

FIG. 42 shows an example of a duplication-request function provided with the volume-information module M64.

As shown in FIG. 42, the volume-information module M64 further comprises a duplication-request section 64*g* that requests to replicate data elements in the slice areas in a module to a slice area in another module and a duplication-abort request section that aborts the duplication, in addition to the update-request section 64*d*, the update-completion request section 64*e*, and the update-abort request section 64*f* shown in FIGS. 40 and 41.

Figure 43:
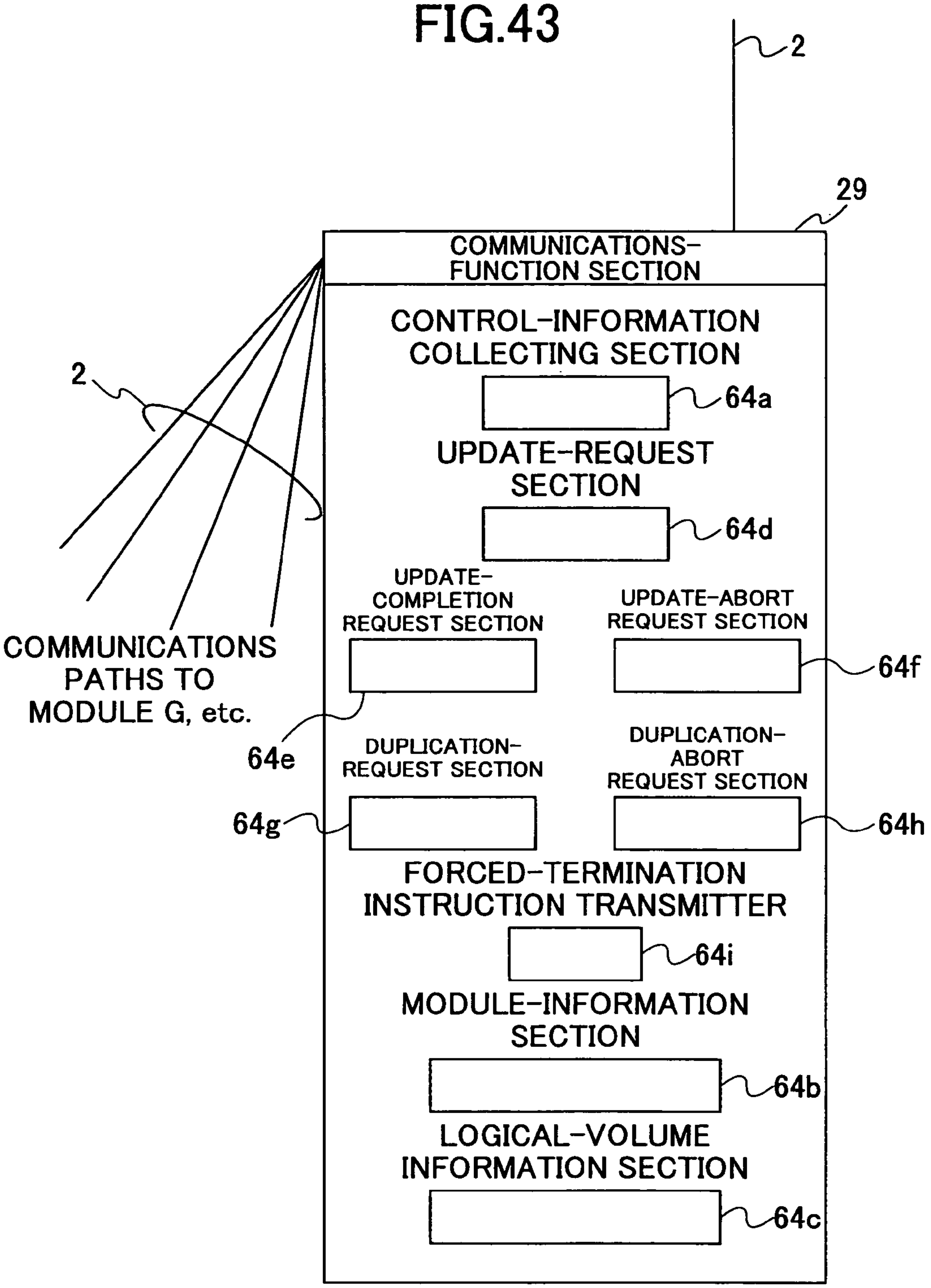
FIG. 43 shows an example of a duplication-request function provided with the volume-information module to forcibly terminate operations in modules.

FIG. 43 shows an example of a function provided with the volume-information module M64 to forcibly terminate operations in the modules G31 through J34.

As shown in FIG. 43, the volume-information module M64 comprises a forced-termination instruction transmitter 64*i* that forcibly terminates operations of a specific module or all the modules G31 through J34. This function allows forcibly aborting a module in which an error is detected or stopping all the operations of the storage system in case where errors are detected in the modules.

The following describes various operations performed by the volume-information module M64.

Figure 44:
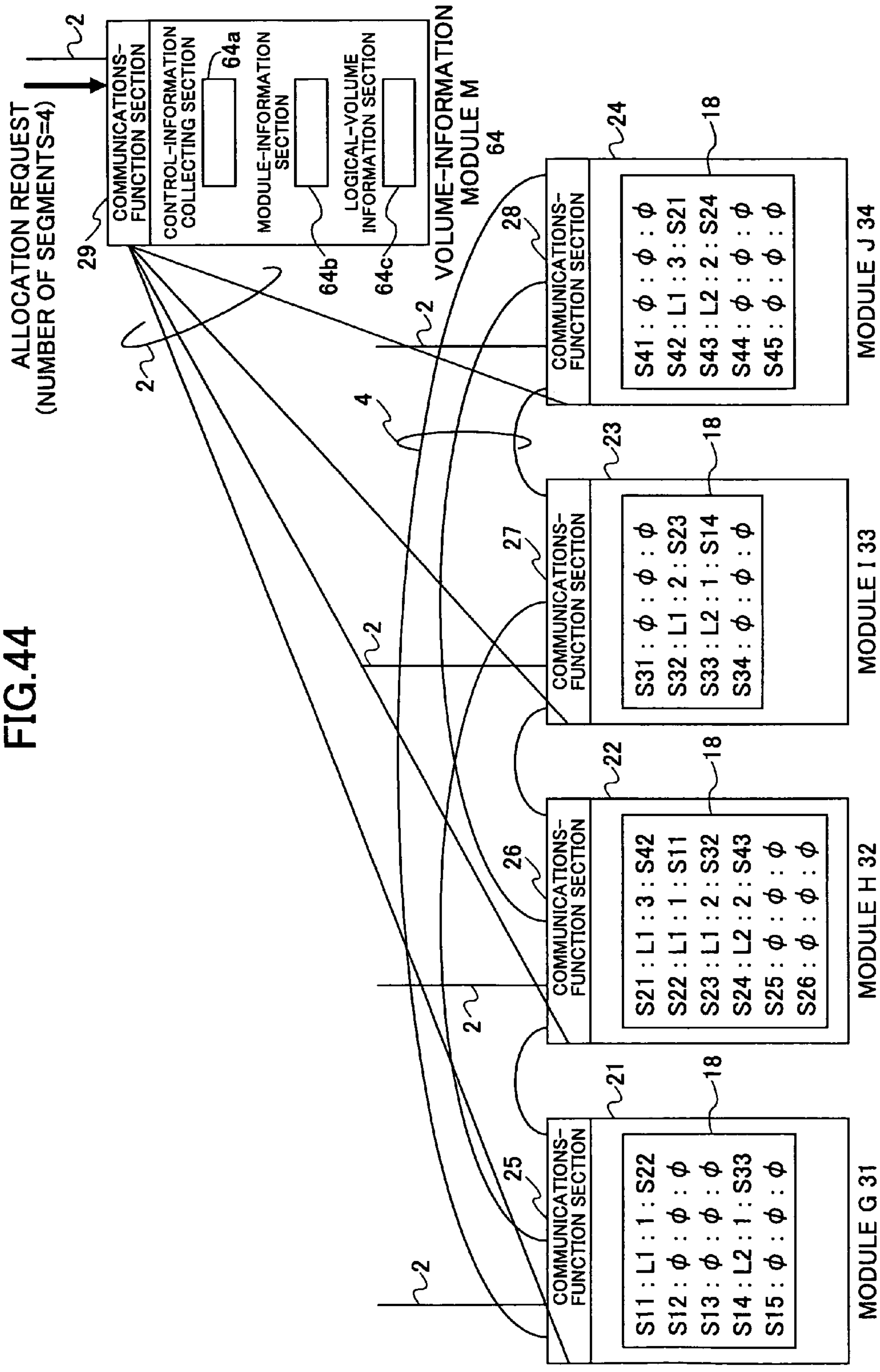
FIG. 44 shows an example of a procedure performed when the volume-information module receives a request for data storage.
Figure 45:
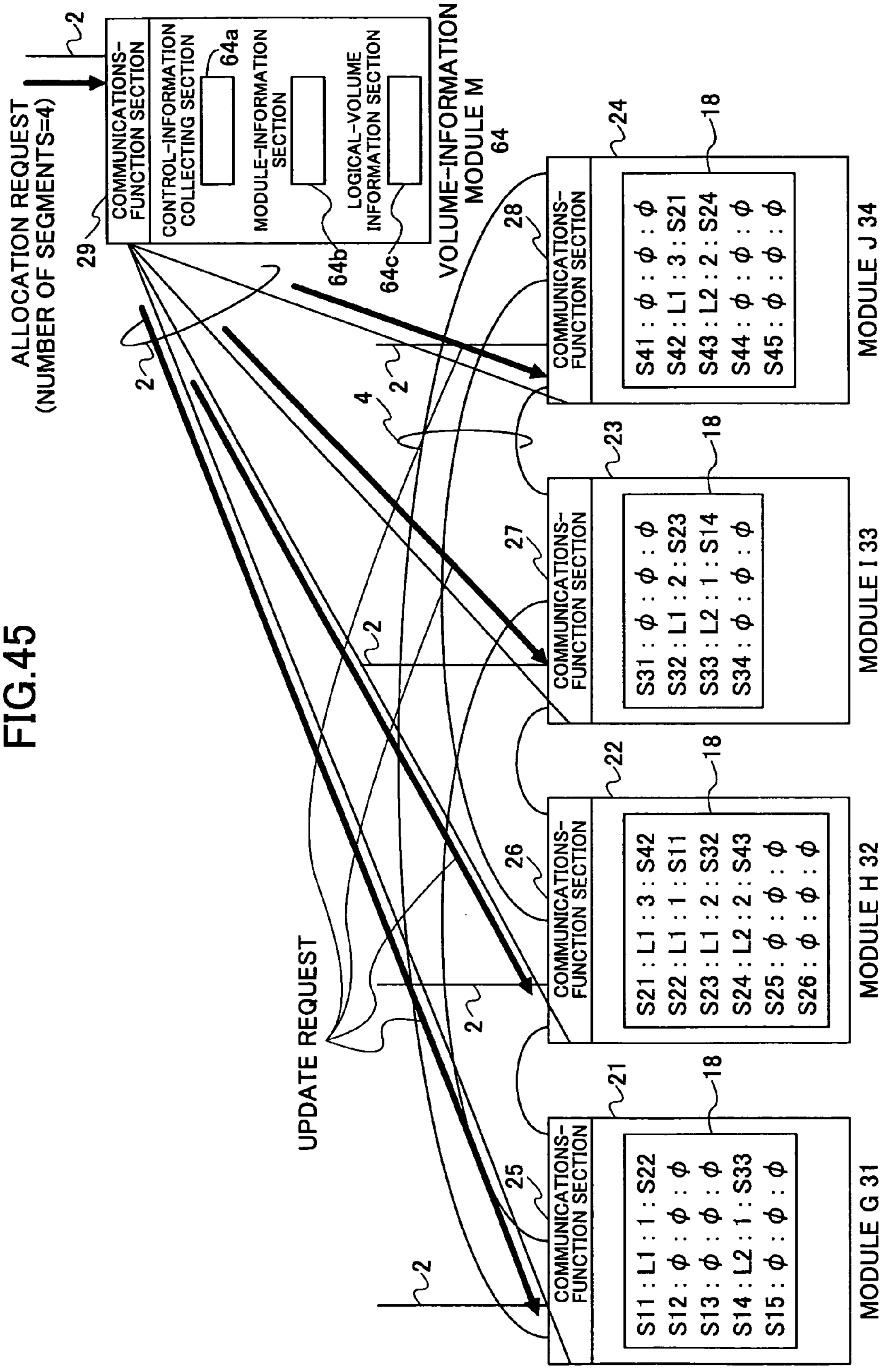
FIG. 45 (continued from FIG. 44) shows the procedure performed when the volume-information module receives a request for data storage.
Figure 46:
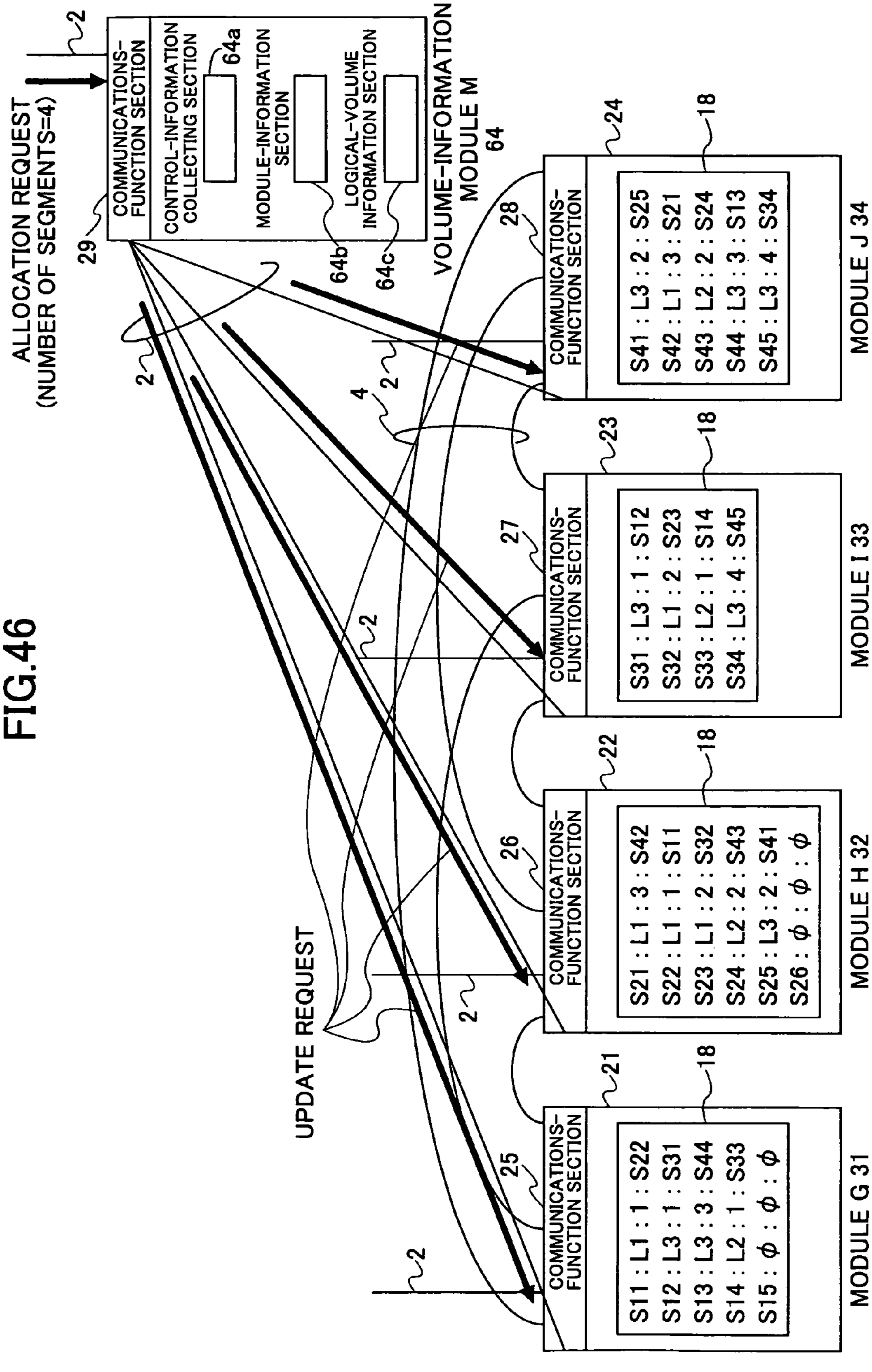
FIG. 46 (continued) shows the procedure performed when the volume-information module receives a request for data storage.

FIGS. 44 through 46 show an example of a procedure performed when the volume-information module M64 receives a logical volume allocation request.

With reference to FIGS. 44 through 46, a storage system comprises modules G31, H32, I33 and J34 and the volume-information module M64. The modules G31 through J34 and M64 respectively comprise communications-function sections 25 through 29.

Referring to FIG. 44, in the storage system of this embodiment, the volume-information module M64 receives a request to allocate data of a logical volume having four segments from the outside.

As shown in FIG. 45, the volume-information module M64 that has received the allocation request assigns unused slice areas as candidates such that each of the segments is formed by slice areas belonging to different modules, and sends a request to update control information to the modules to which the assigned slice areas belong.

Then, as shown in FIG. 46, the modules G31 through J34 allocate data elements to the assigned slice areas 15 and update the control information stored in the control information storage section 18 according to a request for the update of the control information. As a result, a logical volume L3 is allocated to slice areas S12 and S13 in the module G31, a slice area S25 in the module H32, slice areas S31 and S34 in the module I33, and slice areas S41, S44 and S45 in the module J34. The segments of the logical volume L3 are formed by: S12 and S31, S25 and S41, S13 and S44 and S34 and S44, and S34 and S45.

Since the volume-information module M64 performs allocation of the requested logical volume as described above, allocation rules can be relatively easily changed by modifying a program of the volume-information module M64.

Figure 47:
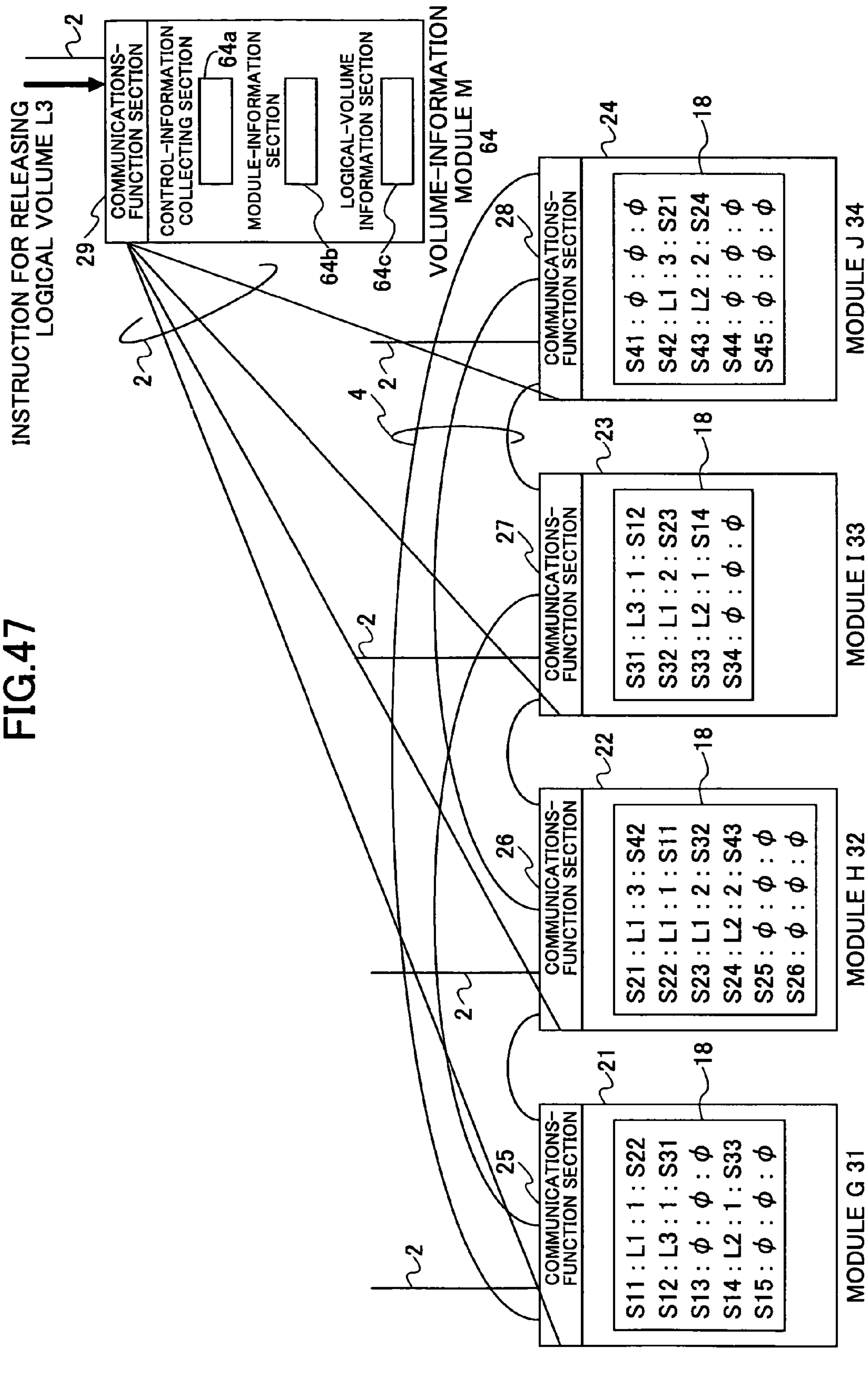
FIG. 47 shows an example of a procedure performed when the volume-information module receives a request for release of a logical volume.
Figure 48:
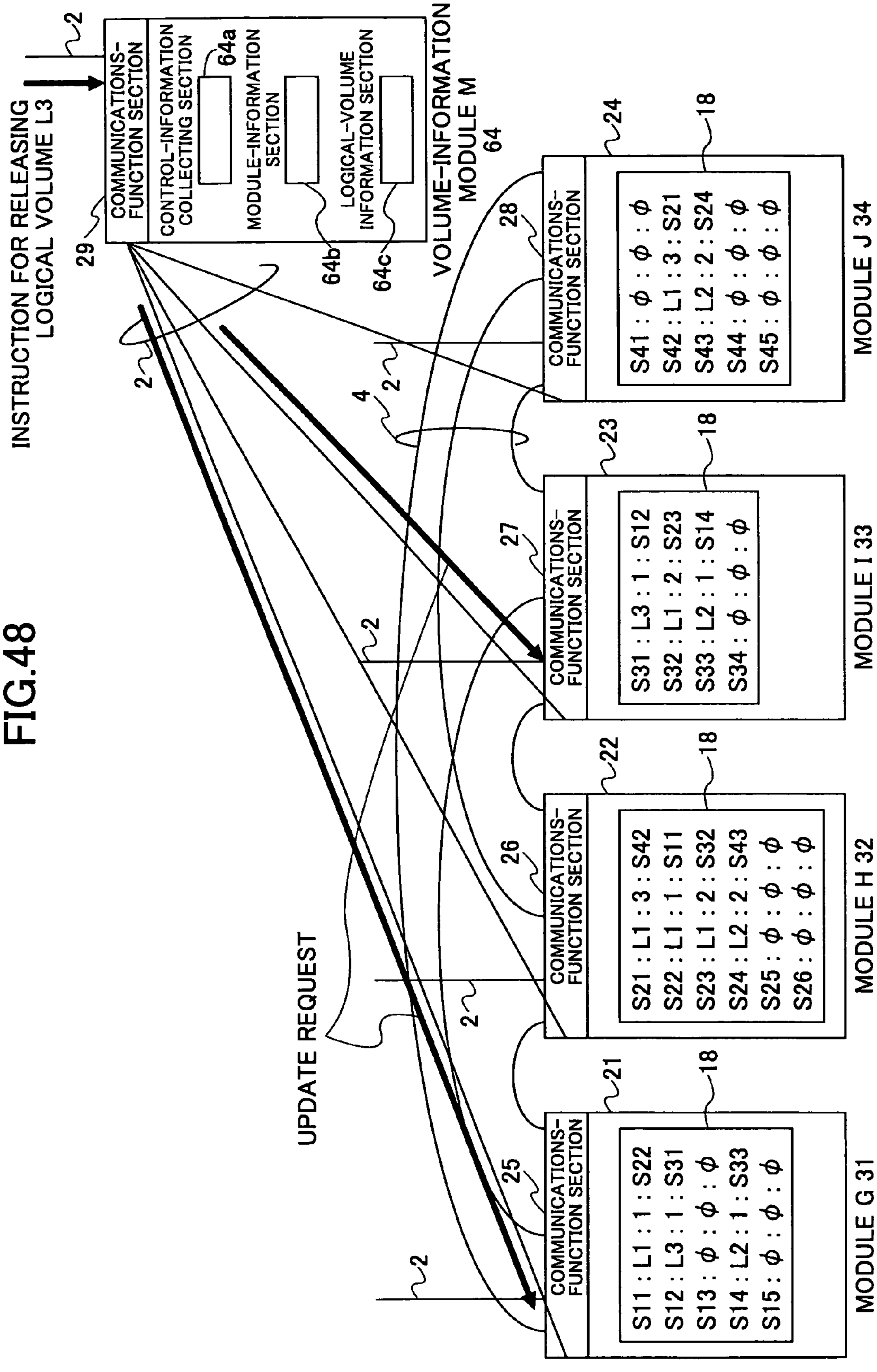
FIG. 48 (continued from FIG. 47) shows the procedure performed when the volume-information module receives a request for release of a logical volume.
Figure 49:
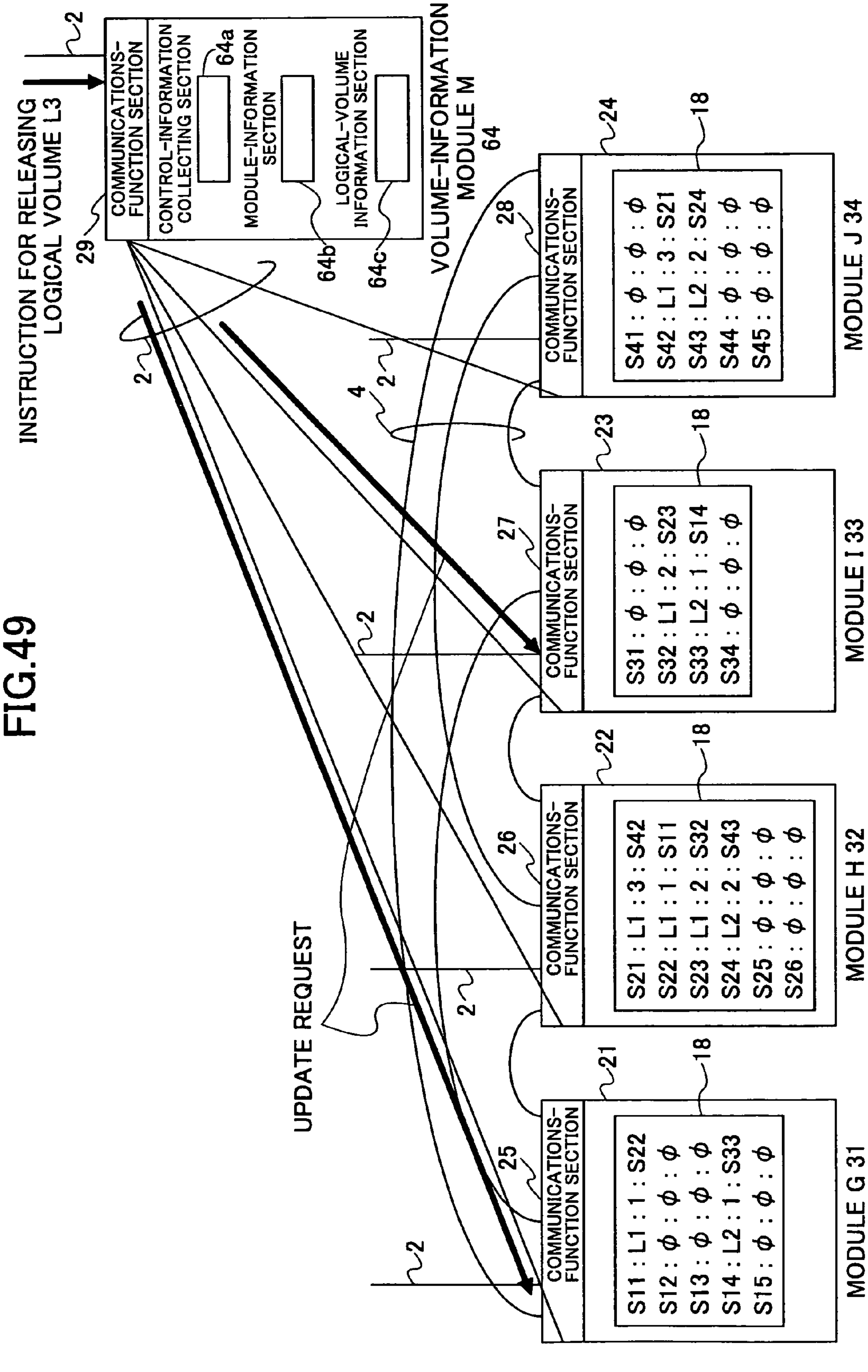
FIG. 49 (continued) shows the procedure performed when the volume-information module receives a request for release of a logical volume.

FIGS. 47 through 49 show an example of a procedure performed when the volume-information module M64 receives a request for release of a logical volume.

Referring to FIGS. 47 through 49, a storage system is provided with modules G31, H32, I33 and J34 and the volume-information module M64. The modules G31 through J34 and M64 comprise communications-function sections 25 through 29.

As shown in FIG. 47, the volume-information module M64 receives a request for release of a logical-volume L3 having one segment.

Then, referring to FIG. 48, the volume-information module M64 searches for numbers attached to slice areas belonging to the logical volume L3 based on logical volume information stored in the logical-volume information section 64*c*. As it is found from the search result that a number S12 attached to a slice area in the module G31 and a number S31 attached to a slice area in the module I33 belong the logical volume L3, a control information update request is sent to the modules G31 and I33.

As shown in FIG. 49, the modules G31 and I33 that have received the control information update request erase data elements stored in the slice areas S12 and S31, respectively, and update the control information.

Since the logical-volume information section 64*c* in the volume-information module M64 has the logical volume information as described above, the update request may be sent only to the modules that require information update.

FIGS. 50 through 53 show an example of a procedure performed when a module fails;

Referring to FIGS. 50 through 53, a storage system is provided with modules G31, H32, I33 and J34 and a volume-information module M64. The modules G31 through J34 and M64 comprise communications-function sections 25 through 29.

Figure 50:
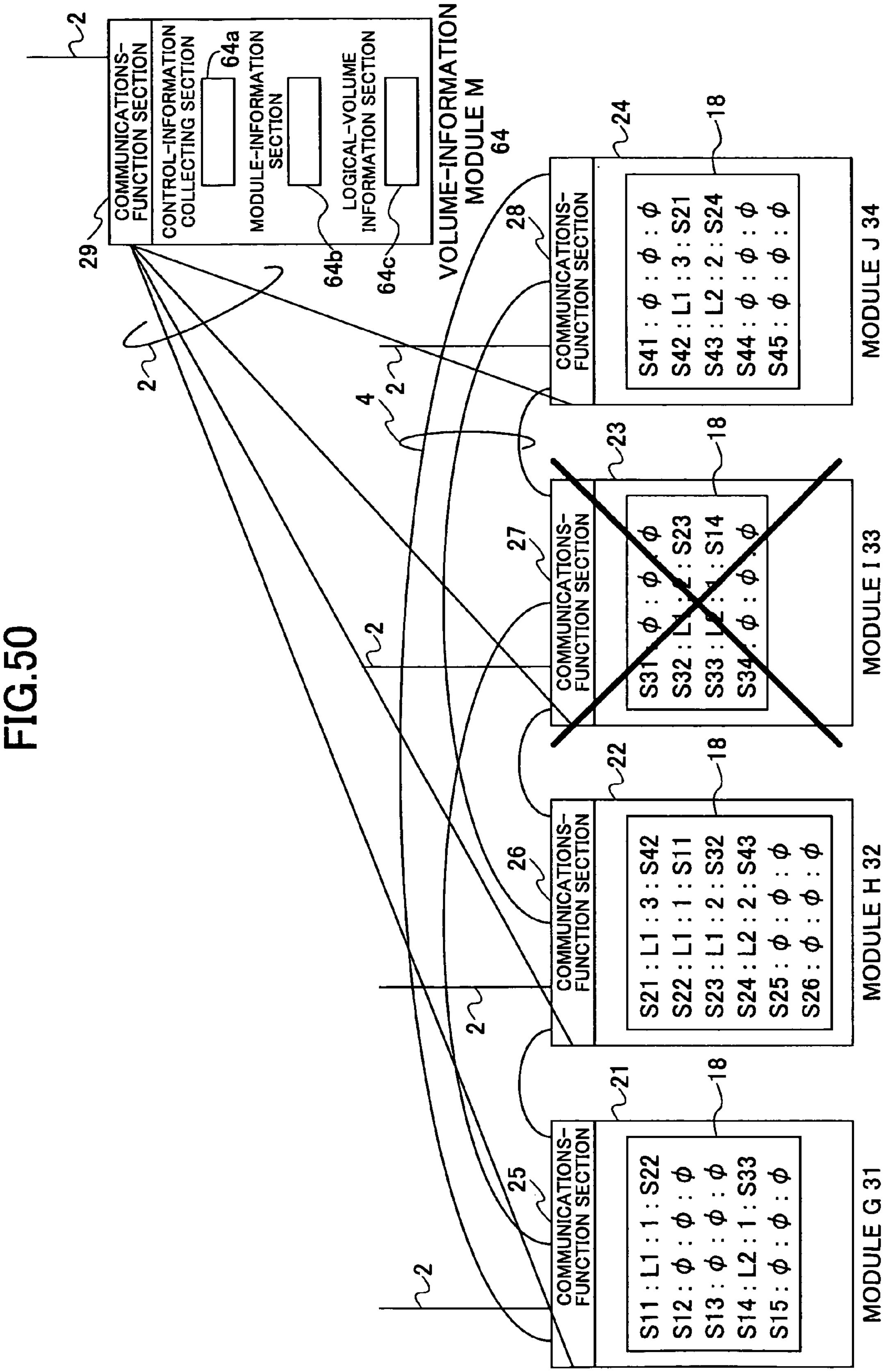
FIG. 50 shows an example of a procedure performed when a module fails.

In FIG. 50, the module I33 fails and the volume-information module M64 recognizes the failure.

Figure 51:
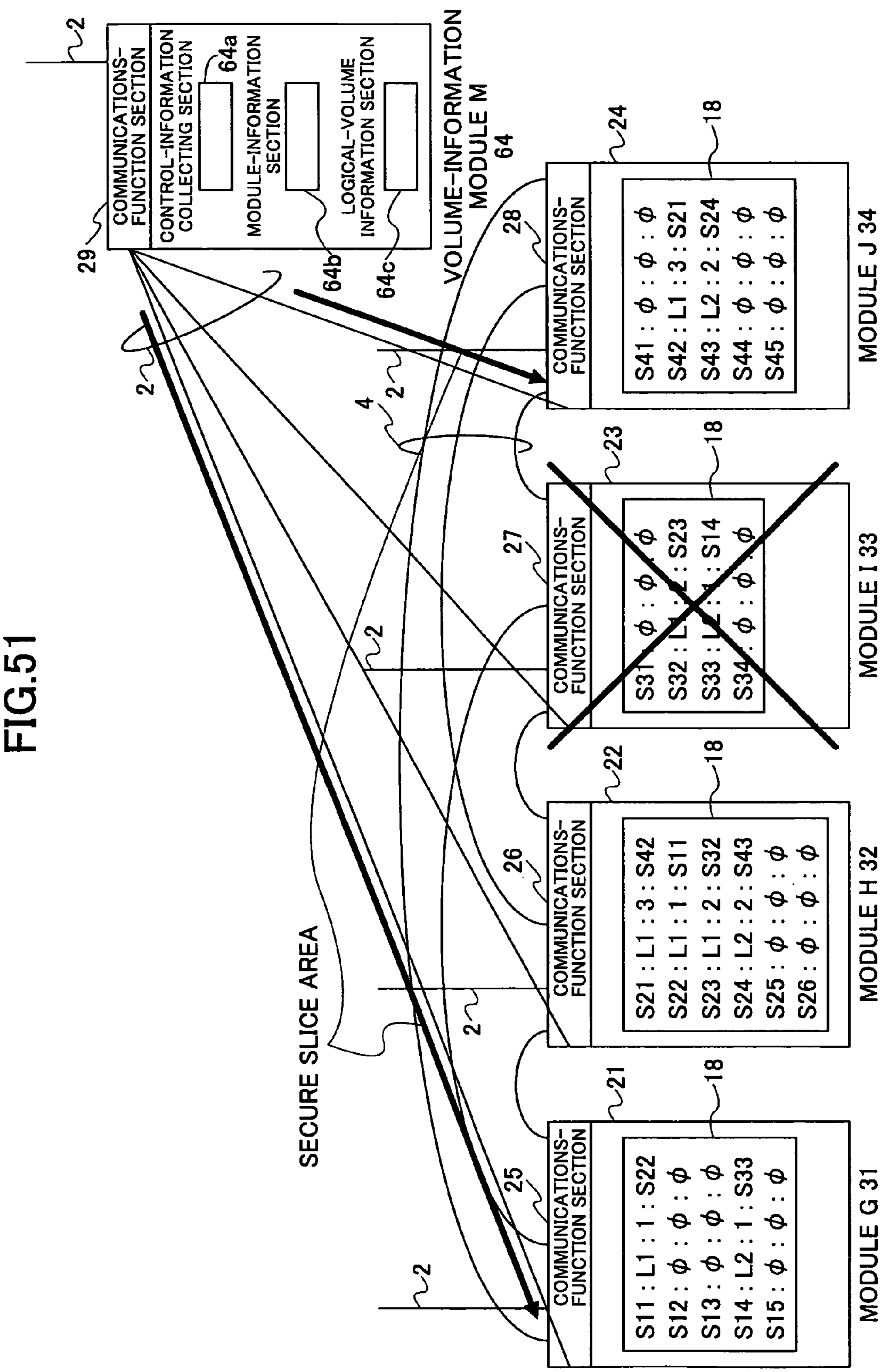
FIG. 51 (continued from FIG. 50) shows the procedure performed when a module fails.

In FIG. 51, the volume-information module M64 finds that data elements are stored in the slice areas S32 and S33 based on the control information of the module I33, and two unused slice areas in other modules that are to substitute for the slice areas S32 and S33 lost by the failure are secured. In this step, the volume-information module M64 selects the unused slice areas so that each segment is formed by slice areas in different modules. In this example, a slice area S12 is selected to substitute for the slice areas S32 and a slice area S41 is selected to substitute for the slice area S33. The volume-information module M64 requests the module G31 to secure the slice area S12 and requests the module J34 to secure the slice area S41.

Figure 52:
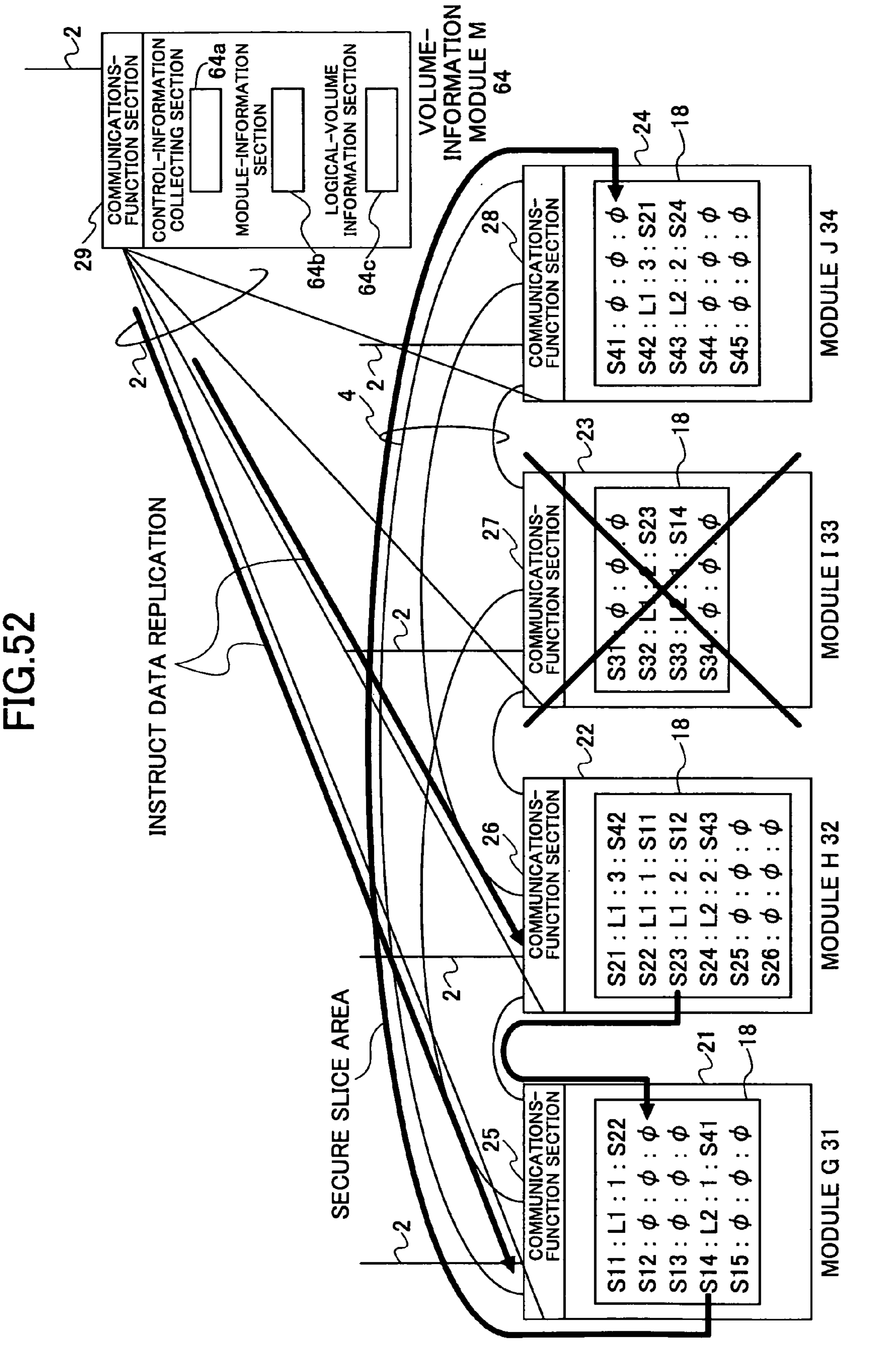
FIG. 52 (continued) shows the procedure performed when a module fails.

Referring to FIG. 52, when the slice areas S12 and S41 are secured, the volume-information module M64 issues an instruction to the slice area S23 forming a segment with the slice area S32 to replicate the data element stored in the slice area S23 to the slice area S12, and an instruction to the slice area S14 forming a segment with the slice area S33 to replicate the data element stored in the slice area S14 to the slice area S41.

Figure 53:
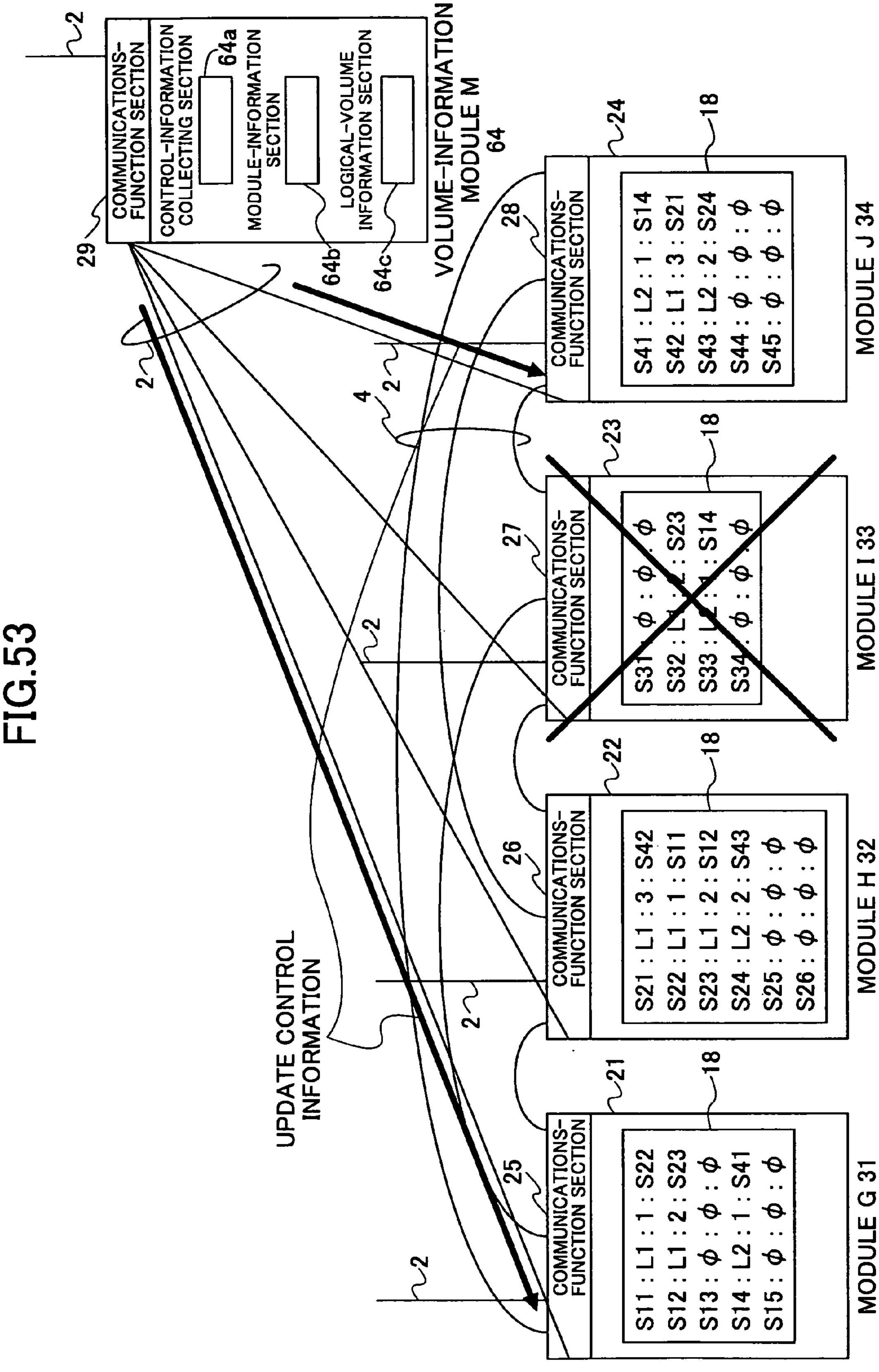
FIG. 53 (continued) shows the procedure performed when a module fails.

When the data duplication is completed, the volume-information module M64 sends a control information update request to the modules G31 and J34 as shown in FIG. 53.

In this way, the volume-information module M64 that has all the volume information controls restoration of data in a failed module, and thus data redundancy can be promptly restored.

Figure 54:
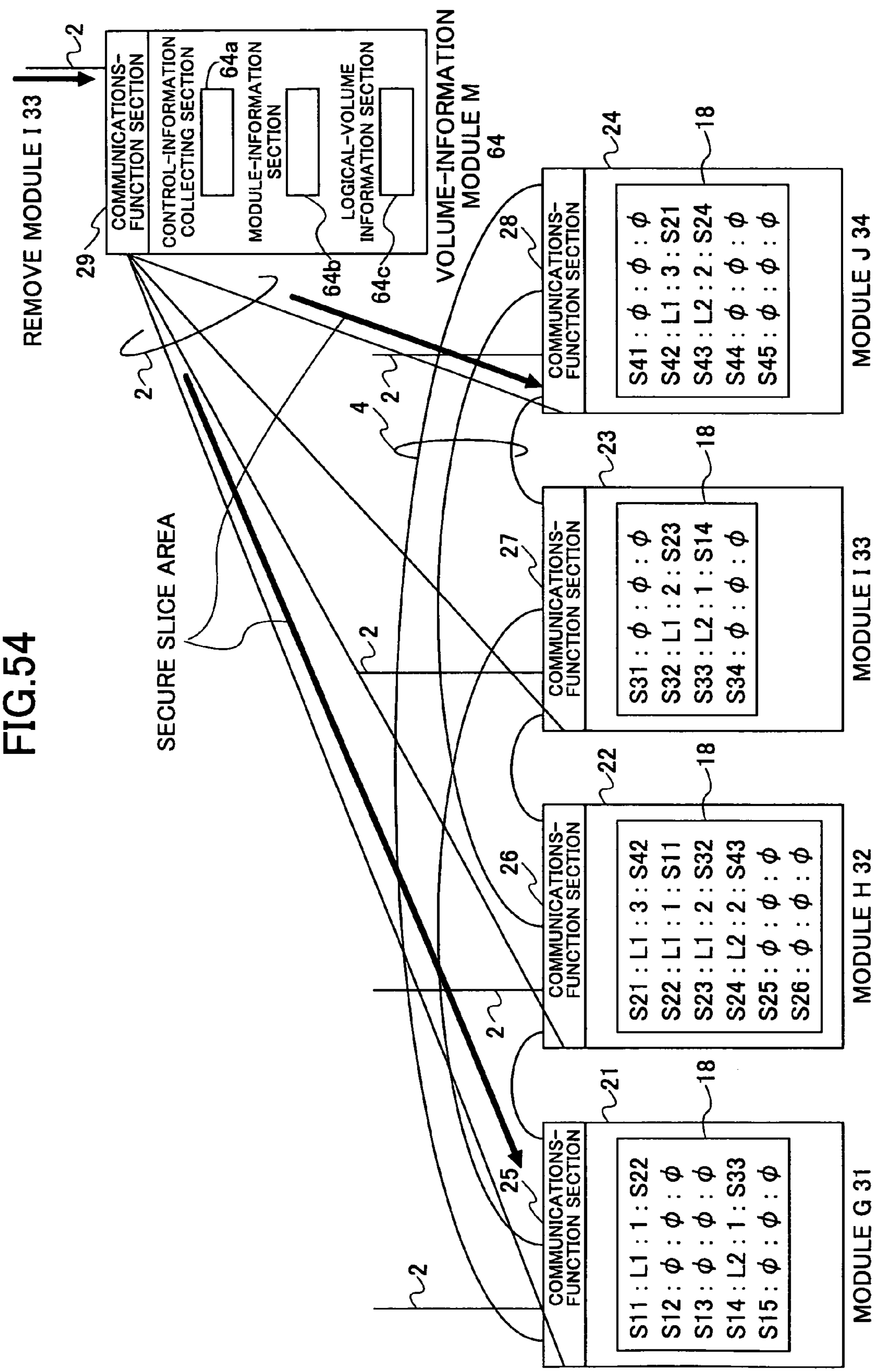
FIG. 54 shows an example of a procedure for removing a module.
Figure 55:
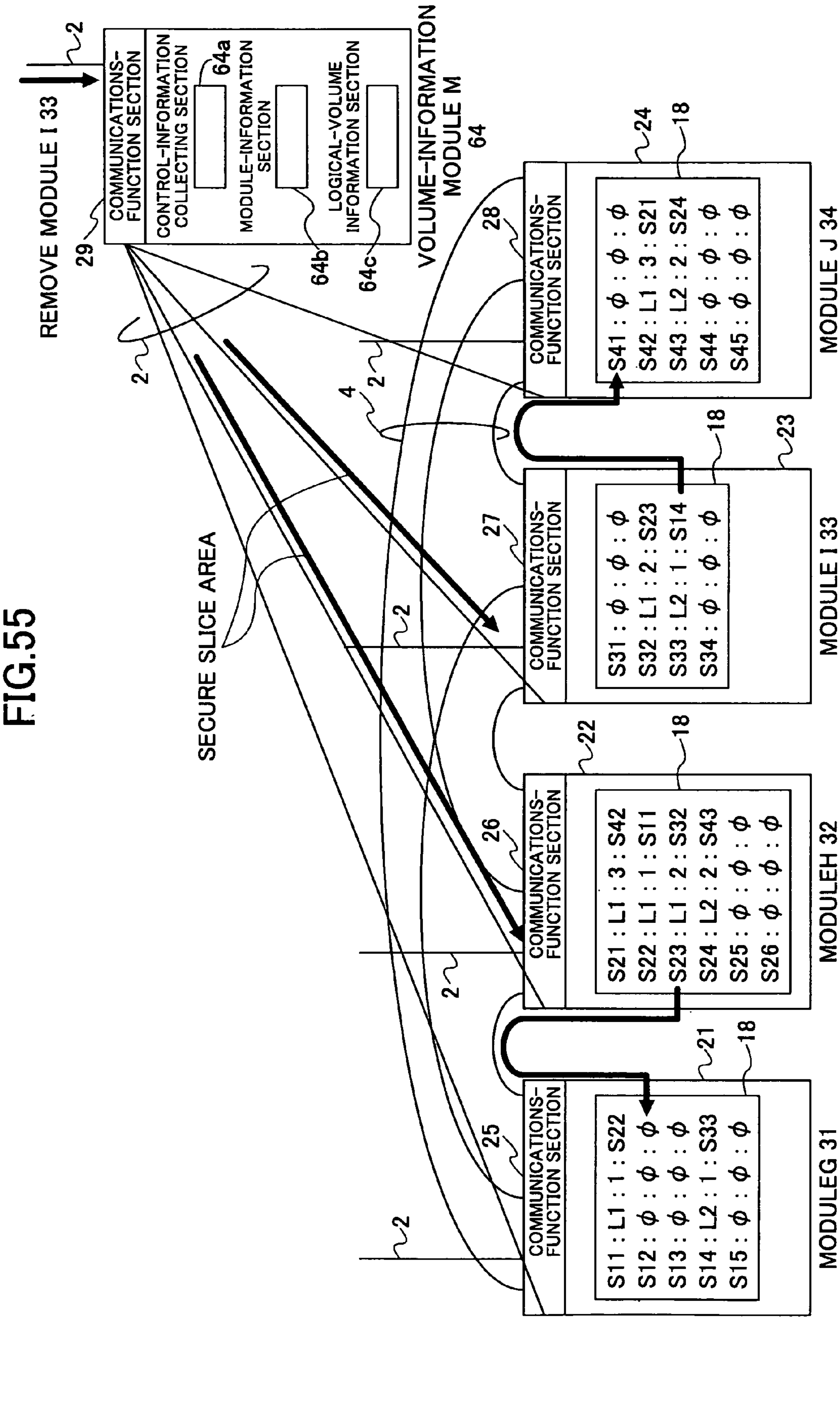
FIG. 55 (continued from FIG. 54) shows the procedure for removing a module.
Figure 56:
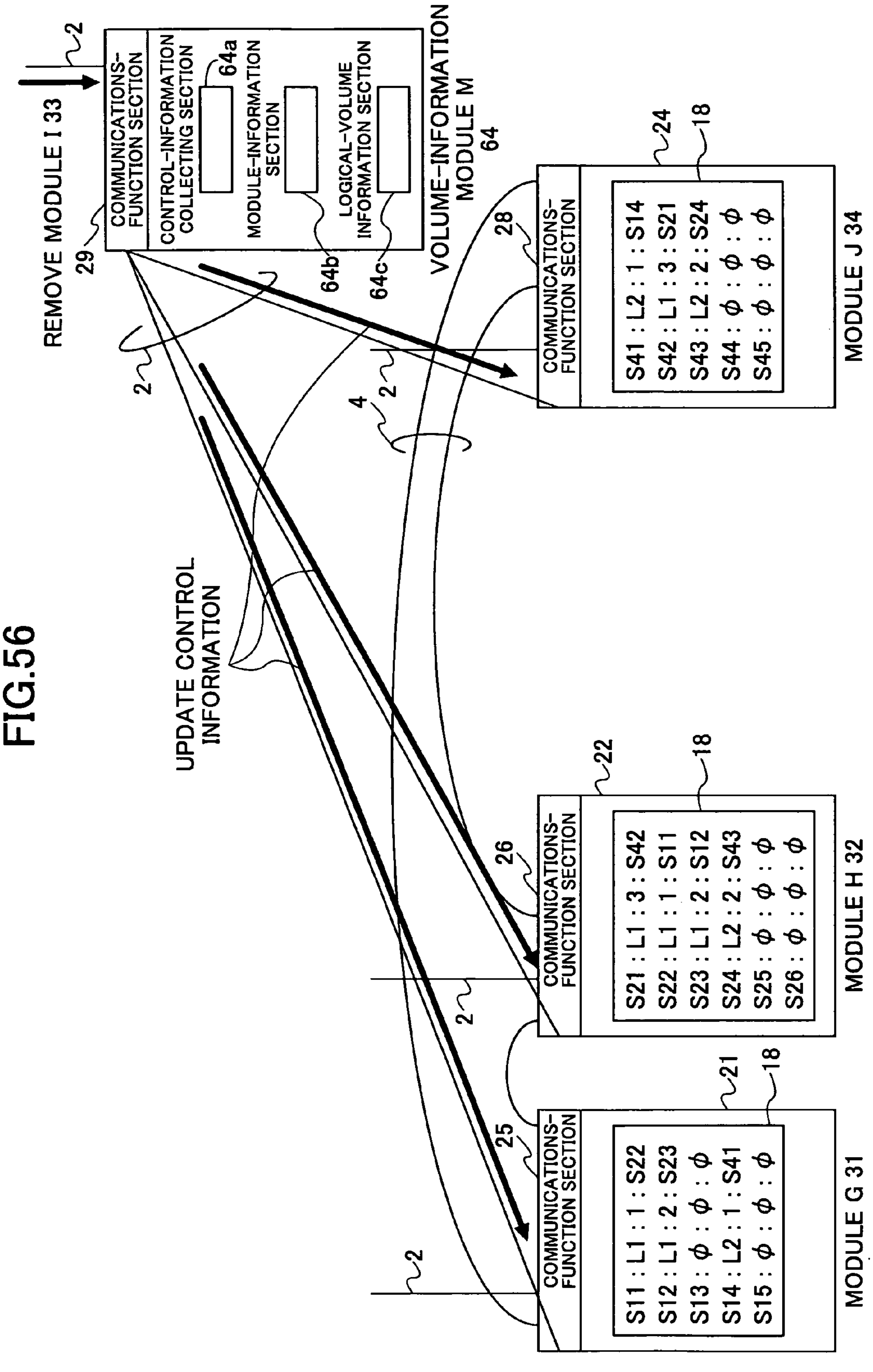
FIG. 56 (continued) shows the procedure for removing a module.
Figure 57:
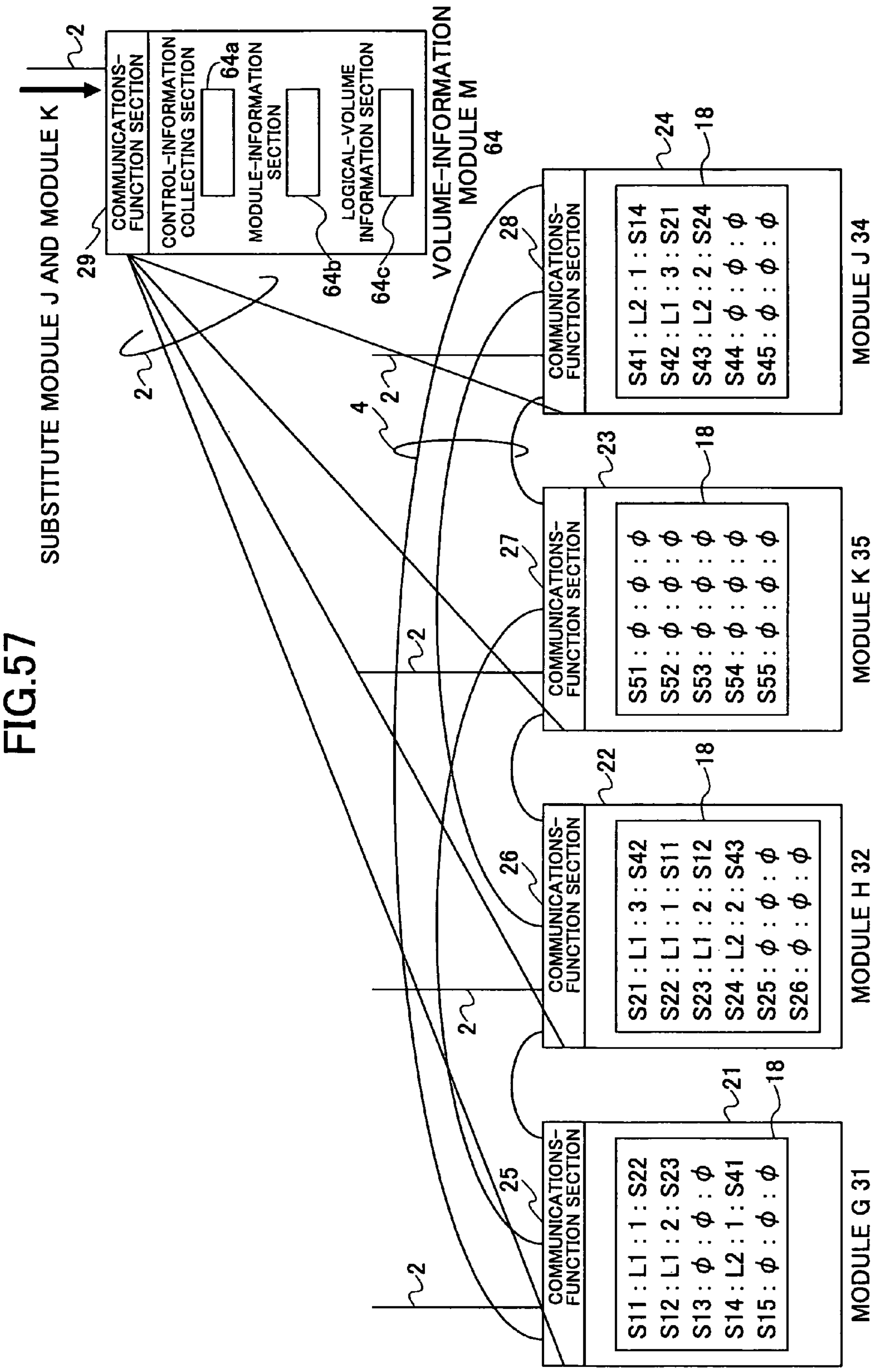
FIG. 57 shows an example of a procedure for substituting modules.

FIGS. 54 through 56 show an example of a procedure for removing a module.

Referring to FIG. 54, a storage system is provided with modules G31, H32, I33 and J34 and a volume-information module M64. The modules G31 through J34 and M64 comprise communications-function sections 25 through 29.

Referring to FIG. 54, the volume-information module M64 receives a request for removal of the module I33 from the outside. In this example, the volume-information module M64 requests the module G31 and J34 to respectively secure slice areas S12 and S41.

Referring to FIG. 55, when the slice areas S12 and S41 are secured so that data elements stored in the module I33 can be transferred thereto, the volume-information module M64 issues an instruction for replicating the data element stored in a slice area S33 in the module I33 to the slice area S41 in the module J34, and an instruction for replicating the data element stored in a slice area S23 in the module H32 to the slide area S12 in the module G31.

The reason that the data element stored in the slice area S32 in the module H32 is replicated to the slice area S12 in the module G31 is because the volume-information module M64 has number information of slice areas forming segments and therefore knows that the slice area S32 and the slice area S23 form a segment and the same data element is stored in the slice area S32 and the slice area S23. With this procedure, data workload after the removal of a module can be more balanced.

When the data duplication is completed as shown in FIG. 56, the volume-information module M64 sends a control information update request to fix related control information. Then, the module I33 is removed.

FIGS. 57 through 60 show an example of a procedure for substituting modules.

The procedure shown in FIGS. 57 through 60 is an example of a procedure for substituting the module J34 and module K35 after removing a module I33 and adding the module K35.

Referring to FIGS. 57 through 60, a storage system is provided with modules G31, H32, K35 and J34 and a volume-information module M64. The modules G31 through J34 and M64 comprise communications-function sections 25 through 29.

Figure 58:
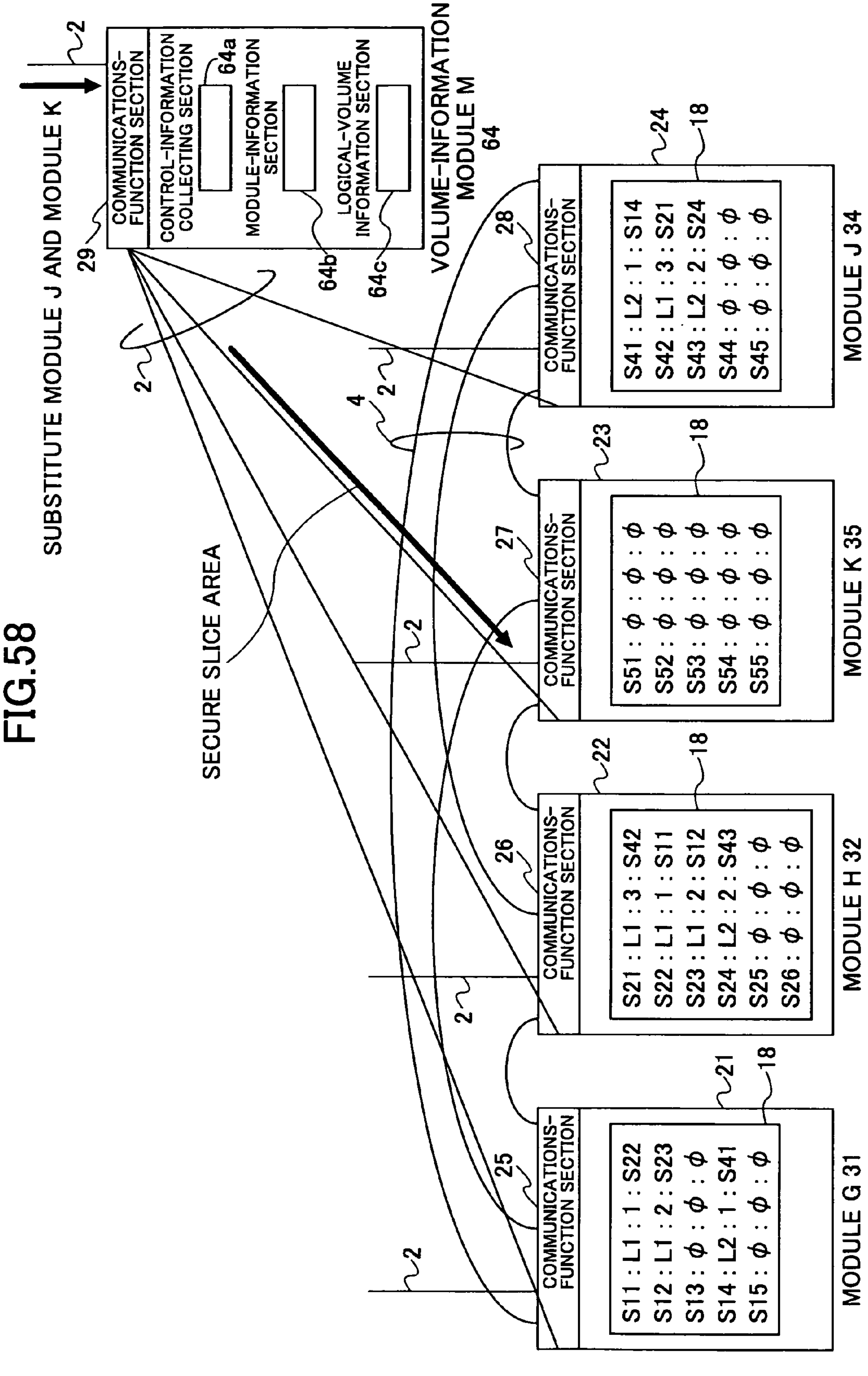
FIG. 58 (continued from FIG. 57) shows the procedure for substituting modules.
Figure 59:
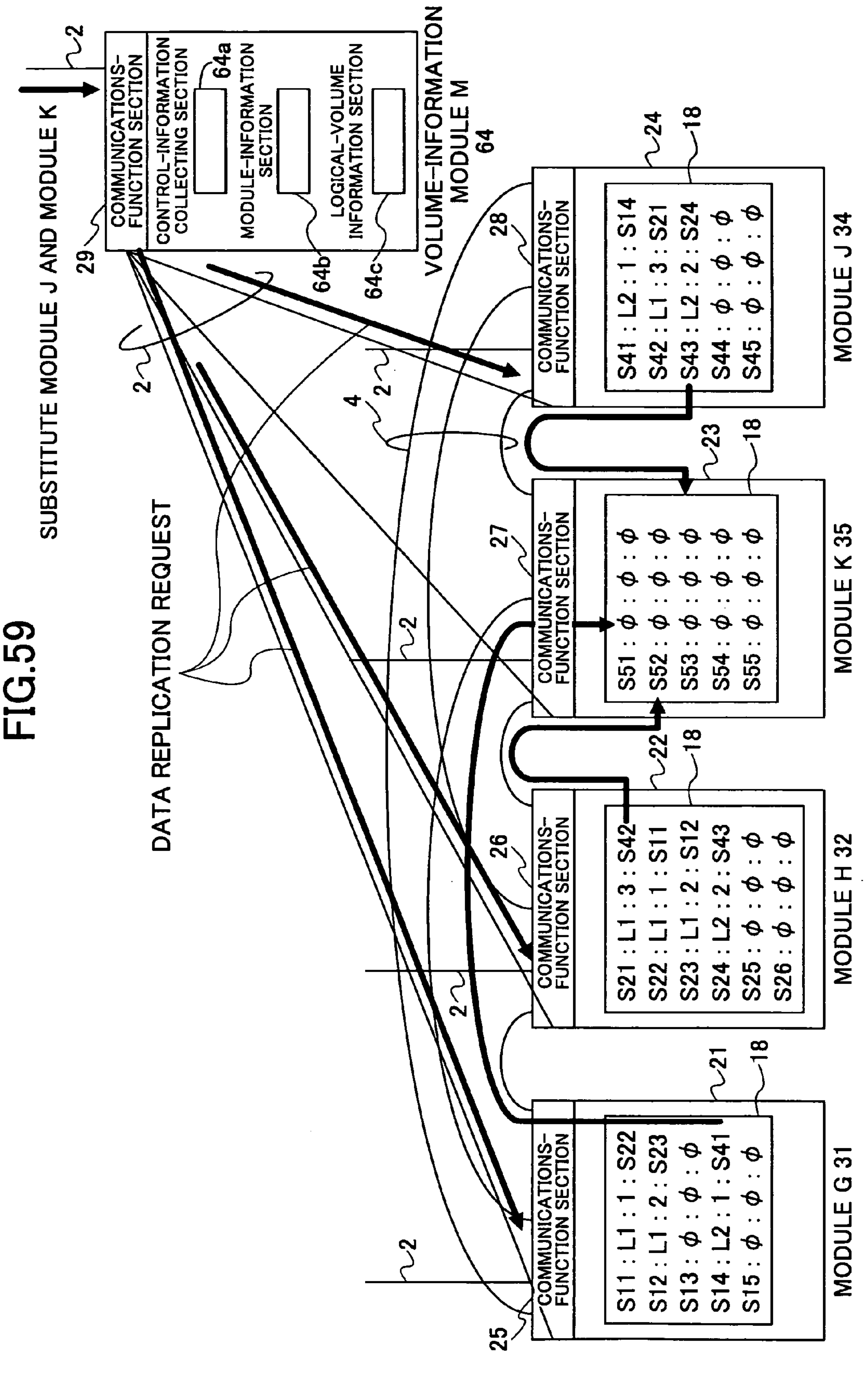
FIG. 59 (continued) shows the procedure for substituting modules.

When the volume-information module M64 receives a request to switch the module J34 and the module K35 (FIG. 57), the volume-information module M64 requests the module K35 to secure unused slice areas (FIG. 58). In this example, three unused slice areas are secured for data elements stored in the module J34. When it is confirmed that three unused slice areas are secured, the volume-information module M64 sends the module J34 a request to replicate stored data elements as shown in FIG. 59.

In this example, the duplication of data elements stored in the module J34 is performed also by the other modules having slice areas that form segments with the slice areas in the module J34 in order to distribute the workload in the storage system.

Figure 60:
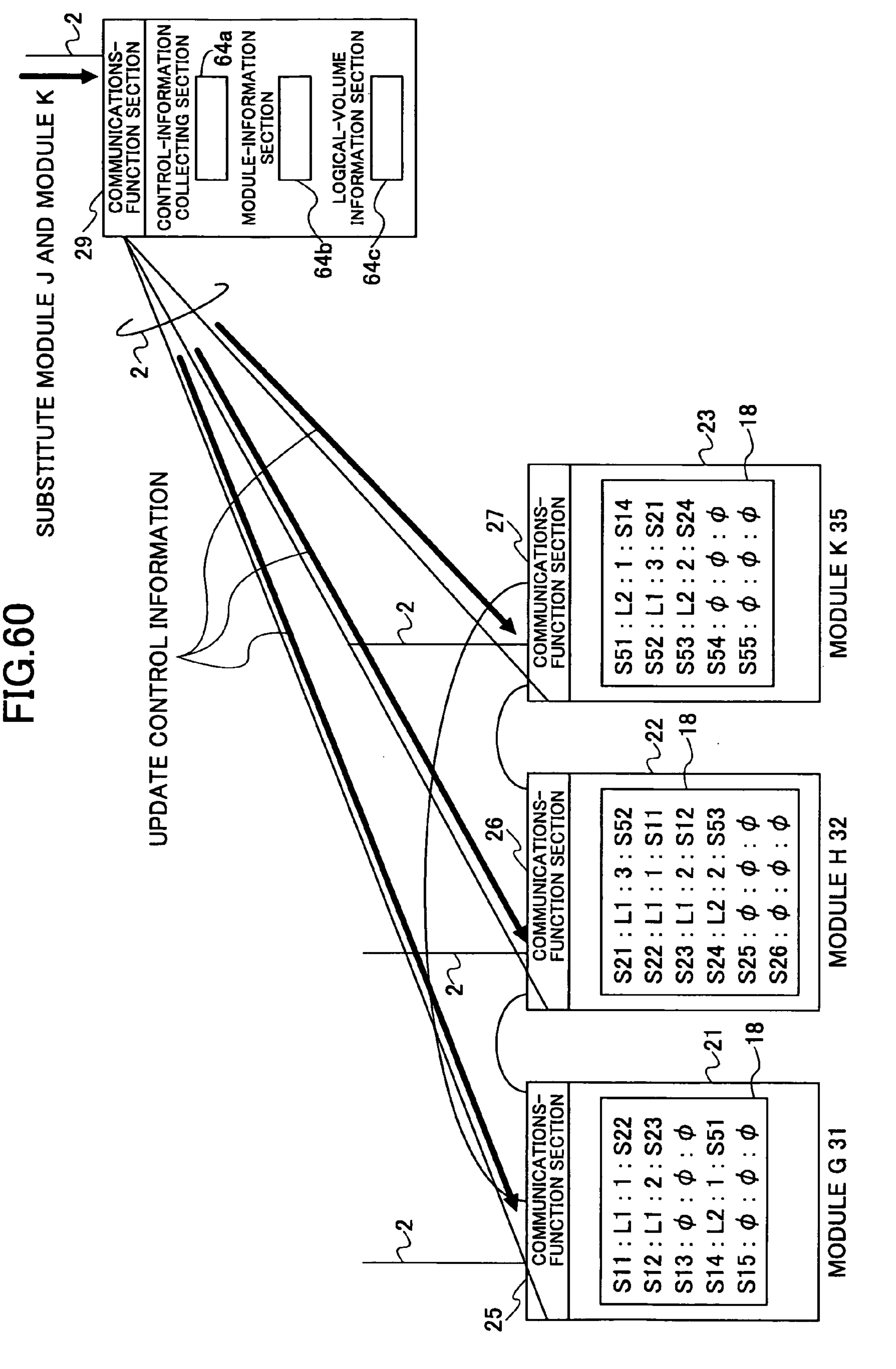
FIG. 60 (continued) shows the procedure for substituting modules.

When the data duplication is completed as shown in FIG. 60, the volume-information module M64 sends a request to update control information to each of the modules G31, H32 and K35. When the update is completed, the module J34 is removed to complete the substituting.

(Fourth Embodiment)

The fourth embodiment is the same as the third embodiment except that a storage system of the fourth embodiment comprises the access modules described in the second embodiment with reference to FIG. 29 and a volume-information module for reconstructing volume information of data stored across modules. Therefore the following description focuses on these differences.

Figure 61:
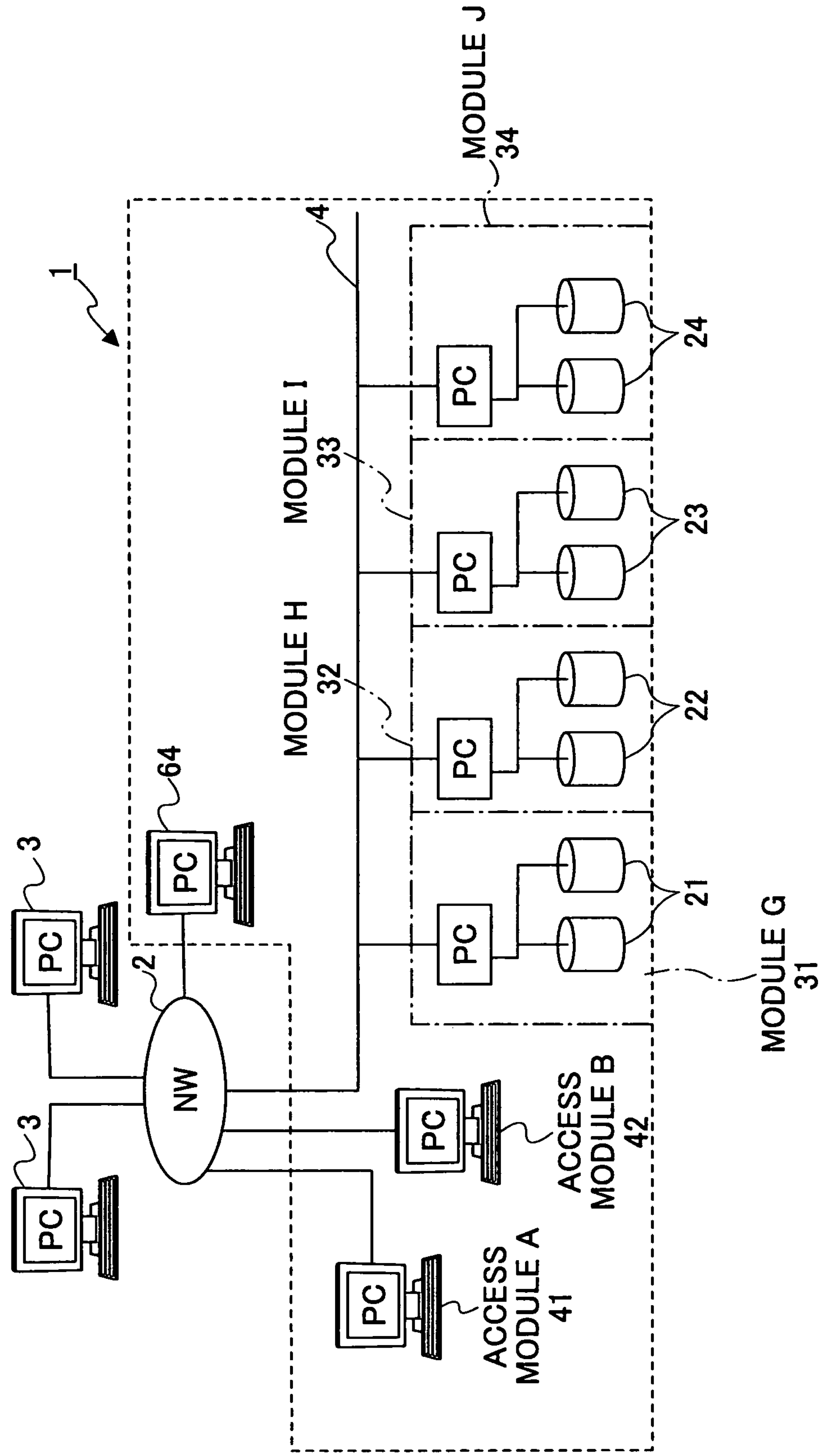
FIG. 61 is a schematic block diagram showing a configuration example of an information processing system including a storage system of a fourth embodiment.

FIG. 61 is a schematic block diagram showing a configuration example of an information processing system including a storage system 1 of the fourth embodiment.

Referring to FIG. 61, the storage system 1 is provided with four modules G31, H32, I33 and J34 respectively comprising PCs having storage devices 21 through 24. The storage system 1 is further provided with two access modules A41 and B42 each comprising a PC for directly accessing a corresponding slice area upon reception of a request for access to the storage system 1. The four modules G31 through J34 are connected to a network 2 via communication lines 4. The storage system 1 is further provided with a volume-information module M64 having a PC that reconstructs logical volume information of data stored across the modules G31 through J34. The volume-information module M64 is connected to the network 2. The two access modules A41 and B42 can directly access any of desired modules G31 through J34 when accessed by external computers, and can refer to the volume information by accessing a logical-volume information section 64*c* in the volume-information module M64 via the network.

Figure 62:
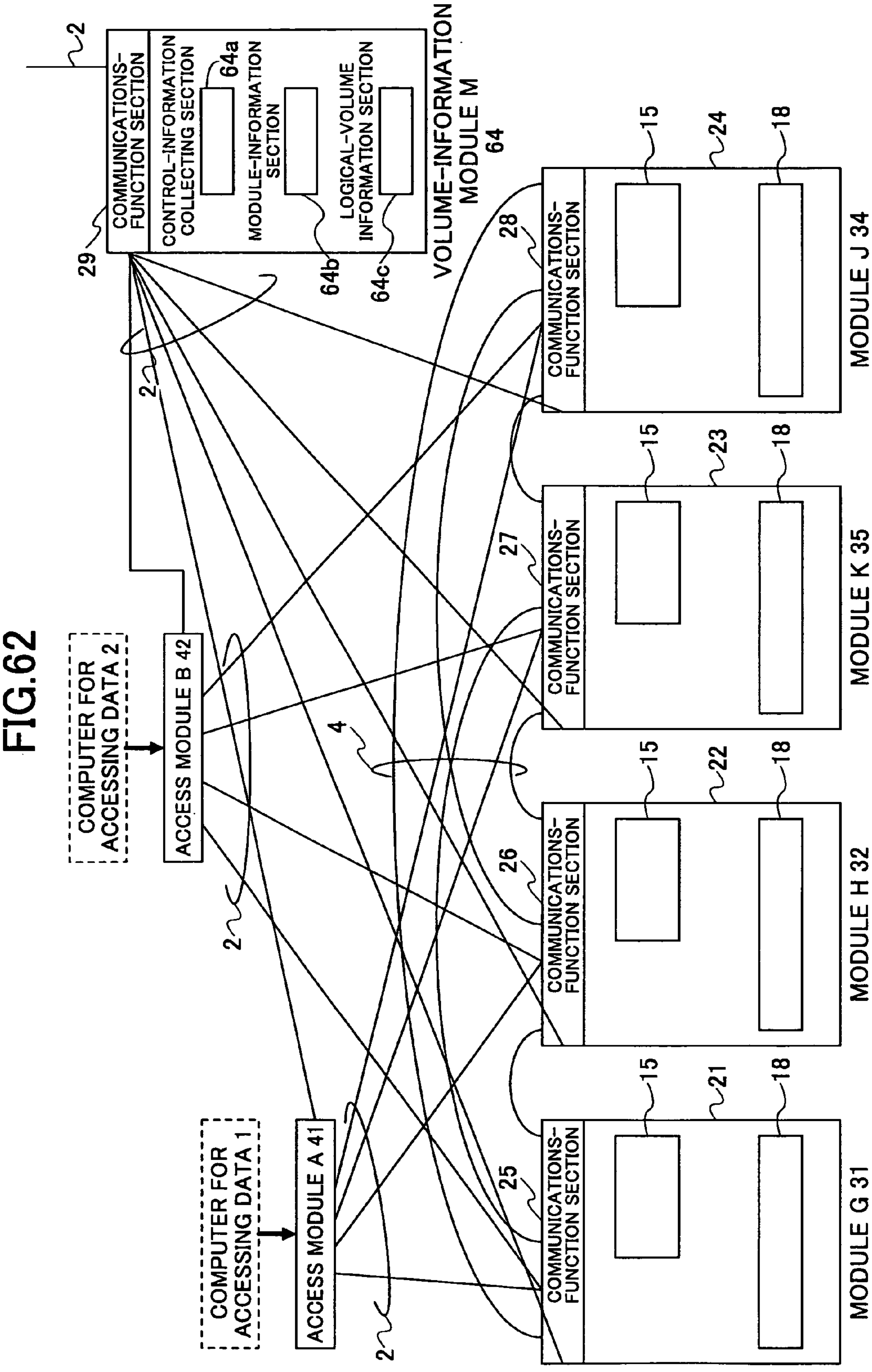
FIG. 62 is a functional block diagram of a storage system of the fourth embodiment.

FIG. 62 is a functional block diagram of the storage system 1 of the fourth embodiment.

The storage system 1 of this embodiment is the same as the storage system of the third embodiment except that the storage system 1 of this embodiment does not have a state-control module but has two access modules. The access modules are the same as the access modules described in the second embodiment. Therefore, elements identical to those described in the above description bear the same reference numbers and are not further described.

The storage system 1 shown in FIG. 62 is provided modules G31, H32, K35 and J34, two access modules A41 and B42, and a volume-information information module M64 for collecting control information from the modules G31 through J34 to manage state information thereof and for managing all the module information and logical volume information.

The access modules A41 and B42 are each configured to receive an access request from an external computer, refer to module information and logical volume information stored in the volume-information module M64 via the network 2, and directly pass the access request to a module that can meet the request. Therefore, the access modules A41 and B42 do not have to collect information by accessing individual modules G31 through J34 and only need to have certain information items. Thus the workload put on the communication lines 4 for accessing individual modules G31 through J34 is reduced. In this embodiment, the two access modules A41 and B42 are configured to have a duplex composition. With this configuration, even if the workload is unevenly applied when external devices access the access modules A41 and B42, the unevenness can be absorbed. Also, security against access from the outside is improved.

What is claimed is:

1. A storage system that stores one or more sets of data elements across plural storage devices, comprising:

a plurality of modules each module including:

one of the storage devices including a set of slices for data storage configured to store the data elements in each slice area, and a set of control-information area that stores control information of the each slice; and a communications-function section having a function of sending and receiving information including the data elements stored in the slice and the control information stored in the control-information area, wherein the control information of each slice stored by the set of control-information area is different between the respective ones of the plurality of modules, and wherein the control-information area of each module stores only the control information of each slice stored in said module, respectively.

2. The storage system as claimed in claim 1, wherein the modules are configured to send and receive the information using the communications-function sections among the modules.

3. The storage system as claimed in claim 1, wherein identical data elements are respectively stored in the slice areas provided in at least two different modules to provide redundancy of the data elements stored in the data storage sections.

4. The storage system as claimed in claim 1, wherein the control-information storage section stores information related to a logical volume including the data elements stored in the corresponding module and representing a set of data elements stored across the slice areas in the modules.

5. The storage system as claimed in claim 1, wherein a first module of the modules has a function that replicates the data element stored in the slice area in the first module in a predetermined slice area in a second module of the modules.

6. A storage system that stores one or more sets of data elements across plural storage devices, comprising:

a plurality of modules each module including:

one of the storage devices including a set of slices for data storage configured to store the data elements in each slice area, and a set of control-information area that stores control information of the each slice; and a communications-function section having a function of sending and receiving information including the data elements stored in the slice and the control information stored in the control-information area, wherein if the control information storage section in a first module of the modules receives an update request for update of the control information stored therein from a second module of the modules, the control information storage section in the first module updates the control information stored therein upon receiving an update completion request from the second module, but restores the control information stored therein to a state immediately before receiving the update request upon receiving an update abort request from the second module.

7. The storage system as claimed in claim 1, wherein each of the modules includes a forced-activation section to perform forced activation after abnormal termination.

8. The storage system as claimed in claim 1, wherein each of the modules includes a heartbeat transmitter to transmit heartbeat that indicates an operation state thereof.

9. The storage system as claimed in claim 1, further comprising: an access module to exclusively receive an access request for access to the storage system, and forward the access request to the one or more modules that meet the request.

10. The storage system as claimed in claim 9, wherein the access module has information about the data elements stored in the slice areas in the modules, and processes the access request based on the information.

11. The storage system as claimed in claim 1, wherein each of the modules includes a heartbeat transmitter to transmit heartbeat that indicates an operation state thereof; and the storage system further comprises:

a state-control module to control the operation state of each of the modules based on the heartbeat received from the heartbeat transmitter of the corresponding module.

12. The storage system as claimed in claim 11, wherein the state-control module includes a forced-termination instruction transmitter to forcibly terminate operations of a predetermined module of the modules.

13. A storage system that stores one or more sets of data elements across plural storage devices, comprising:

a plurality of modules each module including:

one of the storage devices including a set of slices for data storage configured to store the data elements in each slice area, and a set of control-information area that stores control information of the each slice; and a communications-function section having a function of sending and receiving information including the data elements stored in the slice and the control information stored in the control-information area, wherein each of the modules includes a heartbeat transmitter to transmit heartbeat that indicates an operation state thereof;

and the storage system further comprises:

a state-control module to control the operation state of each of the modules based on the heartbeat received from the heartbeat transmitter of the corresponding module, wherein the state-control module includes a module-state transmitter to report an operation state of each of the modules recognized by the state-control module to the other modules, and each of the modules stops operations thereof if the operation state reported by the state-control module is different from an operation state recognized by itself.

14. The storage system as claimed in claim 1, further comprising:

a volume-information module to collect the control information from each of the modules so as to be able to reconstruct information related to a logical volume representing the one or more sets of data elements stored across the slice areas in the modules based on the collected control information.

15. The storage system as claimed in claim 14, wherein the volume-information module includes an update request section to request each of the modules to update the control information.

16. The storage device as claimed in claim 14, wherein the volume-information module includes an update completion request section to request each of the modules to complete an update of the control information, and an update abort request section to request each of the modules to abort the update of the control information.

17. The storage system as claimed in claim 14, wherein a first module of the modules has a function that replicates the data element stored in the slice area in the first module in a predetermined slice area in a second module of the modules, and the volume-information module specifies the predetermined slice area in the second module into which the data element stored in the slice area in the first module is to be replicated.

18. The storage system as claimed in claim 14, wherein the volume-information module includes a forced-termination instruction transmitter to forcibly terminate operations of each of the modules.

19. The storage system as claimed in claim 14, further comprising:

a state-control module having a function of receiving heartbeat that indicates an operation state of each of the modules so as to control the operation state of each of the modules, and a function of forcibly terminating operations of each of the modules when the corresponding heartbeat stops;

wherein the volume-information module is configured to receive a report of the operation state of each of the modules from the state-control module, and to instruct the state-control module to forcibly terminate a predetermined module of the modules.

20. The storage system as claimed in claim 14, further comprising:

an access module to exclusively receive an access request for access to the storage system, and to forward the access request to the one or more modules that meet the request;

wherein when the access module receives the access request, the access module acquires information related to the access request from the volume-information module and forwards the access request based on the acquired information.

* * * * *